United States Patent
Kato et al.

(10) Patent No.: US 7,474,840 B2
(45) Date of Patent: Jan. 6, 2009

(54) DATA RECORDING APPARATUS FOR MANAGING CONTENT WHEN CONTENT IS DELETED

(75) Inventors: Motoki Kato, Kanagawa (JP); Toshiya Hamada, Saitama (JP)

(73) Assignee: Sony Corporation, Tokyo (JP)

( * ) Notice: Subject to any disclaimer, the term of this patent is extended or adjusted under 35 U.S.C. 154(b) by 1352 days.

(21) Appl. No.: 10/275,571

(22) PCT Filed: Nov. 20, 2001

(86) PCT No.: PCT/JP01/10146

§ 371 (c)(1),
(2), (4) Date: May 22, 2003

(87) PCT Pub. No.: WO02/075739

PCT Pub. Date: Sep. 26, 2002

(65) Prior Publication Data

US 2005/0025459 A1 Feb. 3, 2005

(30) Foreign Application Priority Data

Mar. 8, 2001 (JP) ............................. 2001-065074

(51) Int. Cl.
*H04N 5/91* (2006.01)
(52) U.S. Cl. .................. 386/124; 386/95; 386/105; 386/45; 386/125
(58) Field of Classification Search .............. 386/124, 386/125, 95
See application file for complete search history.

(56) References Cited

U.S. PATENT DOCUMENTS

| | | | | |
|---|---|---|---|---|
| 5,894,480 | A | * | 4/1999 | Hoffert et al. ............... 370/389 |
| 6,078,727 | A | | 6/2000 | Saeki et al. |
| 6,085,023 | A | | 7/2000 | Hatanaka et al. |
| 6,169,843 | B1 | * | 1/2001 | Lenihan et al. ............... 386/46 |

(Continued)

FOREIGN PATENT DOCUMENTS

EP 0 814 619 12/1997

(Continued)

OTHER PUBLICATIONS

JP 11306545 A (Mitsubishi Electric Corp) Nov. 5, 1999 See machine translation: [online], [retrieved on Oct. 13, 2003]. Retrieved from the Internet: <URL:http://www6.ipd1.jpo.go.jp/Tokujitu/PAJdetail.ipd1?N0000=80&NO120=01&N2001=2&N3001=H11-306545>.

(Continued)

*Primary Examiner*—Thai Tran
*Assistant Examiner*—Helen Shibru
(74) *Attorney, Agent, or Firm*—Frommer Lawrence & Haug LLP; William S. Frommer; Thomas F. Presson

(57) ABSTRACT

A data recording apparatus capable of properly managing contents of data and reproduction information even if a portion of the data is deleted. If a portion of Clip is deleted so that an ATC-sequence becomes discontinuous, the value of offset_STC_id for an STC-sequence at the beginning of the ATC-sequence is set so that the value of stc_id of each STC-sequence following the ATC discontinuity does not change. The stc_id of an STC-sequence is an ID for identifying the STC-sequence.

10 Claims, 58 Drawing Sheets

U.S. PATENT DOCUMENTS 6,181,870 B1 * 1/2001 Okada et al. .................. 386/95

FOREIGN PATENT DOCUMENTS

| | | |
|---|---|---|
| EP | 0 866 460 | 9/1998 |
| EP | 0 903 738 | 3/1999 |
| EP | 0 903 744 | 3/1999 |
| EP | 1 014 370 | 6/2000 |
| EP | 1 089 565 | 4/2001 |
| JP | 10-11893 | 1/1998 |
| JP | 11-155130 | 6/1999 |
| JP | 11-187354 | 7/1999 |
| JP | 11-306677 | 11/1999 |
| JP | 3 072 283 | 7/2000 |
| JP | 2001-167559 | 6/2001 |

OTHER PUBLICATIONS

JP 11143644 A (Sony Corporation) May 28, 1999 See machine translation: [online], [retrieved on Oct. 13, 2003]. Retrieved from the Internet: <URL:http://www6.ipdl.jpo.go.jp/Tokujitu/PAJdetail.ipdl?N0000=80&N0120=01&N2001=2&N3001=H11-143644>.

* cited by examiner

FIG. 4

| Syntax | No. of bits | Mnemonic |
|---|---|---|
| source packet() { | | |
|     TP_extra_header() | | |
|     transport_packet() | | |
| } | | |

FIG. 5

| Syntax | No. of bits | Mnemonic |
|---|---|---|
| TP_extra_header() { | | |
|     copy_permission_Indicator | 2 | uimsbf |
|     arrival_time_stamp | 30 | uimsbf |
| } | | |

FIG. 8

| Syntax | No. of bits | Mnemonic |
|---|---|---|
| zzzzz.clpi { | | |
|     version_number | 8*4 | bslbf |
|     SequenceInfo_start_address | 32 | uimsbf |
|     ProgramInfo_start_address | 32 | uimsbf |
|     CPI_start_address | 32 | uimsbf |
|     ClipMark_start_address | 32 | uimsbf |
|     MarkersPrivateData_start_address | 32 | uimsbf |
|     reserved_for_future_use | 96 | bslbf |
|     ClipInfo() | | |
|     for(i=0; i<N1; i++){ | | |
|         Padding_word | 16 | bslbf |
|     } | | |
|     SequenceInfo() | | |
|     for(i=0; i<N2; i++){ | | |
|         Padding_word | 16 | bslbf |
|     } | | |
|     ProgramInfo() | | |
|     for(i=0; i<N3; i++){ | | |
|         Padding_word | 16 | bslbf |
|     } | | |
|     CPI() | | |
|     for(i=0; i<N4; i++){ | | |
|         Padding_word | 16 | bslbf |
|     } | | |
|     ClipMark() | | |
|     for(i=0; i<N5; i++){ | | |
|         Padding_word | 16 | bslbf |
|     } | | |
|     MarkersPrivateData() | | |
|     for(i=0; i<N6; i++){ | | |
|         Padding_word | 16 | bslbf |
|     } | | |
| } | | |

FIG. 11
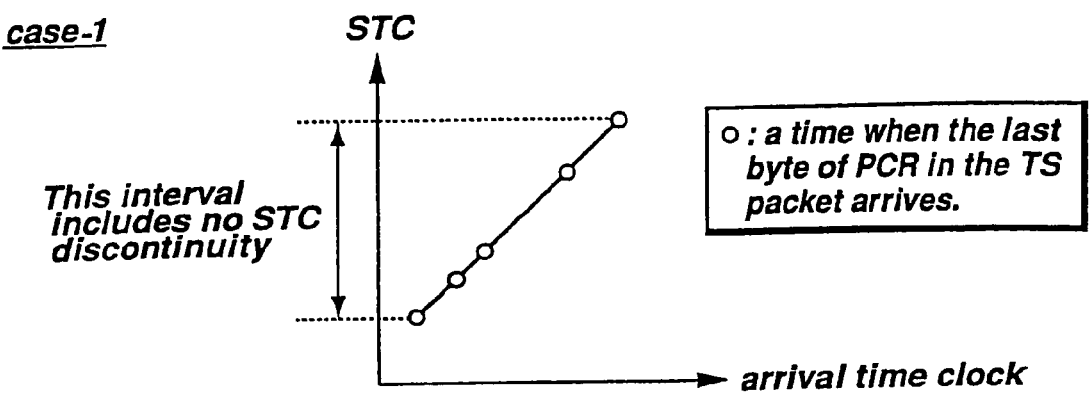
case-1
○ : a time when the last byte of PCR in the TS packet arrives.
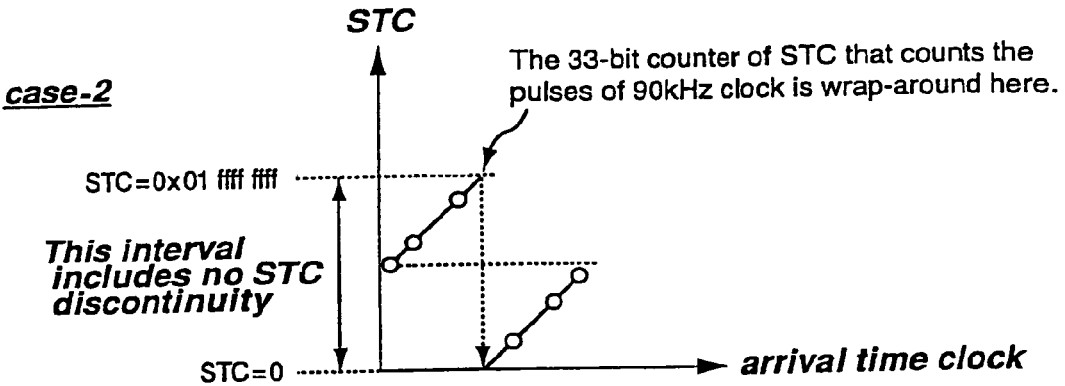
case-2

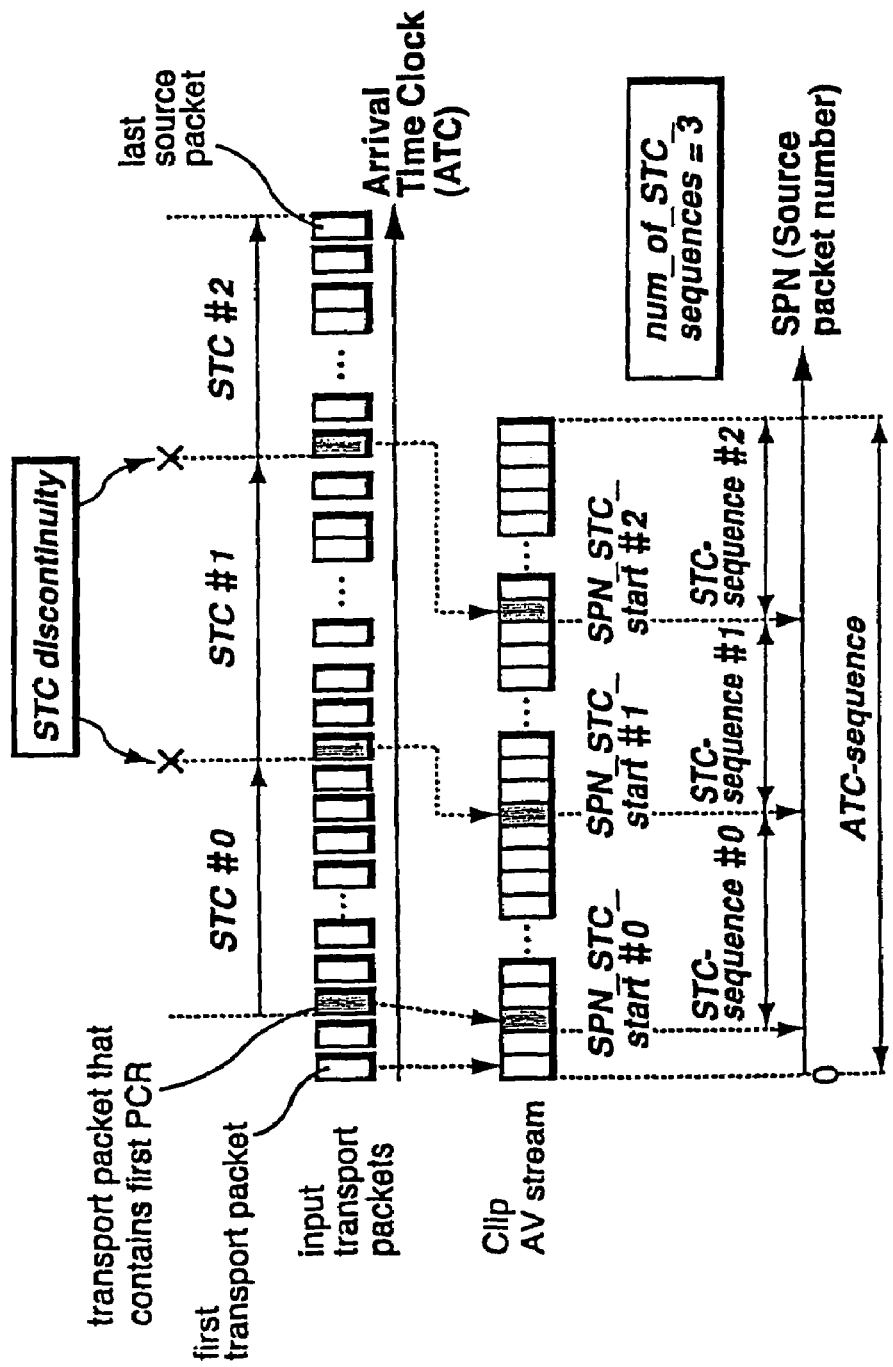

FIG. 13

| Syntax | No. of bits | Mnemonic |
|---|---|---|
| Sequenceinfo() { | | |
|     length | 32 | uimsbf |
|     reserved_for_word_align | 8 | bslbf |
|     num_of_ATC_sequences | 8 | uimsbf |
|     for(atc_id=0; atc_id<num_of_ATC_sequences; atc_id++){ | | |
|         SPN_ATC_start[atc_id] | 32 | uimsbf |
|         num_of_STC_sequences[atc_id] | 8 | uimsbf |
|         ofset_STC_id[atc_id] | 8 | uimsbf |
|         for (stc_id = offset_STC_id[atc_id]; stc_id <(num_of_STC_sequences[atc_id]+offset_STC_id[atc_id]); stc_id++) { | | |
|             PCR_PID[atc_id][stc_id] | 16 | uimsbf |
|             SPN_STC_start[atc_id][stc_id] | 32 | uimsbf |
|             presentation_start_time[atc_id][stc_id] | 32 | uimsbf |
|             presentation_end_time[atc_id][stc_id] | 32 | uimsbf |
|         } | | |
|     } | | |
| } | | |

FIG. 15

| Syntax | No. of bits | Mnemonic |
|---|---|---|
| programInfo() { | | |
|    length | 32 | uimsbf |
|    reserved_for_word_align | 8 | bslbf |
|    num_of_program_sequences | 8 | uimsbf |
|    for(i=0; i<*num_of_program_sequences*; i++){ | | |
|       SPN_program_sequences_start | 32 | uimsbf |
|       program_map_PID | 16 | bslbf |
|       num_of_streams_in_ps | 8 | uimsbf |
|       num_of_groups | 8 | uimsbf |
|       for (*stream_index*=0; *stream_index*<*num_of_streams_in_ps*; *stream_index*++){ | | |
|          stream_PID | 16 | uimsbf |
|          StreamCodingInfo() | | |
|       } | | |
|       if (*num_of_groups* >1){ | | |
|          for(i=0; i<*num_of_groups*; i++){ | | |
|             num_of_streams_in_group | 8 | uimsbf |
|             for (k=0; k<*num_of_streams_in_group*; k++){ | | |
|                stream_index | 8 | uimsbf |
|             } | | |
|             if (num_of_streams_in_group%2==0){ | | |
|                reserved_for_word_align | 8 | bslbf |
|             } | | |
|          } | | |
|       } | | |
|    } | | |
| } | | |

FIG. 16

| Syntax | No. of bits | Mnemonic |
|---|---|---|
| StreamCodingInfo() { | | |
|     length | 8 | bslbf |
|     stream_coding_type | 8 | uimsbf |
|     if (*stream_coding_type*==0x02) { | | |
|         video_format | 4 | uimsbf |
|         frame_rate | 4 | uimsbf |
|         display_aspect_ratio | 4 | uimsbf |
|         reserved_for_word_align | 2 | bslbf |
|         cc_flag | 1 | uimsbf |
|         original_video_format_flag | 1 | |
|         if (*original_video_format_flag*==1) { | | |
|             original_video_format | 4 | uimsbf |
| original_display_aspect_ratio | 4 | uimsbf |
|             reserved_for_word_align | 8 | bslbf |
|         } | | |
|     } else if (*stream_coding_type*==0x03// stream_coding_type==0x04// stream_coding_type==0x0F// stream_coding_type==0x80// stream_coding_type==0x81) { | | |
|         audio_presentation_type | 4 | uimsbf |
|         sampling_frequency | 4 | uimsbf |
|         reserved_for_word_align | 8 | bslbf |
|     } | | |
| } | | |

FIG. 17

| stream_coding_type | Meaning |
|---|---|
| 0x00 - 0x01 | reserved for future use |
| 0x02 | MPEG-1 or MPEG-2 video stream |
| 0x03 | MPEG-1 audio |
| 004 | MPEG-2 multi-channel audio, backward compatible to MPEG-1 |
| 0x05 | reserved for future use |
| 0x06 | Teletext defined in SESF or DVB or Subtitle defined in ISDB |
| 0x07 - 0x09 | reserved for future use |
| 0x0A | ISO/IEC 13818-6 type A |
| 0x0B | ISO/IEC 13818-6 type B |
| 0x0C | ISO/IEC 13818-6 type C |
| 0x0D | ISO/IEC 13818-6 type D |
| 0x0E | reserved for future use |
| 0x0F | MPEG-2 AAC audio with ADTS transport syntax |
| 0x10 - 0x7F | reserved for future use |
| 0x80 | SESF LPCM audio |
| 0x81 | Dolby AC-3 audio |
| 0x82 - 0xFF | reserved for future use |

FIG. 18

| video_format | Meaning | Video_standard |
|---|---|---|
| 0 | 480 i | ITU-R BT.601-4 |
| 1 | 576 i | ITU-R BT.601-4 |
| 2 | 480 p | SMPTE 293M |
| 3 | 1080 i | SMPTE 274M |
| 4 | 720 p | SMPTE 296M |
| 5-14 | reserved for future use | |
| 15 | No information | |

FIG. 19

| frame_rate | Meaning |
|---|---|
| 0 | reserved for future use |
| 1 | 24 000/1001 (23.976...) |
| 2 | 24 |
| 3 | 25 |
| 4 | 30 000/1001 (29.97...) |
| 5 | 30 |
| 6 | 50 |
| 7 | 60 000/1001 (59.94...) |
| 8 | 60 |
| 9-14 | reserved for future use |
| 15 | No information |

FIG. 20

| display_aspect_ratio | Meaning |
|---|---|
| 0 | reserved for future use |
| 1 | reserved for future use |
| 2 | 4:3 display aspect ratio |
| 3 | 16:9 display aspect ratio |
| 4 | 2.21:1 display aspect ratio |
| 5-14 | reserved for future use |
| 15 | No information |

FIG. 21

| audio_presentation_type | Meaning |
|---|---|
| 0 | reserved for future use |
| 1 | single mono channel |
| 2 | dual mono channel |
| 3 | stereo (2-channel) |
| 4 | multi-lingual |
| 5 | surround sound |
| 6 | multi-channel |
| 7-12 | reserved for future use |
| 13 | audio description for the visually impaired |
| 14 | audio for the hard of hearing |
| 15 | No information |

FIG. 22

| sampling_frequency | Meaning |
|---|---|
| 0 | 48 kHz |
| 1 | 44.1 kHz |
| 2 | 32 kHz |
| 3-14 | reserved for future use |
| 15 | No information |

FIG. 23

| Syntax | No. of bits | Mnemonic |
|---|---|---|
| CPI() { | | |
|     length | 32 | uimsbf |
|     reserved_for_word_align | 15 | bslbf |
|     CPI_type | 1 | bslbf |
|     if (CPI_type == 0) { | | |
|         EP_map() | | |
|     } else { | | |
|         TU_map() | | |
|     } | | |
| } | | |

FIG. 24
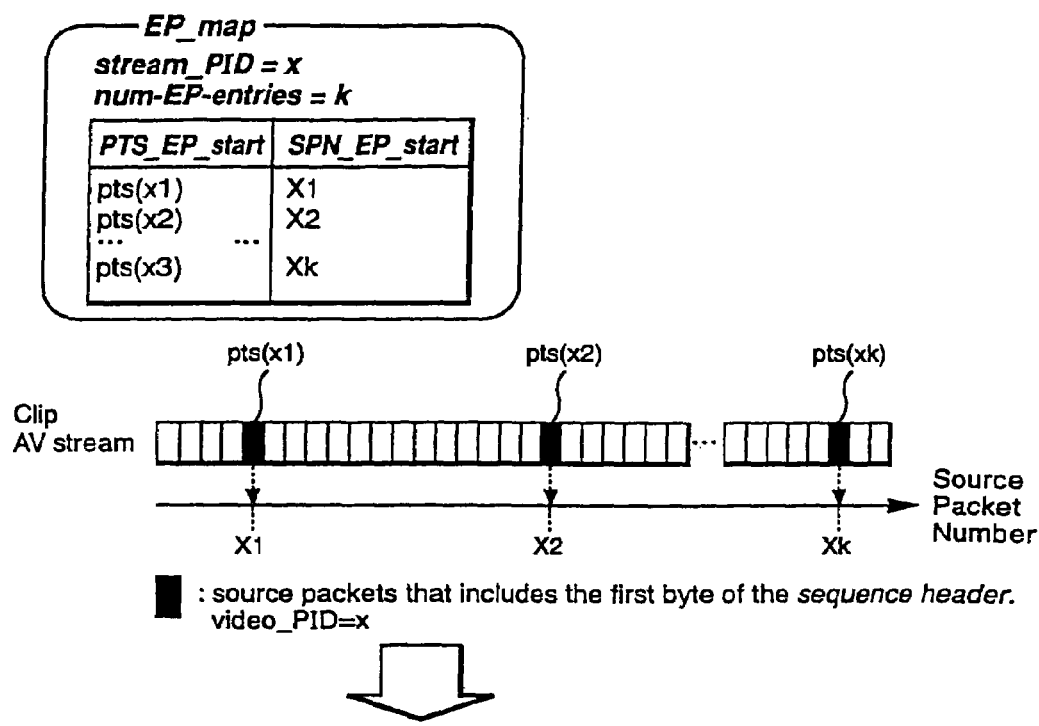
: source packets that includes the first byte of the *sequence header.*
video_PID=x
An example case of the source packet pointed by SPN_EP_start
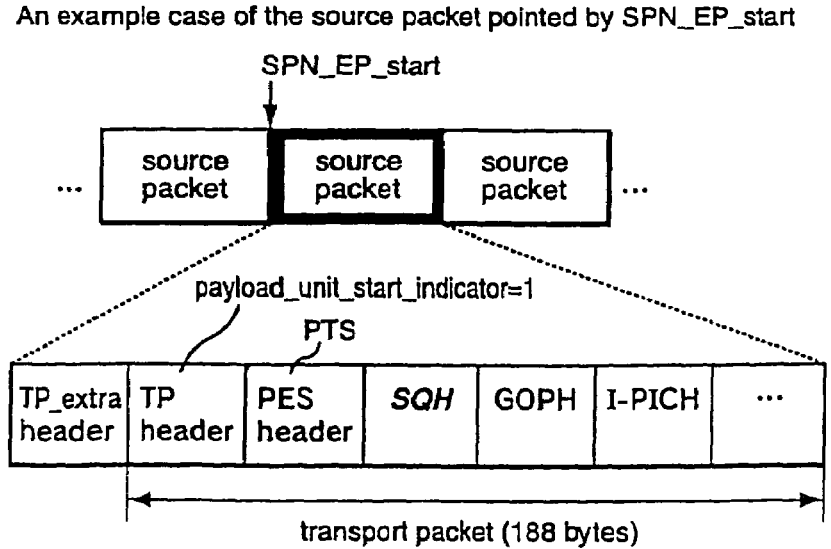

FIG. 26

| Syntax | No. of bits | Mnemonic |
|---|---|---|
| TU_map() { | | |
|     time_unit_size | 32 | uimsbf |
|     for(atc_id=0; atc_id<num_of_ATC_sequences; atc_id++) { | | |
|         offset_arrival_time[atc_id] | 32 | bslbf |
|         num_of_time_unit_entries[atc_id] | 32 | uimsbf |
|     } | | |
|     for(atc_id=0; atc_id<num_of_ATC_sequences; atc_id++) { | | |
|         for(i=0; i<num_of_time_unit_entries[atc_id]; i++) { | | |
| SPN_time_unit_start[atc_id][i] | 32 | uimsbf |
|         } | | |
|     } | | |
| } | | |

FIG. 27

| Syntax | No. of bits | Mnemonic |
|---|---|---|
| xxxxx.rpls / yyyyy.vpls { | | |
|     version_number | 8*4 | bslbf |
|     PlayList_srart_address | 32 | uimsbf |
|     PlayListMark_start_address | 32 | uimsbf |
|     MakersPrivateData_start_address | 32 | uimsbf |
|     reserved_for_future_use | 160 | bslbf |
|     UIAppInfoPlayList() | | |
|     for(i=0; i<N1; i++) { | | |
|         padding_word | 16 | bslbf |
|     } | | |
|     PlayListst() | | |
|     for(i=0; i<N2; i++) { | | |
|         padding_word | 16 | bslbf |
|     } | | |
|     PlayListstMark() | | |
|     for(i=0; i<N3; i++) { | | |
|         padding_word | 16 | bslbf |
|     } | | |
|     MakersPrivateData() | | |
|     for(i=0; i<N4; i++) { | | |
|         padding_word | 16 | bslbf |
|     } | | |
| } | | |

F I G. 28

| Syntax | No. of bits | Mnemonic |
|---|---|---|
| PlayList() { | | |
|     length | 32 | uimsbf |
|     reserved_for_word_align | 15 | bslbf |
|     CPI_type | 1 | bslbf |
|     number_of_PlayItems | 16 | uimsbf |
|     if (*<Virtual-PlayList>* && CPI_type==0) { | | |
|         number_of_SubPlayItems | 16 | uimsbf |
|     } else { | | |
|         reserved_for_word_align | 16 | bslbf |
|     } | | |
|     for (*PlayItem_id*=0;<br>        *PlayItem_id*<*number_of_PlayItems*;<br>        *PlayItem_id*++) { | | |
|         PlayItem() | | |
|     } | | |
|     if (*<Virtual-PlayList>* && CPI_type==0) { | | |
|         for (i=0; i<*number_of_<br>SubPlayItems*; i++) { | | |
|             SubPlayItem() | | |
|         } | | |
|     } | | |
| } | | |

FIG. 33

| Syntax | No. of bits | Mnemonic |
|---|---|---|
| PlayItem() { | | |
|     length | 16 | uimsbf |
|     Clip_Information_file_name | 8*10 | bslbf |
|     reserved_for_word_align | 6 | bslbf |
|     connection_condition | 2 | bslbf |
|     if (CPI_type==0) { /* the CPI_type is defined in the PlayList(). */ | | |
|         ref_to_STC_id | 8 | uimsbf |
|     } else { | | |
|         reserved_for_word_align | 8 | bslbf |
|     } | | |
|     IN_time | 32 | uimsbf |
|     OUT_time | 32 | uimsbf |
|     if (<Virtual-PlayList> && connection_condition=='10') { | | |
|         Bridge_Clip_Information_file_name | | |
|     } | | |
| } | | |

This part of the Clip is not used by any Virtual PlayLists

FIG. 38
Before editing
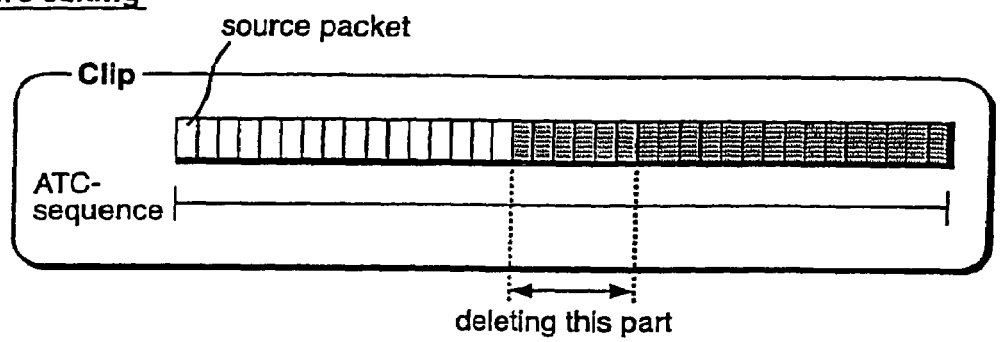
After editing:
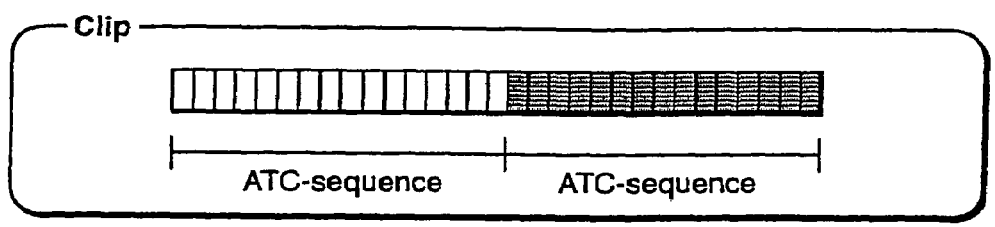

FIG. 39
Before editing
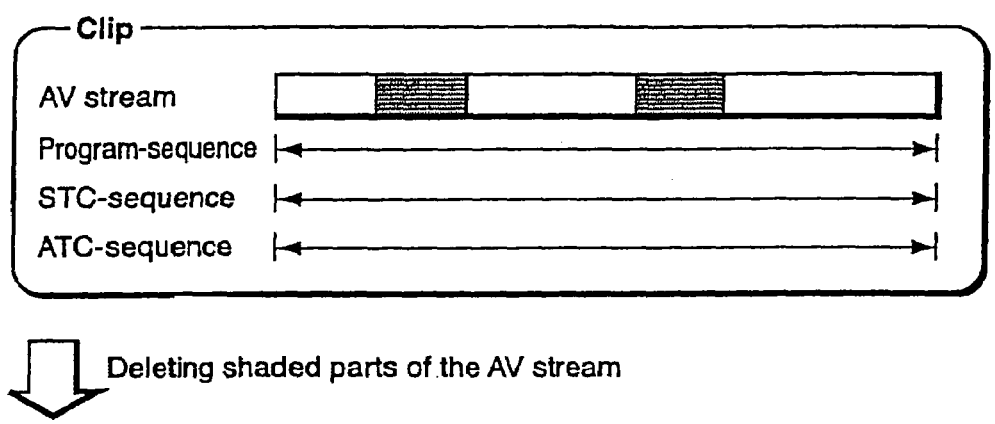
Deleting shaded parts of the AV stream
After editing
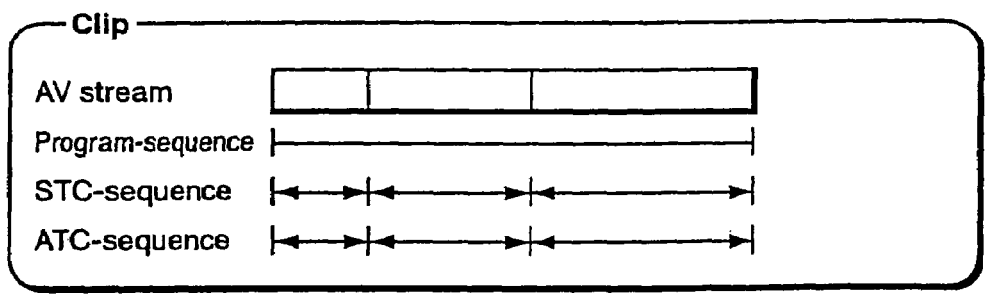

FIG. 40
Before editing
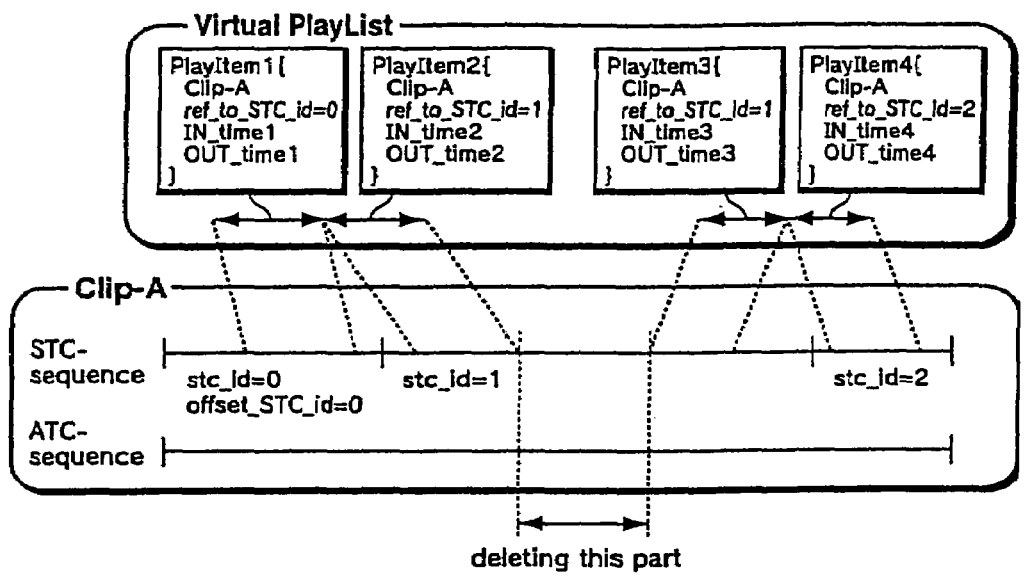
deleting this part
After editing: PlayItem3 and PlayItem4 do not change.
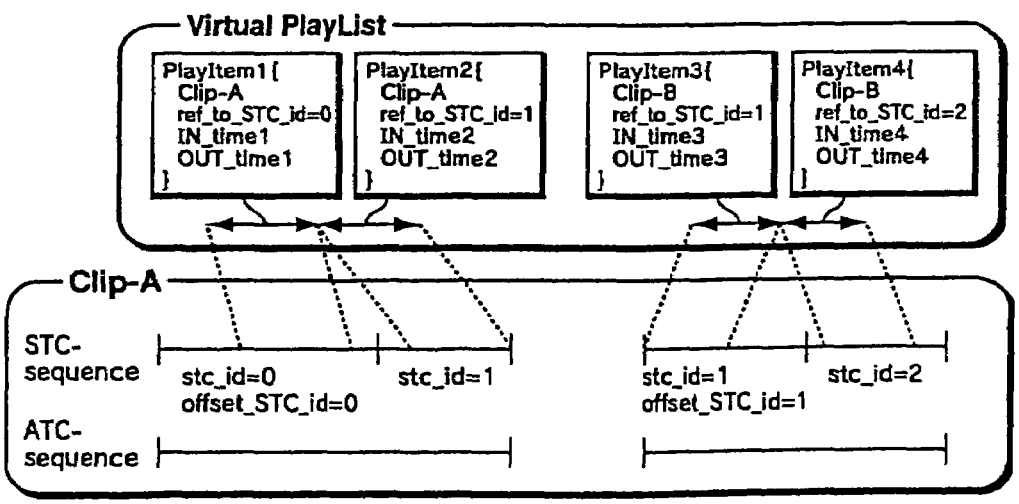

FIG. 41
Before editing
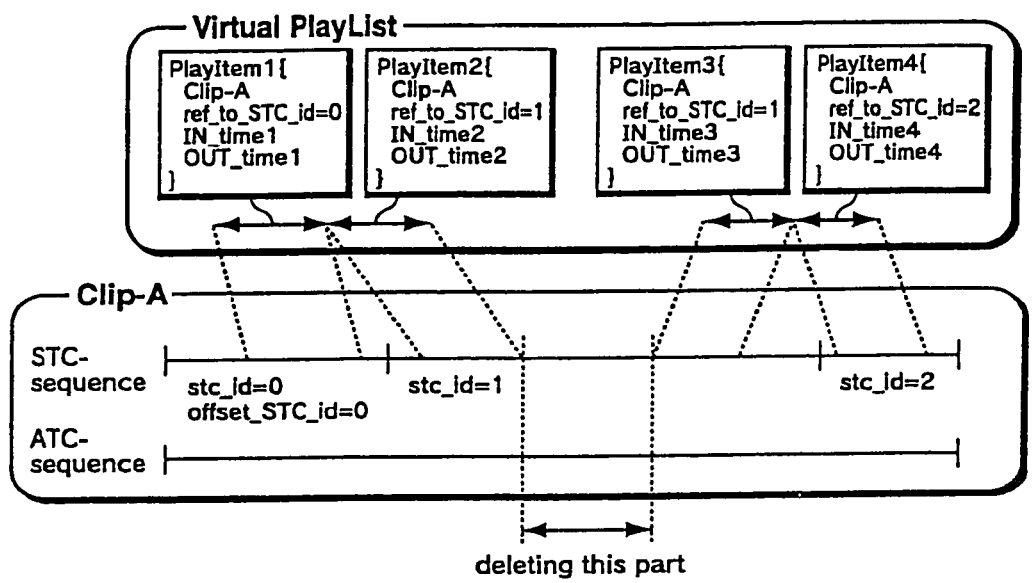
deleting this part
After editing: PlayItem3 and PlayItem4 change.
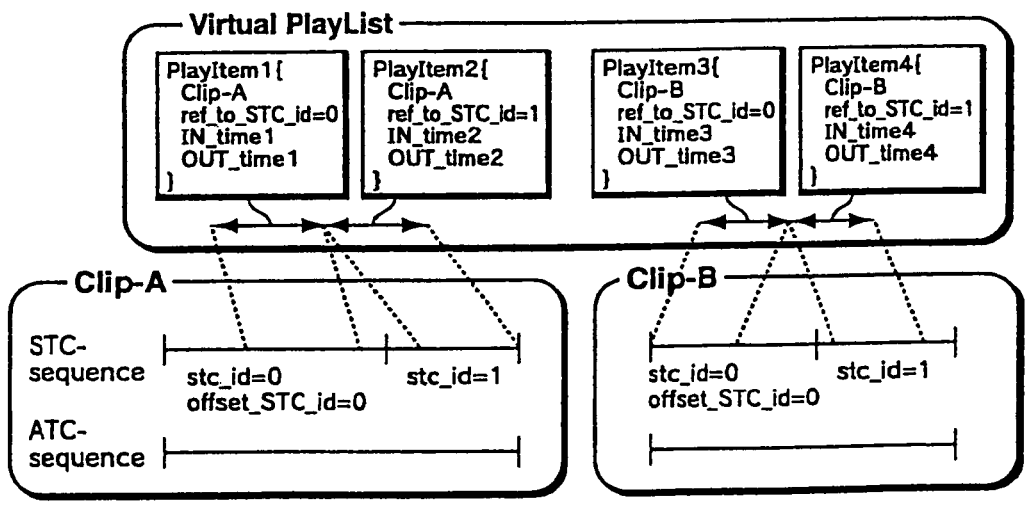

FIG. 42
Before editing
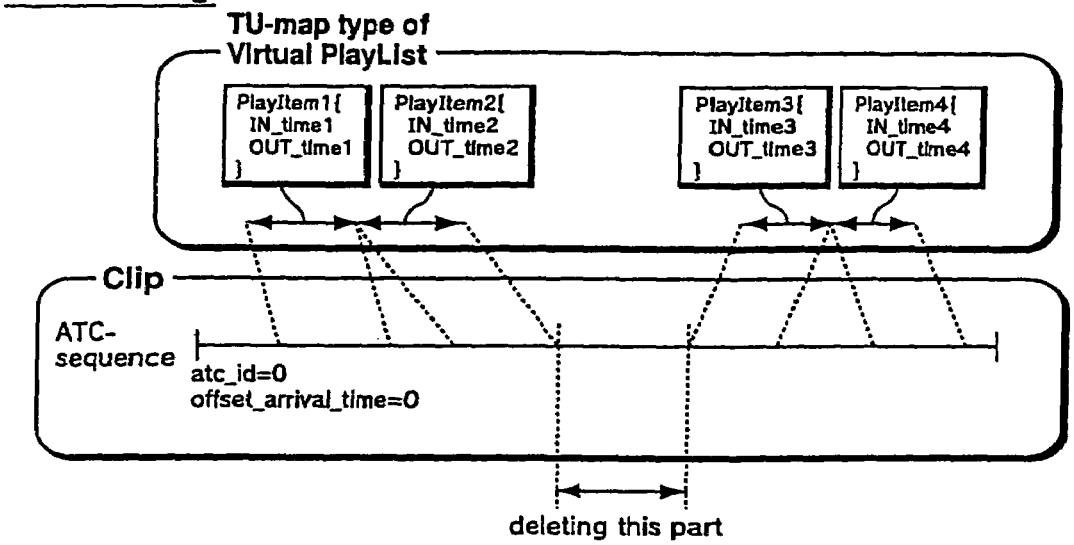
deleting this part
After editing
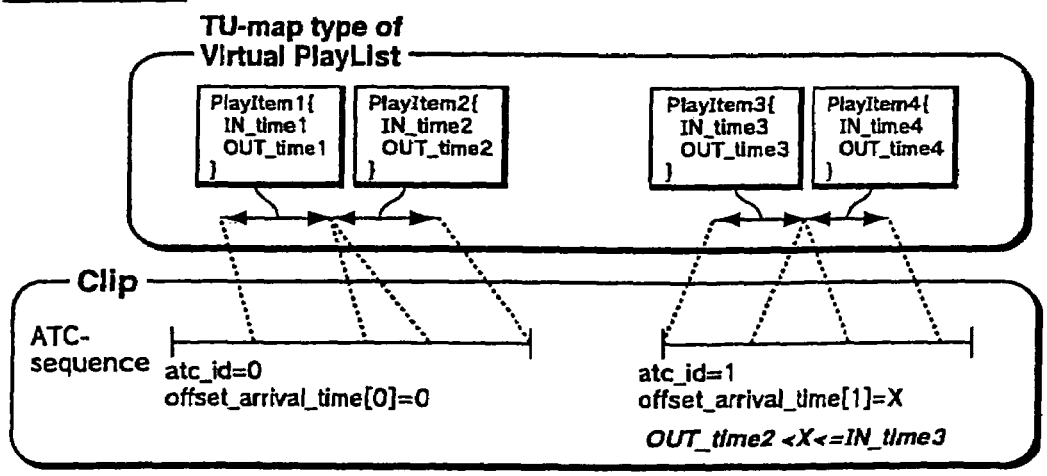

F I G. 57
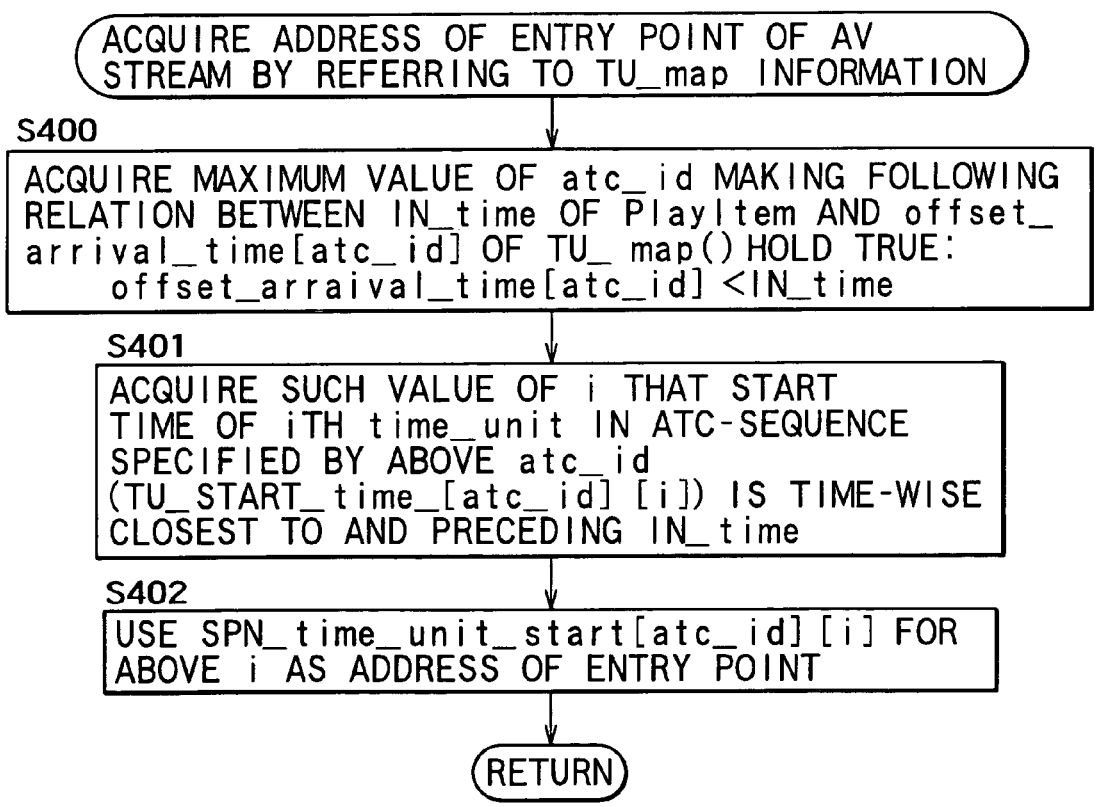

The ATC-sequence is continuous through the STC-sequence1 to the STC-sequence2.

F I G. 64
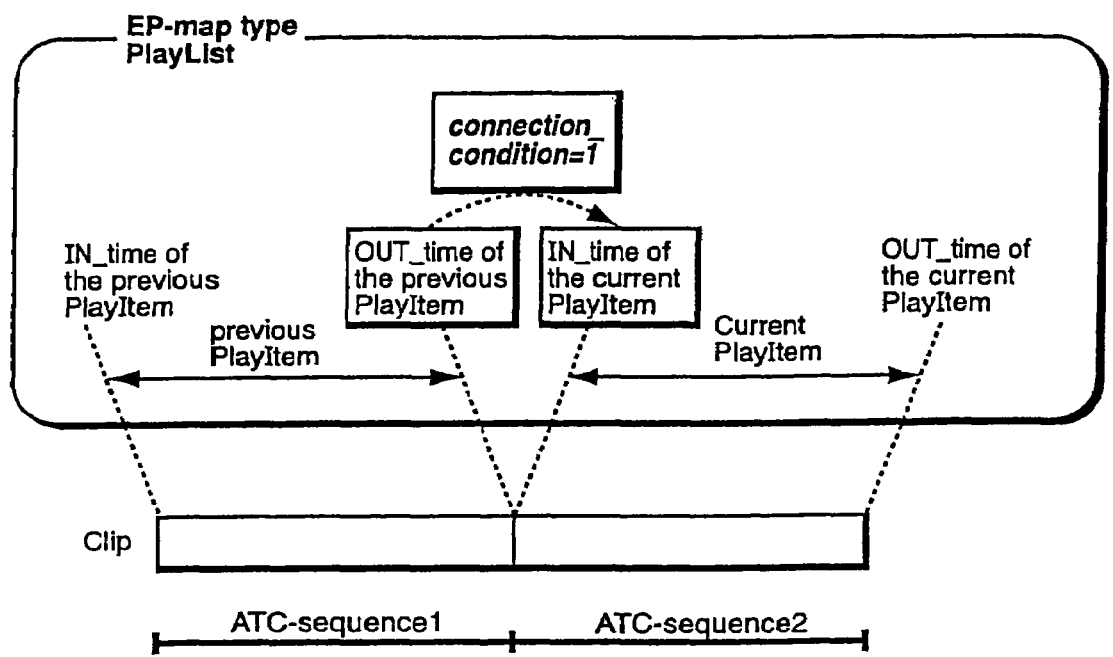

F I G. 66
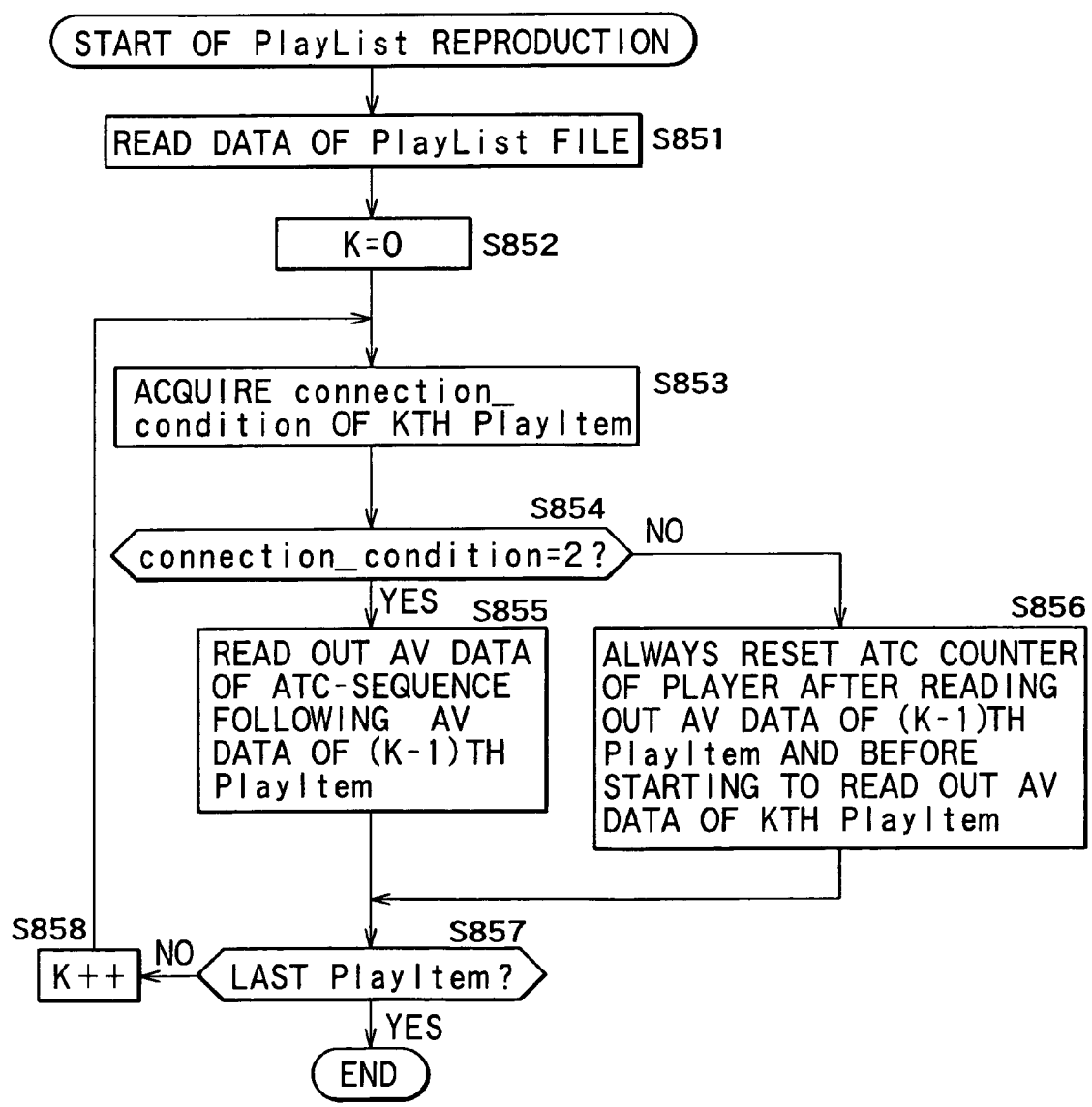

DATA RECORDING APPARATUS FOR MANAGING CONTENT WHEN CONTENT IS DELETED

TECHNICAL FIELD

In general, the present invention relates to a data recording apparatus. More particularly, the present invention relates to a data recording apparatus capable of properly managing data stored on a recording medium and reproduction information even if the data stored on the recording medium is edited.

BACKGROUND ART

In recent years, a variety of optical disks have been proposed as disk-type information recording media removable from a recording/reproduction apparatus. Such recordable optical disks are proposed as media having a large storage capacity of several gigabytes and highly expected as media for recording an AV (Audio Visual) signal such as a video signal. Sources supplying digital AV signals to be recorded onto such a recordable optical disk include a CS digital satellite broadcasting station as well as a BS digital broadcasting station and, in the future, a proposed ground wave television broadcasting station.

In general, digital video signals supplied by these sources are subjected to picture compression normally adopting an MPEG (Moving Picture Experts Group)-2 technique. A recording-apparatus for recording the signals has a predetermined recording rate unique to the apparatus. When a digital video signal generated by a digital broadcasting station is recorded onto the conventional consumer image storing media, the digital video signal is decoded and then subjected to a band-limiting process if an analog recording technique is adopted. If a digital recording technique is adopted, on the other hand, the digital video signal is once decoded and then recoded at a recording rate peculiar to the recording apparatus by adoption of an encoding technique. Representatives of the digital recording technique include an MPEG1 video technique, an MPEG2 video technique and a DV (Digital Video) technique.

With such recording techniques, however, a supplied bit stream is decoded once before being subjected to band-limitation and recoding processes so that the picture quality deteriorates. If a transmission rate of an input digital signal completing picture compression does not exceed a recording rate of a recording/reproduction apparatus in an operation to record the digital picture, in order to minimize deteriorations in picture quality, it is possible to adopt a method to record the supplied video stream as it is without carrying out decoding and recoding processes on the input digital signal. If the transmission rate of the input digital signal exceeds the recording rate of a disk used as the recording medium, on the other hand, the digital signal needs td be decoded by the recording/reproduction apparatus and then recoded so that the transmission rate becomes lower than an upper limit of the recording rate before the signal is stored in the recording medium.

In the case of a digital-signal transmission adopting a variable rate technique whereby the digital signal is transmitted at a bit rate varying from time to time, a disk recording apparatus capable of recording data, which is temporarily stored in a buffer, in a burst operation is capable of utilizing the storage capacity of a disk used as an information recording medium efficiently in comparison with a tape recording technique with a fixed recording rate due to a fixed rotational speed of a rotary head.

As described above, in the future where the digital broadcasting is most popular, there will be a predicted demand for a recording/reproduction apparatus using a disk as a recording medium for storing a broadcasted signal as a digital signal without any processing including decoding and recoding processes in the same way as a data streamer.

As explained above, as the storage capacity of a recording medium increases, the recording medium can be used for storing a larger amount of data such as video and audio data of a program. Thus, a disk can be used for recording a number of programs. In consequence, the user needs to carry out operations such as editing to watch only desired programs selected from a number of programs recorded on the disk.

If an editing operation is carried out, however, it becomes difficult to properly manage data recorded on the disk and reproduced information.

DISCLOSURE OF INVENTION

It is thus an object of the present invention addressing the problems described above to provide a data recording apparatus capable of properly managing data stored on a recording medium and reproduced information even if description of the data stored on a recording medium is edited.

According to the present invention, there is provided a first data recording apparatus, characterized by including;

a first detection means for detecting reference-time information of a data stream;

a first generation means for generating:

first continuity information representing continuity of first time information generated on the basis of a detection result produced by the first detection means;

second continuity information representing continuity of second time information showing arrival times of packets;

identification information for identifying a first packet array including no discontinuity of the first time information; and an offset value of the identification information added for each second packet array including no discontinuity of the second time information; and a recording means for recording the first continuity information, the second continuity information and the offset value onto an information recording medium.

It is possible to provide a configuration wherein the first continuity information represents an address of a packet at a start of a time axis for the first time information in a recorded packet array.

It is possible to provide a configuration wherein the second continuity information represents an address of a packet at a start of a time axis for the second time information in a recorded packet array.

It is possible to provide a configuration wherein the first data recording apparatus is further provided with a management means for managing data in such a way that the first packet array does not extend over a boundary of the second packet array.

It is possible to provide a configuration in which the first data recording apparatus is further provided second detection means for detecting a change point of program contents included in the data stream; and acquisition means for acquiring an address of a packet corresponding to a change point of program contents in a recorded packet array on the basis of a detection result produced by the second detection means, wherein the recording means also records an address of a packet corresponding to a change point acquired by the acquisition means onto the information recording medium.

It is possible to provide a configuration wherein the first data recording apparatus is further provided with management means for managing data in such a way that, in a recorded packet array, one program-sequence may extend over a boundary between a first packet array and a second packet array where the program-sequence is an array of packets with fixed program contents.

It is possible to provide a configuration wherein the first data recording apparatus is further provided with second generation means for generating a presentation start time and a presentation end time for each array of first packets, wherein the recording means records the presentation start time and the presentation end time, which are generated by the second generation means.

It is possible to provide a configuration wherein the recording means is further used for recording a map showing a relation between times of display-time information and data addresses.

A first data recording method of the present invention, characterized by including:
- a first detection step of detecting reference-time information of a data stream;
- a generation step of generating:
  - first continuity information representing continuity of first time information generated on the basis of a detection result produced in processing carried out at the first detection step;
  - second continuity information representing continuity of second time information showing arrival times of packets;
  - identification information for identifying a first packet array including no discontinuity of the reference-time information; and
  - an offset value of the identification information added for each second packet array including no discontinuity of the second time information; and
- a recording step of recording the first continuity information, the second continuity information and the offset value onto an information recording medium.

A first program storage medium of the present invention is characterized in that the medium is used for storing a program, characterized by including:
- a first detection step of detecting reference-time information of a data stream;
- a generation step of generating:
  - first continuity information representing continuity of first time information generated on the basis of a detection result produced in processing carried out at the first detection step;
  - second continuity information representing continuity of second time information showing arrival times of packets;
  - identification information for identifying a first packet array including no discontinuity of the reference-time information; and
  - an offset value of the identification information added for each second packet array including no discontinuity of the second time information; and
- a recording step of recording the first continuity information, the second continuity information and the offset value onto an information recording medium.

A first program of the present invention to be executed by a computer to control a data recording apparatus for recording a data stream including an array of packets into an information recording medium, characterized by including:
- a first detection step of detecting reference-time information of the data stream;
- a generation step of generating:
  - first continuity information representing continuity of first time information generated on the basis of a detection result produced in processing carried out at the first detection step;
  - second continuity information representing continuity of second time information showing arrival times of packets;
  - identification information for identifying a first packet array including no discontinuity of the reference-time information; and
  - an offset value of the identification information added for each second packet array including no discontinuity of the second time information; and
- a recording step of recording the first continuity information, the second continuity information and the offset value onto an information recording medium.

A first data recording medium provided of the present invention is characterized in that the medium is used for storing:
- first continuity information representing continuity of first time information generated on the basis of reference-time information of a data stream;
- second continuity information representing continuity of second time information showing arrival times of packets;
- identification information for identifying a first packet array including no discontinuity of the reference-time information; and
- an offset value of the identification information added for each second packet array including no discontinuity of the second time information.

A first data reproduction apparatus of the present invention is characterized by including:
- reproduction means for reproducing:
  - first continuity information representing continuity of first time information generated on the basis of reference-time information of a data stream stored in an information recording medium;
  - second continuity information representing continuity of second time information showing arrival times of packets;
  - identification information for identifying a first packet array including no discontinuity of the first time information; and
  - an offset value of the identification information added for each second packet array including no discontinuity of the second time information; and
- control means for controlling reproduction of a data stream from the information recording medium on the basis of the reproduced information.

It is possible to provide a configuration wherein the reproduction means is further used for reproducing a map showing a relation between times of display-time information and data addresses.

A first data reproduction method of the present invention is characterized by including:
- a reproduction step of reproducing:
  - first continuity information representing continuity of first time information on the basis of reference-time information of a data stream stored in an information recording medium;

second continuity information representing continuity of second time information showing arrival times of packets;

identification information for identifying a first packet array including no discontinuity of the first time information; and an offset value of the identification information added for each second packet array including no discontinuity of the second time information; and a control step of controlling reproduction of a data stream from the information recording medium on the basis of information reproduced in processing carried out at the reproduction step.

A second program storage medium of the present invention is characterized by including:

a reproduction step of reproducing:

first continuity information representing continuity of first time information on the basis of reference-time information of a data stream stored in an information recording medium;

second continuity information representing continuity of second time information showing arrival times of packets;

identification information for identifying a first packet array including no discontinuity of the first time information; and an offset value of the identification information added for each second packet array including no discontinuity of the second time information; and a control step of controlling reproduction of a data stream from the information recording medium on the basis of information reproduced in processing carried out at the reproduction step.

A second program of the present invention to be executed by a computer to control a data reproduction apparatus for reproducing a data stream including an array of packets from an information recording medium is characterized by including:

a reproduction step of reproducing:

first continuity information representing continuity of first time information generated on the basis of reference-time information of a data stream stored in the information recording medium;

second continuity information representing continuity of second time information showing arrival times of packets;

identification information for identifying a first packet array including no discontinuity of the first time information; and an offset value of the identification information added for each second packet array including no discontinuity of the second time information; and a control step of controlling reproduction of a data stream from the information recording medium on the basis of information reproduced in processing carried out at the reproduction step.

A second data recording apparatus of the present invention is characterized by including:

first acquisition means for acquiring the address of a packet at the start of each packet array including no discontinuity of arrival-time information;

second acquisition means for acquiring offset time information of a packet array; and recording means for recording the address of the packet acquired by the first acquisition means and the offset time information acquired by the second acquisition means onto an information recording medium.

The packet array may be an ATC-sequence, the address of the packet may be referred to as SPN_ATC_start and the start time may be referred to as offset_arrival_time.

It is possible to provide a configuration wherein the recording means is further used for recording a map showing a relation between times of arrival-time information and data addresses.

A second data recording method of the present invention is characterized by including:

a first acquisition step of acquiring the address of a packet at the start of each packet array including no discontinuity of arrival-time information;

a second acquisition step of acquiring offset time information of the packet array; and a recording step of recording the address of the packet acquired in processing carried out at the first acquisition step and the offset time information acquired in processing carried out at the second acquisition step onto an information recording medium.

A third program storage medium of the present invention is characterized by including:

a first acquisition step of acquiring the address of a packet at the start of each packet array including no discontinuity of arrival-time information;

a second acquisition step of acquiring offset time information of the packet array; and a recording step of recording the address of the packet acquired in processing carried out at the first acquisition step and the offset time information acquired in processing carried out at the second acquisition step onto an information recording medium.

A third program of the present invention to be executed by a computer is characterized by including:

a first acquisition step of acquiring the address of a packet at the start of each packet array including no discontinuity of arrival-time information;

a second acquisition step of acquiring offset time information of the packet array; and a recording step of recording the address of the packet acquired in processing carried out at the first acquisition step and the offset time information acquired in processing carried out at the second acquisition step onto an information recording medium.

A second data reproduction apparatus of the present invention is characterized by including:

reproduction means for reproducing the address of a packet at the start of each packet array including no discontinuity of arrival-time information and offset time information of the packet array; and control means for controlling reproduction of a data stream from an information recording medium on the basis of the reproduced information.

It is possible to provide a configuration wherein the second data reproduction apparatus is further used for reproducing a map showing a relation between times of arrival-time information and data addresses.

It is possible to provide a configuration wherein the second data reproduction apparatus is used for executing the steps of:

finding a packet array having a packet arrival time at a reproduction start time, which is not earlier than offset time information of the packet array;

obtaining a time of the entry point not later than the packet arrival time at a reproduction start point on the packet array; and reproducing a data stream from an address associated with the time of the entry point.

A second data reproduction method of the present invention is characterized by including:
- a reproduction step of reproducing the address of a packet at the start of each packet array including no discontinuity of arrival-time information and offset time information of the packet array; and
- a control step of controlling reproduction of a data stream from an information recording medium on the basis of the reproduced information.

A fourth program storage medium of the present invention is characterized by including:
- a reproduction step of reproducing the address of a packet at the start of each packet array including no discontinuity of arrival-time information and offset time information of the packet array; and
- a control step of controlling reproduction of a data stream from an information recording medium on the basis of the reproduced information.

A fourth program of the present invention is characterized in that the program including:
- a reproduction step of reproducing the address of a packet at the start of each packet array including no discontinuity of arrival-time information and offset time information of the packet array; and
- a control step of controlling reproduction of a data stream from an information recording medium on the basis of the reproduced information.

A second data recording medium of the present invention is characterized in that the medium is used for storing the address of a packet at the start of each packet array including no discontinuity of arrival-time information and storing offset time information of the arrival-time information for each packet array.

A first data editing apparatus of the present invention is characterized by including:
- a controller for managing a data stream on the basis of a first packet array including no discontinuity of reference-time information and a second packet array including no discontinuity of arrival-time information; and a user interface for issuing a command to delete a portion of a data stream,
- wherein, when a command to delete a portion of a data stream is issued, the controller executes control to add an offset value of identification information for identifying the first packet array for each second packet array so that the identification information for the first packet array does not change.

It is possible to provide a configuration wherein the first data editing apparatus is further used for controlling a map showing a relation between times of display-time information and data addresses.

It is possible to provide a configuration wherein the first data editing apparatus is used for executing the steps of:
- finding a first display time of a first entry point having a display-time value coinciding with or preceding a display time of a deletion end point;
- finding a second display time of a second entry point having a display time earlier than the value of the first display time by at least a predetermined period of time; and
- controlling deletion of a portion preceding a data address associated with the second display time.

It is possible to provide a configuration wherein the first data editing apparatus is used for executing the steps of:
- finding a first display time of a first entry point having a display-time value coinciding with or succeeding a display time of a deletion start point;
- finding a second display time of a second entry point having a display time later than the value of the first display time; and
- controlling deletion of a portion succeeding a data address associated with the second display time.

A first data editing method of the present invention is characterized in that, when a command to delete a portion of a data stream is issued, a controller executes control to add an offset value of identification information for identifying a first packet array for each second packet array so that the identification information for the first packet array does not change.

A fifth program storage medium of the present invention is characterized in that the medium is used for storing a program whereby, when a command to delete a portion of a data stream is issued, control is executed to add an offset value of identification information for identifying a first packet array for each second packet array so that the identification information for the first packet array does not change.

A fifth program of the present invention is characterized in that, when a command to delete a portion of a data stream is issued, the program implements control to add an offset value of identification information for identifying a first packet array for each second packet array so that the identification information for the first packet array does not change.

A second data editing apparatus of the present invention is characterized by including:
- a controller for managing a data stream on the basis of a packet array including no discontinuity of arrival-time information showing an arrival time of each packet; and
- a user interface for issuing a command to delete a portion of a data stream,
- wherein, when a command to delete a portion of a data stream is issued, the controller executes control to add a start time of a time axis of the arrival-time information for each packet array.

It is possible to provide a configuration wherein the second data editing apparatus is further used for controlling a map showing a relation between times of arrival-time information and data addresses.

It is possible to provide a configuration wherein the second data editing apparatus is used for executing the steps of:
- finding a packet array with a packet arrival time at a deletion start point coinciding with or succeeding the start time of the time axis of the arrival-time information;
- obtaining an entry point at a time coinciding with or succeeding the packet arrival time at the deletion start point on the time axis of the arrival-time information of the packet array; and
- controlling deletion of a portion succeeding an address associated with the time of the entry point.

It is possible to provide a configuration wherein the second data editing apparatus is used for executing the steps of:
- finding a packet array with a packet arrival time at a deletion end point coinciding with or succeeding the start time of the time axis of the arrival-time information;
- obtaining an entry point at a time coinciding with or preceding the packet arrival time at the deletion start point on the time axis of the arrival-time information of the packet array; and
- controlling deletion of a portion preceding an address associated with the time of the entry point.

A second data editing method of the present invention is characterized in that, when a command to delete a portion of a data stream is issued, a controller executes control to add a start time of a time axis of arrival-time information for each packet array.

A sixth program storage medium of the present invention is characterized in that the medium is used for storing a program whereby, when a command to delete a portion of a data stream is issued, control is executed to add a start time of a time axis of arrival-time information for each packet array.

A sixth program of the present invention is characterized in that, when a command to delete a portion of a data stream is issued, the program implements control to add a start time of a time axis of arrival-time information for each packet array.

A third data recording apparatus of the present invention is characterized by including:
  creation means, which is used for creating:
    first continuity information representing continuity of first time information and second continuity information representing continuity of second time information when first map information is used as map information showing a relation between time information of a data stream including an array of packets and their addresses; and
    the second continuity information when second map information is used as the map information; and
  recording means, which is used for recording:
    the first continuity information and the second continuity information, which are created by the creation means, when the first map information is used; and the second continuity information created by the creation means when the second map information is used.

The first map information may be referred to as EP_map and the second map information may be referred to as TU_map.

It is possible to provide a configuration wherein, in an editing process, the recording means updates the first continuity information and the second continuity information when the first map information is used and updates the second continuity information when the second map information is used.

A third data recording method of the present invention is characterized by including:
  a creation step, which is executed for creating:
    first continuity information representing continuity of first time information and second continuity information representing continuity of second time information when first map information is used as map information showing a relation between time information of a data stream including an array of packets and their addresses; and
    the second continuity information when second map information is used as the map information; and a recording step, which is executed for recording:
    the first continuity information and the second continuity information, which are created in processing carried out at the creation step, when the first map information is used; and
    the second continuity information created in processing carried out at the creation step when the second map information is used.

A seventh program storage medium of the present invention is characterized by including:
  a creation step, which is executed for creating:
    first continuity information representing continuity of first time information and second continuity information representing continuity of second time information when first map information is used as map information showing a relation between time information of a data stream including an array of packets and their addresses; and
    the second continuity information when second map information is used as the map information; and a recording step, which is executed for recording:
    the first continuity information and the second continuity information, which are created in processing carried out at the creation step, when the first map information is used; and
    the second continuity information created in processing carried out at the creation step when the second map information is used.

A seventh program of the present invention to be executed by a computer is characterized by including:
  a creation step, which is executed for creating:
    first continuity information representing continuity of first time information and second continuity information representing continuity of second time information when first map information is used as map information showing a relation between time information of a data stream including an array of packets and their addresses; and
    the second continuity information when second map information is used as the map information; and a recording step, which is executed for recording:
    the first continuity information and the second continuity information, which are created in processing carried out at the creation step, when the first map information is used; and
    the second continuity information created in processing carried out at the creation step when the second map information is used.

A fourth data recording apparatus of the present invention is characterized in that the apparatus including:
  determination means for determining a type of an operation to record a data stream including an array of packets;
  control unit, which is used for creating:
    first time-axis information representing a time axis of first time information and second time-axis information representing a time axis of second time information if the determination means determines that the type of the recording operation is a first type;
    the second time-axis information if the determination means determines that the type of the recording operation is a second type; and
  recording unit, which is used for recording:
    the first continuity information and the second continuity information if the type of the recording operation is determined to be the first type; and
    the second continuity information if the type of the recording operation is determined to be the second type.

It is possible to provide a configuration wherein the control unit creates:
  first map information based on the time information of a data stream and recording addresses if the type of the recording operation is determined to be the first type; and
  second map information based on the arrival-time information of the packets and recording addresses if the type of the recording operation is determined to be the second type; whereas
  the recording unit records the first map information or second map information.

It is possible to provide a configuration wherein the first time-axis information is time-axis information of time information generated on the basis of reference-time information of a data stream and the second time-axis information is time-axis information of time information generated on the basis of arrival times of the packets.

A fourth data recording method of the present invention is characterized by including:
- a determination step of determining a type of an operation to record a data stream including an array of packets;
- a control step, which is executed for creating:
  - first time-axis information representing a time axis of first time information and second time-axis information representing a time axis of second time information if the type of the recording operation is determined to be a first type in processing carried out at the determination step;
  - the second time-axis information if the type of the recording operation is determined to be a second type in processing carried out at the determination step; and
- a recording step, which is executed for recording:
  - the first continuity information and the second continuity information if the type of the recording operation is determined to be the first type; and
  - the second continuity information if the type of the recording operation is determined to be the second type.

An eighth program storage medium of the present invention is characterized in that the medium is used for storing a program including:
- a determination step of determining a type of an operation to record a data stream including an array of packets;
- a control step, which is executed for creating:
  - first time-axis information representing a time axis of first time information and second time-axis information representing a time axis of second time information if the type of the recording operation is determined to be a first type in processing carried out at the determination step;
  - the second time-axis information if the type of the recording operation is determined to be a second type in processing carried out at the determination step; and
- a recording step, which is executed for recording:
  - the first continuity information and the second continuity information if the type of the recording operation is determined to be the first type; and
  - the second continuity information if the type of the recording operation is determined to be the second type.

An eighth program of the present invention to be executed by a computer is characterized by including:
- a determination step of determining a type of an operation to record a data stream including an array of packets;
- a control step, which is executed for creating:
  - first time-axis information representing a time axis of first time information and second time-axis information representing a time axis of second time information if the type of the recording operation is determined to be a first type in processing carried out at the determination step;
  - the second time-axis information if the type of the recording operation is determined to be a second type in processing carried out at the determination step; and
- a recording step, which is executed for recording:
  - the first continuity information and the second continuity information if the type of the recording operation is determined to be the first type;
  - and the second continuity information if the type of the recording operation is determined to be the second type.

A data reproduction apparatus of the present invention is characterized by including:
- reproduction means for reproducing information showing whether or not a discontinuity of second time information referred to by arrival times of packets exists between a first packet array including no discontinuity of first time information referred to by reproduction times of a data stream and a second packet array, which follows the first packet array and includes no discontinuity of the first time information, from an information recording medium; and
- control means for controlling reproduction of data from the information recording medium on the basis of information reproduced by the reproduction means.

A data reproduction method of the present invention is characterized by including:
- a reproduction step of reproducing information showing whether or not a discontinuity of second time information referred to by arrival times of packets exists between a first packet array including no discontinuity of first time information referred to by reproduction times of a data stream and a second packet array, which follows the first packet array and includes no discontinuity of the first time information, from an information recording medium; and
- a control step of controlling reproduction of data from the information recording medium on the basis of information reproduced in processing carried out at the reproduction step.

A program storage medium of the present invention is characterized in that the medium is used for storing a program including:
- a reproduction step of reproducing information showing whether or not a discontinuity of second time information referred to by arrival times of packets exists between a first packet array including no discontinuity of first time information referred to by reproduction times of a data stream and a second packet array, which follows the first packet array and includes no discontinuity of the first time information, from an information recording medium; and
- a control step of controlling reproduction of data from the information recording medium on the basis of information reproduced in processing carried out at the reproduction step.

A program of the present invention to be executed by a computer for controlling a data reproduction apparatus for reproducing a data stream including an array of packets from an information recording medium is characterized by including:
- a reproduction step of reproducing information showing whether or not a discontinuity of second time information referred to by arrival times of the packets exists between a first packet array including no discontinuity of first time information referred to by reproduction times of the data stream and a second packet array, which follows the first packet array and includes no discontinuity of the first time information, from the information recording medium; and
- a control step of controlling reproduction of data from the information recording medium on the basis of information reproduced in processing carried out at the reproduction step.

A third data recording medium of the present invention is characterized in that the medium is used for storing information showing whether or not a discontinuity of second time information exists between a first packet array including no discontinuity of first time information and a second packet array, which follows the first packet array and includes no discontinuity of the first time information.

A sixth data recording apparatus of the present invention is characterized in that the apparatus includes recording means for recording information indicating existence of a discontinuity of time information referred to by arrival times of packets in the event of an operation of a recording pause/pause release in the course of a recording operation.

A sixth data recording method of the present invention is characterized in that the method includes a recording step of recording information indicating existence of a discontinuity of time information referred to by arrival times of packets in the event of an operation of a recording pause/pause release in the course of a recording operation.

A tenth program storage medium of the present invention is characterized in that the medium is used for storing a program includes a recording step of recording information indicating existence of a discontinuity of time information referred to by arrival times of packets in the event of an operation of a recording pause/pause release in the course of a recording operation.

A tenth program of the present invention to be executed by a computer for controlling a data recording apparatus for recording a data stream includes an array of packets onto an information recording medium is characterized in that the program including a recording step of recording information indicating existence of a discontinuity of time information referred to by arrival times of the packets in the event of an operation of a recording pause/pause release in the course of a recording operation.

A fourth data recording medium of the present invention is characterized in that the medium is used for recording information indicating existence of a discontinuity of time information referred to by arrival times of packets in the event of an operation of a recording pause/pause release in the course of a recording operation.

A third data reproduction apparatus of the present invention is characterized by including:
  reproduction means for reproducing information showing whether or not a discontinuity of second time information referred to by arrival times of packets exists between a first packet array including no discontinuity of first time information and a second packet array following the first packet array and including no discontinuity of the first time information; and
  control means for controlling reproduction of a data stream from an information recording medium on the basis of the information.

It is possible to provide a configuration in which the third data reproduction apparatus is further provided with generation means for generating reference time information referred to by the second time information wherein the generation means generates the second packet array after the first packet array; and
  the control means reproduces the first and second packet arrays on the basis of continuous values of the reference time information if no discontinuity of the second time information exists between the first packet array and the second packet array.

It is possible to provide a configuration in which the third reproduction apparatus is further provided with generation means for generating reference time information referred to by the second time information wherein the generation means generates the second packet array after the first packet array; and
  the control means resets a clock value of the reference time information prior to reproduction of the second packet array if a discontinuity of the second time information exists between the first packet array and the second packet array.

A third data reproduction method of the present invention is characterized in that the method including the steps of:
  reproducing information showing whether or not a discontinuity of second time information referred to by arrival times of packets exists between a first packet array including no discontinuity of first time information and a second packet array following the first packet array and including no discontinuity of the first time information; and
  controlling reproduction of a data stream from an information recording medium on the basis of the information.

An eleventh program storage medium of the present invention is characterized in that the medium is used for storing a program including the steps of:
  reproducing information showing whether or not a discontinuity of second time information referred to by arrival times of packets exists between a first packet array including no discontinuity of first time information and a second packet array following the first packet array and including no discontinuity of the first time information; and
  controlling reproduction of a data stream from an information recording medium on the basis of the information.

An eleventh program of the present invention to be executed by a computer for controlling a data reproduction apparatus for reproducing a data stream including an array of packets from an information recording medium used for storing a data stream is characterized in that the program including the steps of:
  reproducing information showing whether or not a discontinuity of second time information referred to by arrival times of the packets exists between a first packet array including no discontinuity of first time information and a second packet array following the first packet array and including no discontinuity of the first time information; and
  controlling reproduction of a data stream from the information recording medium on the basis of the information.

A fourth data reproduction apparatus of the present invention is characterized by including:
  generation means for generating reference time information referred to by time information showing arrival times of packets;
  reproduction means for reproducing a second packet array, which includes no discontinuity of first time information and follows a first packet array including no discontinuity of the first time information, after the first packet array; and
  control means, which is used for resetting a clock value of the reference time information prior to reproduction of the second packet array if a discontinuity of the time information showing arrival times of the packets exists between the first packet array and the second packet array.

A fourth data reproduction method of the present invention is characterized by including:
  a generation step of generating reference time information referred to by time information showing arrival times of packets;
  a reproduction step of reproducing a second packet array, which includes no discontinuity of first time information and follows a first packet array including no discontinuity of the first time information, after the first packet array; and a control step, which is executed for resetting a clock value of the reference time information prior to reproduction of the second packet array if a discontinuity of the time information showing arrival times of the packets exists between the first packet array and the second packet array.

A twelfth program storage medium of the present invention is characterized in that the medium is used for storing a program including:

a generation step of generating reference time information referred to by time information showing arrival times of packets;

a reproduction step of reproducing a second packet array, which includes no discontinuity of first time information and follows a first packet array including no discontinuity of the first time information, after the first packet array; and a control step, which is executed for resetting a clock value of the reference time information prior to reproduction of the second packet array if a discontinuity of the time information showing arrival times of the packets exists between the first packet array and the second packet array.

A twelfth program of the present invention to be executed by a computer for controlling a data reproduction apparatus for reproducing a data stream including an array of packets from an information recording medium used for storing a data stream is characterized in that the program including:

a generation step of generating reference time information referred to by time information showing arrival times of the packets;

a reproduction step of reproducing a second packet array, which includes no discontinuity of first time information and follows a first packet array including no discontinuity of the first time information, after the first packet array; and a control step, which is executed for resetting a clock value of the reference time information prior to reproduction of the second packet array if a discontinuity of the time information showing arrival times of the packets exists between the first packet array and the second packet array.

In the first data recording apparatus of the present invention, the following pieces of information are recorded onto an information recording medium:

first continuity information representing continuity of first time information;

second continuity information representing continuity of second time information showing arrival times of packets; and an offset value of the identification information added for each second packet array including no discontinuity of the second time information.

In the first data reproduction apparatus of the present invention, reproduction of a data stream from an information recording medium is controlled on the basis of the following pieces of information, which are also reproduced from the information recording medium:

first continuity information representing continuity of first time information generated on the basis of reference-time information of a data stream stored in an information recording medium;

second continuity information representing continuity of second time information showing arrival times of packets;

identification information for identifying a first packet array including no discontinuity of the first time information; and an offset value of the identification information added for each second packet array including no discontinuity of the second time information.

In the second data recording apparatus of the present invention, addresses of packets and offset time information are recorded on an information recording medium.

In the second data reproduction apparatus of the present invention, reproduction of a data stream from an information recording medium is controlled on the basis of the following pieces of information, which are also reproduced from the information recording medium: the address of a packet at the start of each packet array including no discontinuity of arrival-time information; and offset time information of the packet array.

In the first data editing apparatus of the present invention, when a command to delete a portion of a data stream is issued, control is executed to add an offset value of identification information for identifying a first packet array for each second packet array so that the identification information for the first packet array does not change.

In the second data editing apparatus of the present invention, when a command to delete a portion of a data stream is issued, control is executed to add a start time of a time axis of arrival-time information for each packet array.

In the third data recording apparatus of the present invention, when first map information is determined to be used as map information, first continuity information representing continuity of first time information and second continuity information representing continuity of second time information are created and first map information is generated on the basis of the first continuity information and the second continuity information and then recorded; and when second map information is determined to be used as map information, the second continuity information is created and second map information is generated on the basis of the second continuity information and then recorded.

In the fourth data recording apparatus of the present invention, when a first recording type is determined to be used as the type of a recording operation, a data stream is analyzed, first continuity information representing continuity of first time information as well as second continuity information representing continuity of second time information are created and first map information is generated on the basis of the first continuity information and the second continuity information and then recorded; and when a second recording type is determined to be used as the type of a recording operation, the second continuity information is created and second map information is generated on the basis of the second continuity information and then recorded.

In the fifth data recording apparatus of the present invention, an operation is carried out to record information indicating whether or not a discontinuity of second time information exists between a first packet array including no discontinuity of first time information and a second packet array following the first packet array and including no discontinuity of the first time information.

In the sixth data recording apparatus of the present invention, a process is carried out to record information indicating existence of a discontinuity of time information referred to by arrival times of packets in the event of an operation of a recording pause/pause release in the course of a recording operation.

In the third data reproduction apparatus of the present invention, an operation is carried out to reproduce information indicating whether or not a discontinuity of second time information referred to by arrival times of packets exists between a first packet array including no discontinuity of first time information and a second packet array following the first packet array and including no discontinuity of the first time information.

In the fourth data reproduction apparatus of the present invention, a clock value of reference time information is reset prior to reproduction of a second packet array if a discontinuity of time information showing arrival times of packets exists between a first packet array and the second packet array.

BRIEF DESCRIPTION OF DRAWINGS

FIG. 4 is a diagram showing the syntax of source_packet.

FIG. 5 is a diagram showing the syntax of TP_extra_header( ).

FIG. 8 is a diagram showing the syntax of a Clip information file.

FIG. 11 is an explanatory diagram showing a continuous STC interval.

FIG. 12 is an explanatory diagram showing a relation between STC discontinuities and STC-sequences.

FIG. 13 is a diagram showing the syntax of SequenceInfo( ).

FIG. 15 is a diagram showing the syntax of ProgramInfo( ).

FIG. 16 is a diagram showing the syntax of StreamCodingInfo( ).

FIG. 17 is an explanatory diagram showing stream_coding_type.

FIG. 18 is an explanatory diagram showing video_format.

FIG. 19 is an explanatory diagram showing frame_rate.

FIG. 20 is an explanatory diagram showing display_aspect_ratio.

FIG. 21 is an explanatory diagram showing audio presentation_type.

FIG. 22 is an explanatory diagram showing sampling_frequency.

FIG. 23 is a diagram showing the syntax of CPI( ).

FIG. 24 is an explanatory diagram showing EP_map.

FIG. 26 is an explanatory diagram showing the syntax of TU_map.

FIG. 27 is a diagram showing the syntax of the PlayList file.

FIG. 28 is a diagram showing the syntax of PlayList( ).

FIG. 33 is a diagram showing the syntax of PlayItem( ).

FIG. 38 is an explanatory diagram showing ATC-sequences, which are formed in Clip when data of a Clip AV stream is partially deleted.

FIG. 39 is an explanatory diagram showing a relation, which is established among an ATC-sequence, an STC-sequence and a program-sequence when data of a Clip AV stream is partially deleted.

FIG. 40 is an explanatory diagram showing a relation, which is established between Clip and PlayList when a portion of Clip AV stream having EP_map CPI is deleted.

FIG. 41 is an explanatory diagram showing a case in which a Clip file is split into two parts when a portion of Clip AV stream having EP_map CPI is deleted.

FIG. 42 is an explanatory diagram showing a relation, which is established between Clip and PlayList when a portion of Clip AV stream having TU_map CPI is deleted

FIG. 57 shows an explanatory flowchart representing details of processing at a step S303 of the flowchart shown in FIG. 56.

FIG. 64 is an explanatory diagram showing a case in which TU_map-type PlayList is split into two PlayItem objects on a boundary between two ATC-sequences.

FIG. 66 shows a flowchart representing reproduction of EP_map-type PlayList.

BEST MODE FOR CARRYING OUT THE INVENTION

Preferred embodiments of the present invention will be explained by referring to diagram as follows.

Figure 1:
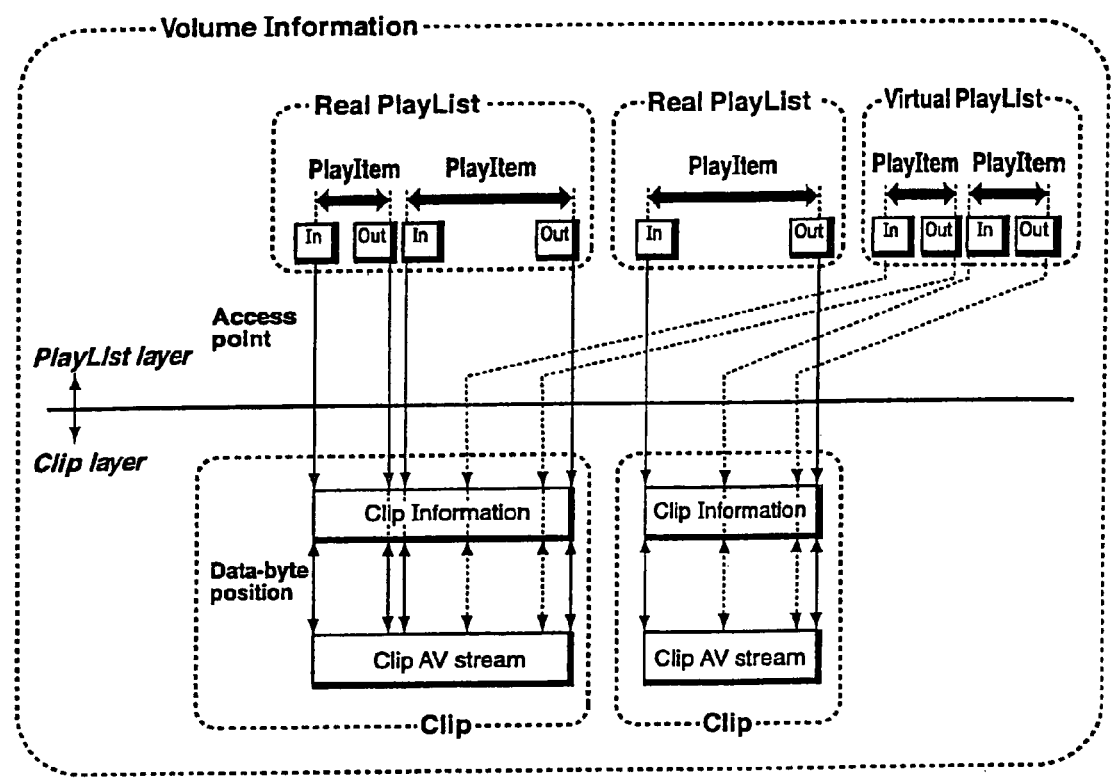
FIG. 1 is an explanatory diagram showing the structure of an application format on a recording medium employed in a recording/reproduction system to which the present invention is applied.

FIG. 1 is a diagram showing a simplified structure of an application format on a recording medium (a recording medium 10 in FIG. 43, which will be described later). The format has two layers, namely, PlayList and Clip, which are used for managing an AV stream. Volume information is used for managing all Clip and PlayList objects on the disk.

A pair consisting an AV stream and its accessory information is considered to be an object referred to as a Clip object. An AV stream file is called a Clip AV stream file and its accessory information is known as a Clip information file.

A Clip AV stream file is used for storing data laid out in a structure prescribing an MPEG-2 transport stream in a DVR (Digital Video Recording) application format.

In general, a data file used in an apparatus such as a computer is treated as an array of bytes. On the other hand, the contents of a Clip AV stream file are expanded along a time axis. A PlayList object specifies access points in the Clip object mainly as time stamps. With time stamps of access points in a Clip object given by the PlayList object, the Clip information file is useful for finding an address to start an operation to decode a stream in the Clip AV stream file.

The PlayList object is introduced for the purpose of allowing a reproduction interval, which the user wants to see, to be selected from the contents of the Clip object and the reproduction interval to be edited with ease. A PlayList object is a collection of reproduction intervals selected from a Clip object. In a PlayList object, a reproduction interval in a Clip object is called PlayItem, which is expressed by a pair of IN and OUT points. Thus, a PlayList object is a collection of PlayItem objects.

There are two types of PlayList, namely, real PlayList and virtual PlayList.

Real PlayList can be regarded as a PlayList object sharing stream portions with a Clip object associated with the PlayList object. To put it in detail, a Real PlayList object occupies the disk area for storing data associated with the stream portions shared with the PlayList object. When an AV stream is created as a new Clip object, a Real PlayList object referring to the entire reproduction range of the Clip object is also automatically created as well. If a portion of the reproduction range of the Real PlayList object is deleted, the stream portion of the Clip object data referred to by the deleted portion of the reproduction range of the Real PlayList object is also deleted.

Virtual PlayList can be regarded as a PlayList object sharing no stream portions with a Clip object associated with the PlayList object. Even if a portion of the reproduction range of the Virtual PlayList object is deleted, the Clip object does not change at all.

It should be noted that, in the following description, both Real PlayList and Virtual PlayList are referred to simply as PlayList, which is a generic name.

Directories required on a DVR disk are listed as follows:
a root directory including a "DVR" directory; and
the "DVR" directory accommodating a "PLAYLIST" directory, a "CLIPNF" directory, a "STREAM" directory and a "DATA" directory.

A directory other than the above directories can be created under the root directory. However, such a created directory is ignored in the DVR application format.

Figure 2:
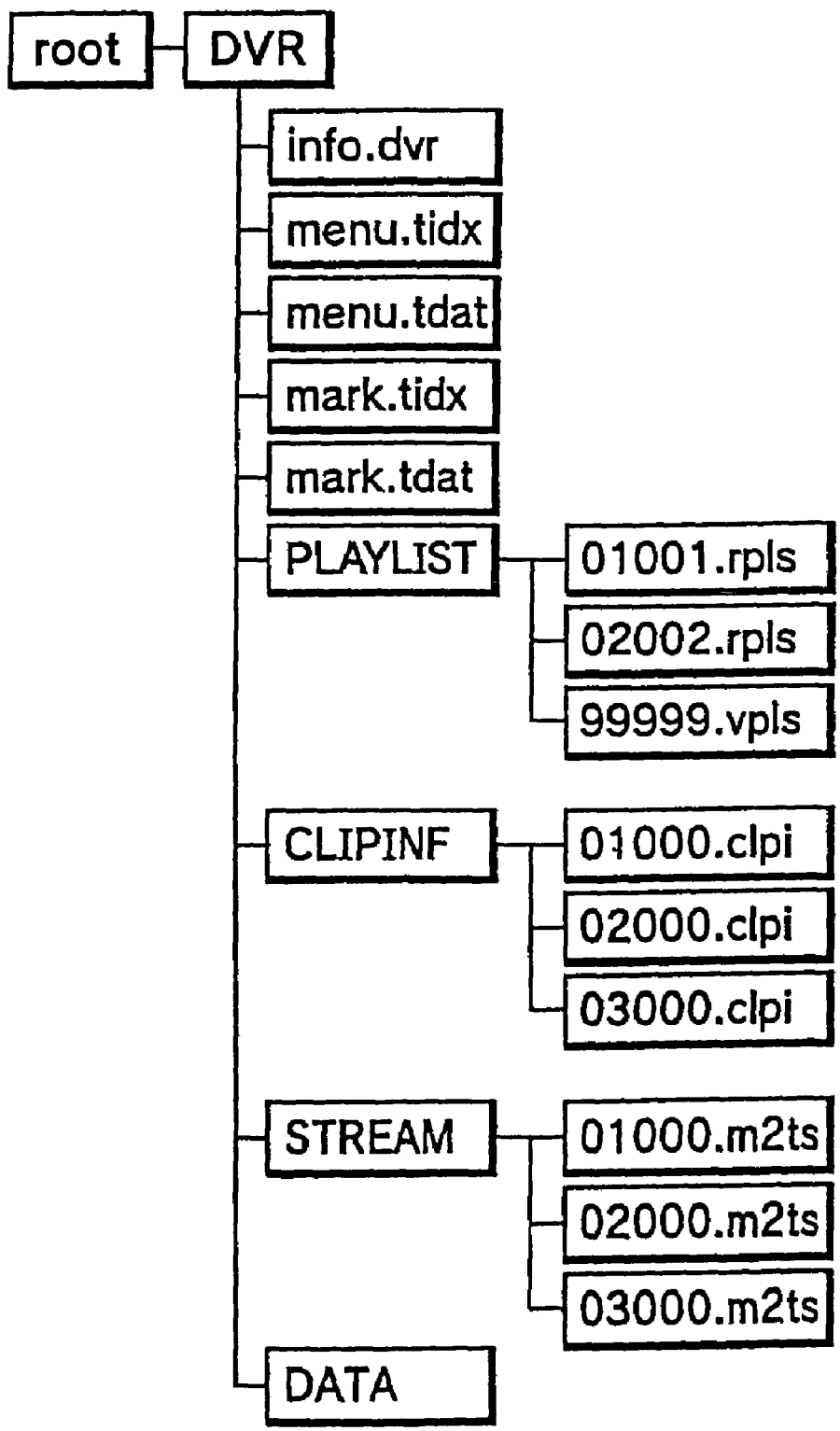
FIG. 2 is an explanatory diagram showing the structure of directories.

FIG. 2 is a diagram showing a typical directory structure on a DVR disk. As shown in the figure, the root directory includes only one directory. All files and directories prescribed in accordance with "DVR", which is a DVR application format, must be stored under the DVR directory.

The "DVR" directory includes directories explained as follows:

"PLAYLIST" is a directory under which database files of Real PlayList and Virtual PlayList must be placed. This directory must exist even if there is no PlayList object at all.

"CLIPINF" is a directory under which Clip information files must be placed. This directory must exist even if there is no Clip object at all.

"STREAM" is a directory under which AV stream files must be placed. This directory must exist even if there is no AV stream file at all.

The "PLAYLIST" directory is used for storing two types of PlayList file, namely, Real PlayList and Virtual PlayList.

"xxxxx.rpls" is a file for storing information related to a Real PlayList object. That is to say, an "xxxxx.rpls" file is created for each Real PlayList object. "xxxxx.rpls" is the name of the file. "xxxxx" is a string of five numeric characters each having a value in the range 0 to 9. The name of the file must have an extension "rpls".

"yyyyy.vpls" is a file for storing information related to a Virtual PlayList object. That is to say, an "yyyyy.vpls" file is created for each Virtual PlayList object. "yyyyy.vpls" is the name of the file. "yyyyy" is a string of five numeric characters each having a value in the range 0 to 9. The name of the file must have an extension "vlps".

The "CLIPNF" directory includes as many Clip information files as AV stream files.

"zzzzz.clpi" is a Clip information file for an AV stream file (a Clip AV stream file or a Bridge-Clip AV stream file). "zzzzz.clpi" is the name of the file. "zzzzz" is a string of five numeric characters each having a value in the range 0 to 9. The name of the file must have an extension "clpi".

The "STREAM" directory is used for accommodating AV stream files. "zzzzz.m2ts" is an AV stream file handled by the DVR system. As described above, an AV stream file can be a Clip AV stream file or a Bridge-Clip AV stream file.

"zzzzz.m2ts" is the name of the file. "zzzzz" is a string of five numeric characters each having a value in the range 0 to 9. The name of the file must have an extension "m2ts".

An AV stream file must have the same string of five numeric characters "zzzzz" as the Clip information file associated with the AV stream file.

Since the names of other directories and other files are not required in explanation of the embodiments of the present invention, the description of the other directories is omitted.

Figure 3:
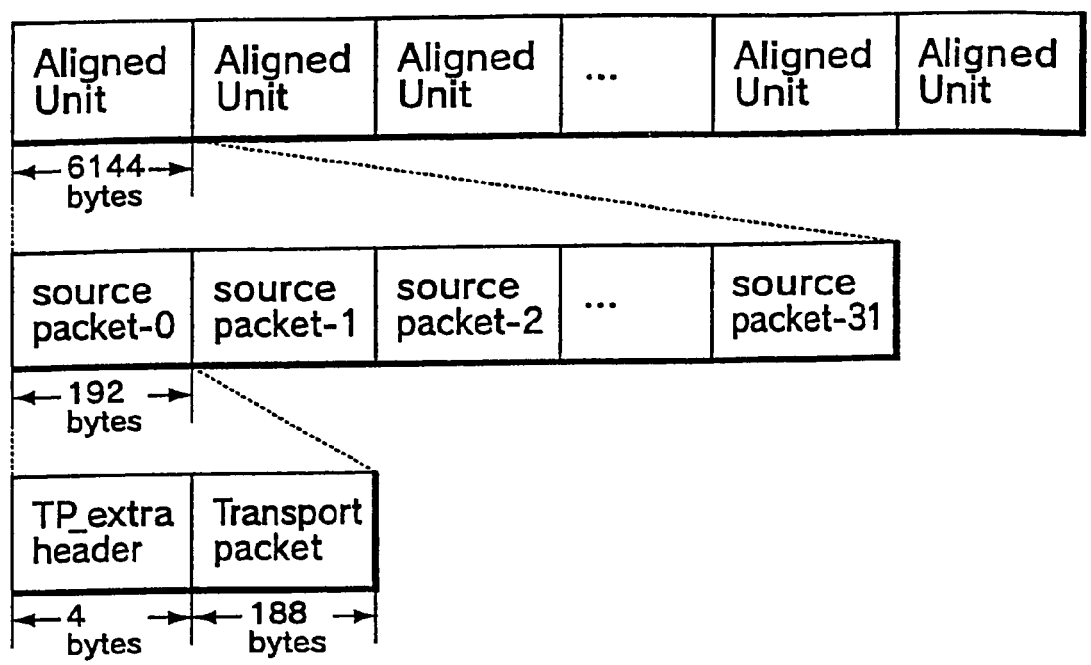
FIG. 3 is a diagram showing the structure of a DVR MPEG-2 transport stream.

Next, the structure of the AV stream file is explained. The AV stream file must have the structure of a DVR MPEG2 transport stream shown in FIG. 3. A DVR MPEG2 transport stream has the following characteristics:

1) A DVR MPEG2 transport stream has an integral number of aligned units.
2) The size of an aligned unit is 6,144 bytes (2,048×3 bytes).
3) An aligned unit starts with a first byte of a source packet.
4) Source packets each have a length of 192 bytes. A source_packet includes TP_extra_header and a transport packet. TP_extra_header has a length of 4 bytes while the transport packet has a length of 188 bytes.
5) An aligned unit includes 32 source packets.
6) The last aligned unit of a DVR MPEG-2 transport stream also includes 32 source packets.
7) If the last aligned unit is not filled up completely with transport packets of the input transport stream, the remaining byte area must be filled source packets, which are each a null packet (a transport packet with a PID of 0×1FFF).

The syntax of a source packet is shown in FIG. 4.

TP_extra_header( ) is a header with a length of 4 bytes. transport_packet( ) is a 188-byte MPEG-2 transport packet conforming to ISO/IEC 13818-1.

The syntax of TP_extra_header is shown in FIG. 5.

copy_permission_indicator is an integer representing a copy limit of a payload of the transport packet.

arrival_time_stamp is a time stamp showing a time at which the transport packet arrives at a decoder (The decoder is an AV decoder 16 in FIG. 43, which will to be described later). arrival_time_stamp is an integer having a value specified by arrival_time_stamp in Eq. (1) to be described later.

Figure 6:
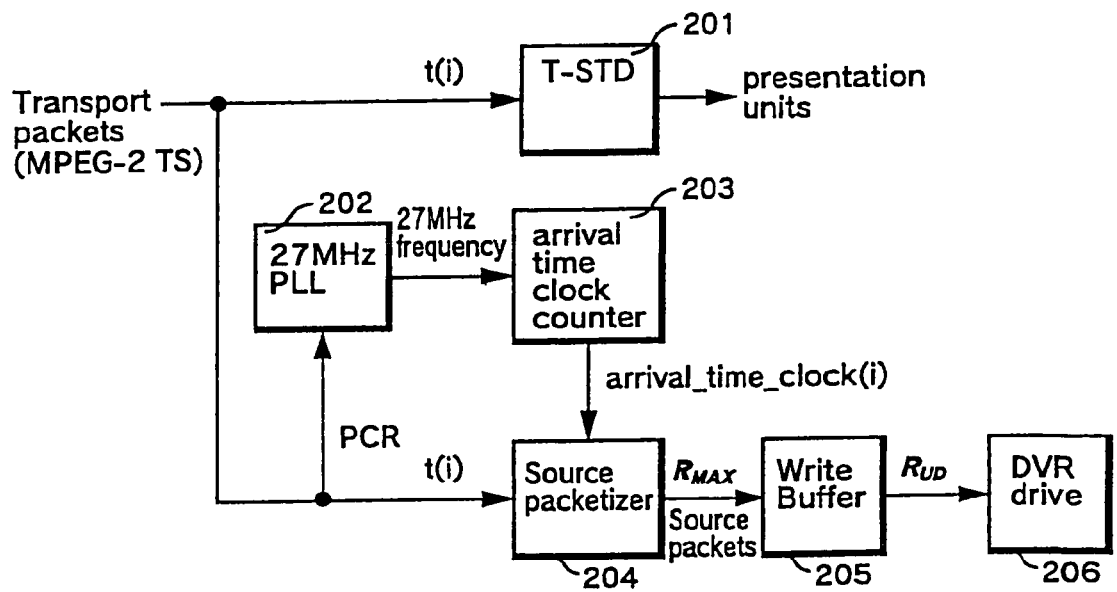
FIG. 6 is a block diagram showing the configuration of a model of a DVR MPEG-2 transport-stream recorder.

FIG. 6 is a diagram showing a model of a recorder for a DVR MPEG-2 transport stream. The recorder corresponds to the moving-picture recording/reproduction apparatus 1, the configuration of which is shown in FIG. 43 as will be described later. The model is a model of a concept prescribing a recording process. A DVR MPEG-2 transport stream must conform to this model.

An input timing of an MPEG-2 transport stream is explained as follows.

The input MPEG-2 transport stream is a full transport stream or a partial transport stream.

The input MPEG-2 transport stream must conform to ISO/IEC 13818-1 or ISO/IEC 13818-9.

The ith byte of the MPEG-2 transport stream is supplied simultaneously at a time t(i) to a T-STD 201 and a source packetizer 204. The T-STD 201 is a transport stream system target decoder conforming to ISO/IEC 13818-1. The T-STD 201 corresponds to the AV decoder 16 shown in FIG. 43. The source packetizer 204 is a source packetizer 29 shown in FIG. 43.

Figure 43:
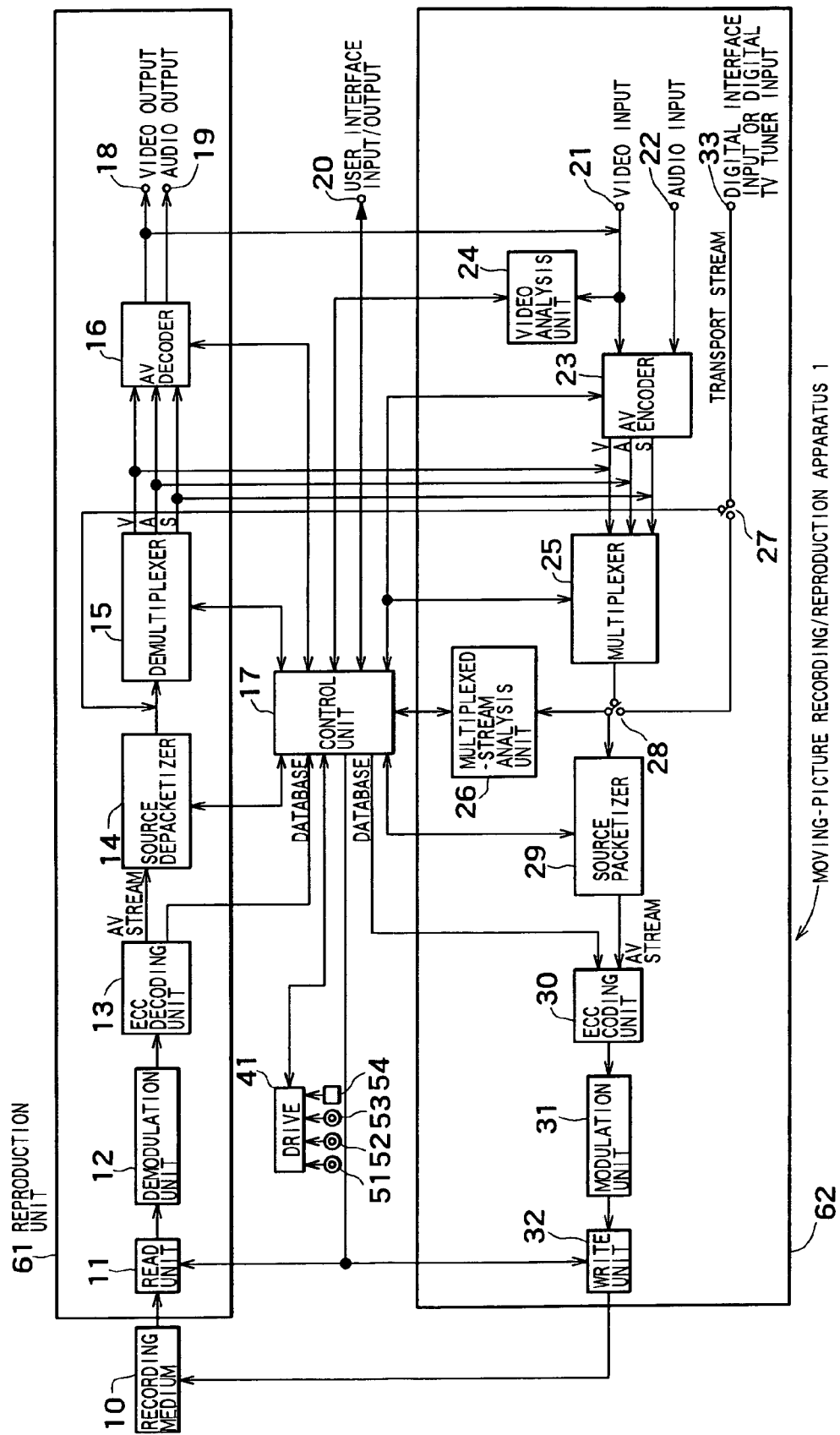
FIG. 43 is a block diagram showing the configuration of a moving-picture recording/reproduction apparatus of the present invention.

A 27-MHz PLL 202 corresponds to a component embedded in a control unit 17 employed in the moving-picture recording/reproduction apparatus 1, the configuration of which is shown in FIG. 43. The clock frequency of 27 MHz must be locked with the value of a PCR (Program Clock Reference) of the MPEG-2 transport stream.

An arrival time clock is explained as follows.

An arrival-time clock counter 203 is a binary counter for counting the number of 27 MHz pulses output by the switch 27 MHz PLL 202. The arrival-time clock counter 203 corresponds to a component also embedded in a control unit 17 employed in the moving-picture recording/reproduction apparatus 1, the configuration of which is shown in FIG. 43.

Arrival_time_clock(i) is the count value of the arrival-time clock counter 203 at a time t(i).

The source packetizer 204 creates a source packet by adding TP_extra_header to each transport packet.

Arrival_time_stamp is a time at which the first byte of the transport packet arrives at both the T-STD 201 and the source packetizer 204. As is obvious from Eq. (1), Arrival_time_stamp(k) is a sample value of Arrival_time_clock(k).

$$\text{time\_stamp}(k) = \text{arrival\_time\_clock}(k) \% \ 2^{30} \quad (1)$$

where notation k indicates the first byte of the transport packet.

A write buffer 205 corresponds to a component embedded in a write unit 32 employed in the moving-picture recording/reproduction apparatus 1, the configuration of which is shown in FIG. 43. Rmax is an input bit rate of a source packet stream flowing from the source packetizer 204 to the write buffer 205. Rmax is computed by using the following equation:

$$R\text{max} = \text{TS\_recording\_rate} \times 192/188$$

where notation TS_recording_rate is the maximum bit rate of the input transport stream.

Rud is an output bit rate from the write buffer 205 to a DVR drive 206. The DVR drive 206 corresponds to a component also embedded in the write unit 32 employed in the moving-picture recording/reproduction apparatus 1, the configuration of which is shown in FIG. 43.

Rud is an output bit rate of a source packet stream from the write buffer 205 in a non-empty state of the write buffer 205. When the write buffer 205 is empty, the output bit rate is a zero.

The DVR drive 206 records each packet from the write buffer 205 onto a disk corresponding to a recording medium 10 shown in FIG. 43. Each packet includes an added ATS indicating a time at which the packet arrives at the T-TSD 201.

Figure 7:
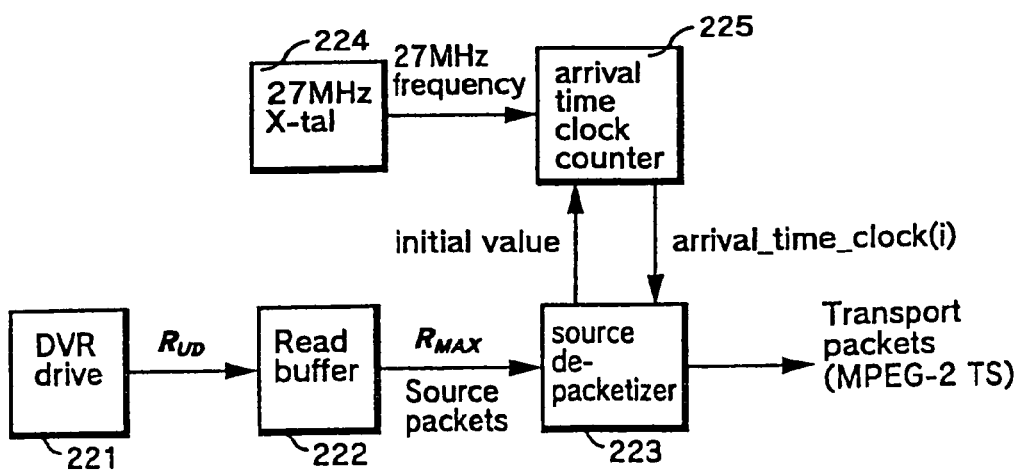
FIG. 7 is a block diagram showing the configuration of a model of a DVR MPEG-2 transport-stream player.

FIG. 7 is a diagram showing a model of a player for reproducing a DVR MPEG-2 transport stream. The player corresponds to the moving-picture recording/reproduction apparatus 1, the configuration of which is shown in FIG. 43. The model is a model of a concept prescribing a reproduction process. A DVR MPEG-2 transport stream must conform to this model.

A read buffer 222 corresponds to a component embedded in a read unit 11 employed in the moving-picture recording/reproduction apparatus 1, the configuration of which is shown in FIG. 43.

Rud is an input bit rate from a DVR drive 221 to a read buffer 222. (The DVR drive 221 corresponds to a component embedded in a read unit 11 employed in the moving-picture recording/reproduction apparatus 1, the configuration of which is shown in FIG. 43)

Rud is an input bit rate of a source packet stream to the read buffer 222 in a non-empty state of the read buffer 222. When the read buffer 222 is full, no stream is supplied to the read buffer 222.

Rmax is an output bit rate from the read buffer 222 to a source depacketizer 223 corresponding to a source depacketizer 14 employed in the moving-picture recording/reproduction apparatus 1, the configuration of which is shown in FIG. 43.

An arrival-time clock counter 225 corresponds to a component embedded in the control unit 17 employed in the moving-picture recording/reproduction apparatus 1, the configuration of which is shown in FIG. 43.

The arrival-time clock counter 225 is a counter for counting the number of 27-MHz pulses generated by a crystal oscillator 224 at a frequency of 27 MHz. The crystal oscillator 224 corresponds to a component also embedded in the control unit 17 employed in the moving-picture recording/reproduction apparatus 1, the configuration of which is shown in FIG. 43.

If the present source socket is the first source socket of the AV stream_file or a source socket indicated by SPN_ATC_start in SequenceInfo( ) to be described later, the arrival-time clock counter 225 is reset at the value of the arrival time stamp of the packet. arrival_time_clock(i) is the count value of the arrival-time clock counter 225 at a time t(i). A timing with which the MPEG-2 transport stream is output is described as follows.

If arrival_time_stamp of the present source packet is equal to the value of the LSB 30 bits of arrival_time_clock(i), the transport packet of the source packet is extracted from the buffer.

The following description explains the format of a database for managing reproduced information of an AV stream file.

FIG. 8 is a diagram showing the syntax of the Clip information file. The Clip information file includes SequenceInfo( ), ProgramInfo( ) and CPI( ).

SequenceInfo_start_address is the start address of SequenceInfo( ) relative to the first byte of the zzzzz.clpi file with a byte taken as an address unit. That is to say, the first address is a relative address of 0.

ProgramInfo_start_address is the start address of ProgramInfo( ) relative to the first byte of the zzzzz.clpi file with a byte taken as an address unit. That is to say, the first address is a relative address of 0.

CPI_start_address is the start address of CPI( ) relative to the first byte of the zzzzz.clpi file with a byte taken as an address unit. That is to say, the first address is a relative address of 0.

Since other syntax fields are not required in the explanation of the embodiments of the present invention, the description of the other fields is omitted.

SequenceInfo( ) defines information of ATC-sequence and STC-sequence in the Clip AV stream.

The ATC-sequence is explained as follows. An arrival time base is a time axis based on arrival time stamps (ATS) of source packets composing an AV stream file. The clock along the time axis is called an ATC (Arrival Time Clock). An ATC-sequence is a source-packet sequence including no ATC discontinuity (or discontinuity of the arrival time base).

Figure 9:
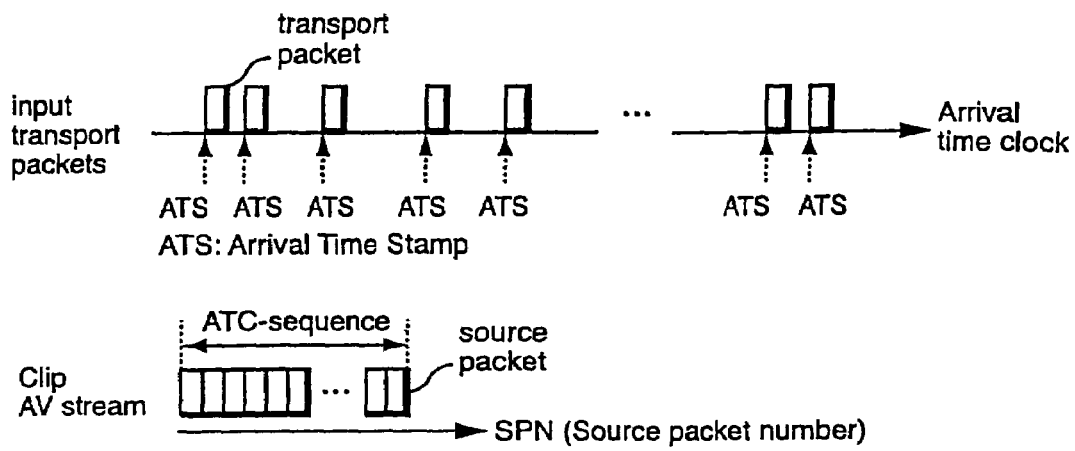
FIG. 9 is an explanatory diagram showing ATC-sequence.

FIG. 9 is an explanatory diagram showing an ATC-sequence. When an input transport stream is newly recorded as a Clip AV stream file, its Clip object must not include an ATC discontinuity and has only one ATC-sequence. It is assumed that an ATC discontinuity is created only when stream data of a Clip AV stream file is partially deleted by a process such as editing. Details will be described later.

The start address of an ATC-sequence, that is, an address at which a new ATC starts in an AV stream file, is stored in SequenceInfo( ). This address is referred to as SPN_ATC_start.

ATC-sequences other than the last one in an AV stream file each begin at a source packet pointed to by its SPN_ATC_start and end at a source packet immediately preceding a source packet pointed to by next SPN_ATC_start. The last ATC-sequence begins at a source packet pointed to by its SPN_ATC_start and ends at the last source packet of the AV stream file.

Figure 10:
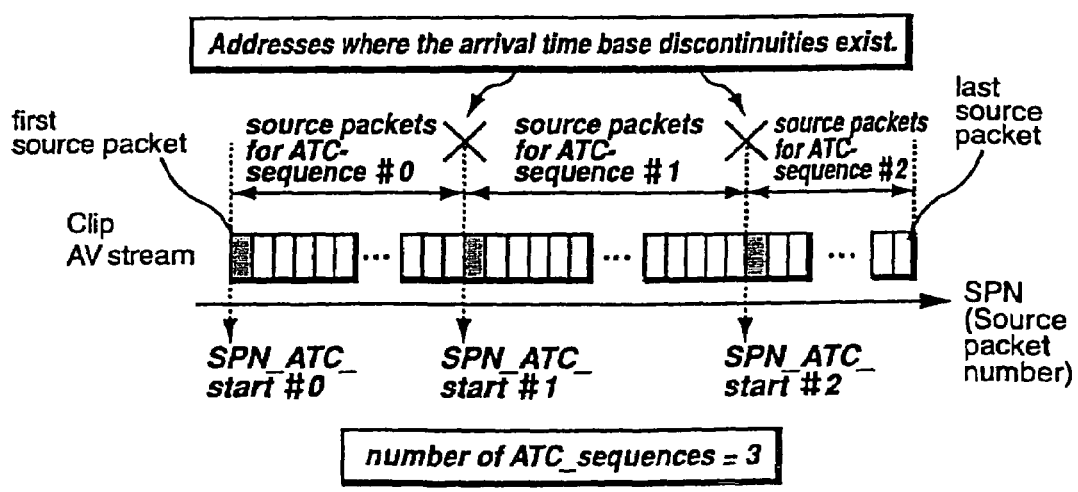
FIG. 10 is an explanatory diagram showing a relation between ATC discontinuities and ATC-sequences.

FIG. 10 is an explanatory diagram showing a relation between ATC discontinuities and ATC-sequences. In this example, a Clip AV stream file has two ATC discontinuities and three ATC-sequences.

Next, the STC (System Time Clock) sequence is explained. The definition of the STC-sequence is prescribed in the MPEG-2 standard. The STC is a system time base clock, which is a time axis based on a PCR (Program Clock Reference) in the transport file. An STC value is a count value of 33-bit binary counter having precision of 90 kHz.

FIG. 11 is an explanatory diagram showing a continuous STC interval. The horizontal axis is the arrival time clock and the vertical axis is the STC (or the system time base). In Case-1, the STC is monotonously increasing and the interval contains no STC discontinuity. In Case-2, the digital input terminal 33-bit STC counter is wrapped around in the middle. The wrap-around point of the STC is not a discontinuity. The STC is continuous even if the STC counter is wrapped around.

An STC discontinuity is generated when a broadcasting station changes the transmission system from one to another, when the recorder changes the channel from one to another, when the user carries out an editing operation or in other events.

An STC-sequence is a source-packet sequence including no STC discontinuity (or no system time base discontinuity). It should be noted that the same STC value by no means appears more than once in the same STC-sequence. In consequence, the maximum time length of a Clip object cannot be set at a value greater than the 33-bit wrap-around period of STC (about 26 hours).

The start address of an STC-sequence, that is, an address at which a new STC starts in an AV stream file, is stored in SequenceInfo( ). This address is referred to as SPN_STC_start.

An STC-sequence never extends over a boundary of an ATC-sequence.

STC-sequences other than the last one in an AV stream file each begin at a source packet pointed to by its SPN_STC_start and end at a source packet immediately preceding a source packet pointed to by next SPN_STC_start. The last STC-sequence begins at a source packet pointed to by its SPN_STC_start and ends at the last source packet of the AV stream file.

FIG. 12 is an explanatory diagram showing a relation between STC discontinuities and STC-sequences as well as a relation between STC-sequences and ATC-sequences. In this example, a Clip AV stream file has three STCs and three STC-sequences. An STC-sequence never extends over a boundary of an ATC-sequence.

If an AV stream file has STC discontinuities, a PTS may appear more than once with the same value in the AV stream file. For this reason, when the PTS is used as a base for pointing to a time on an AV stream, the PTS of an access point only is not enough for identifying the point. In addition to the PTS, the index of an STC-sequence including the PTS is required. The index is referred to as STC_id.

FIG. 13 is a diagram showing the syntax of SequenceInfo( ).

length is the number of bytes starting with a byte immediately following this length field and ending with the last byte of SequenceInfo( ).

num_of_ATC_sequences is the number of ATC-sequences in the AV stream file.

SPN_ATC_start[atc_id] is an address at which ATC-sequence pointed to by atc_id starts on the AV stream file. SPN_ATC_start[atc_id] is a count value with an initial value of 0 corresponding to the first source packet of the AV stream file. The count value is incremented by 1 for each source packet.

SPN_ATC_start[0] at the beginning of SequenceInfo( ) is a zero. The values of SPN_ATC_start[atc_id] entered to SequenceInfo( ) are arranged in an ascending order. That is to say, SPN_ATC_start[atc_id] entered in SequenceInfo( ) satisfies the following condition.

SPN_ATC_start[0]=0

For 0<atc_id<num_of_ATC_sequences, SPN_ATC_start[atc_id−1]<SPN_ATC_start[atc_id] num_of_STC_sequences[atc_id] is the number of STC-sequences on the ATC-sequence pointed to by atc_id. offset_STC_id[atc_id] is the value of an offset relative to stc_id for the first STC-sequence on an ATC-sequence pointed to by atc_id. When an AV stream file is newly recorded, offset_STC_id[atc_id] is a zero.

The value of stc_id for the first STC-sequence on an ATC-sequence pointed to by atc_id is defined by an order prescribed as for_loop of stc_id in the syntax, and starts from offset_STC_id[atc_id].

For two consecutive ATC-sequences defined in SequenceInfo( ), stc_id for the last STC-sequence on the former ATC-sequence may have the same value as stc_id for the first STC-sequence on the later ATC-sequence. If these two stc_id values are equal to each other, the same STC value will not appear in the two STC-sequences referred to by the two stc_id values.

stc_id values entered to SequenceInfo( ) must be arranged in an ascending order. offset_STC_id[atc_id] is set at such a value that this restriction is satisfied.

PCR_PID[atc_id][stc_id] is the value of the PID of a transport packet having a valid PCR in an STC-sequence pointed to by stc_id and located on an ATC-sequence pointed to by atc_id.

SPN_STC_start[atc_id][stc_id] is an address at which an STC-sequence pointed to by stc_id and located on an ATC-sequence pointed to by atc_id starts in the AV stream file.

SPN_STC_start[atc_id][stc_id] is a count value with an initial value of 0 corresponding to the first source packet of the AV stream file. The count value is incremented by 1 for each source packet.

Values of SPN_STC_start[atc_id][stc_id] entered to SequenceInfo( ) must be arranged in an ascending order. The first value of SPN_STC start[atc_id][stc_id] on an ATC-sequence pointed to by atc_id must be at least equal to SPN_ATC_start[atc_id] or more. That is to say, the following condition must be satisfied:

SPN_ATC_start[atc_id]≦SPN_STC_start[atc_id] [0]

presentation_start_time[atc_id][stc_id] is a presentation start time of AV stream data on an STC-sequence pointed to by stc_id and located on an ATC-sequence pointed to by atc_id. This presentation start time is derived from the STC of the STC-sequence and has the period of a 45-KHz signal used as a unit.

On the other hand, presentation_end_time[atc_id] [stc_id] is a presentation end time of AV stream data on an STC-sequence pointed to by stc_id and located on an ATC-sequence pointed to by atc_id. This presentation end time is derived from the STC of the STC-sequence and has the period of a 45-KHz signal used as a unit.

Next, ProgramInfo( ) is explained. A program is a collection of elementary streams. For the sake of synchronous reproduction of these streams, the streams share only one system time base.

For a reproduction apparatus corresponding to the moving-picture recording/reproduction moving-picture recording/reproduction apparatus 1 shown in FIG. 43 to be described later, an analysis of the contents of an AV stream prior to processing to decode the AV stream is useful. The contents are information such as the value of the PID of a transport packet used for transmitting a video or audio elementary stream and the component type of the video or audio. (For example, the component type indicates that the elementary stream is an HDTV video stream or an MPEG-2 AAC audio stream)

This information is useful for creation of a menu screen used for giving the user an explanation of the contents of PlayList referring to the AV stream. In addition, this information is also useful for setting initial states of the moving-picture recording/reproduction apparatus' AV decoder 16 and demultiplexer 15, which will be described later by referring to FIG. 43. For this reason, the Clip information file includes ProgramInfo used for explaining the contents of a program.

The contents of a program in an AV stream file used for storing an MPEG-2 transport stream may change. For example, the PID of a transport packet for transmitting a video elementary stream changes or the component type of the video stream changes from SDTV to HDTV. ProgramInfo is used for storing information on change points of contents of a program in the AV stream file.

A sequence of source packets with fixed program contents prescribed by the format in the AV stream file is referred to as a program-sequence.

An address at which a new program-sequence starts in the AV stream file is stored in ProgramInfo( ) as SPN_program_sequence_start.

Program-sequences other than the last one in an AV stream file each begin at a source packet pointed to by its SPN_program_sequence_start and end at a source packet immediately preceding a source packet pointed to by next SPN_program_sequence_start. The last program-sequence begins at a source packet pointed to by its SPN_program_sequence_start and ends at the last source packet of the AV stream file.

Figure 14:
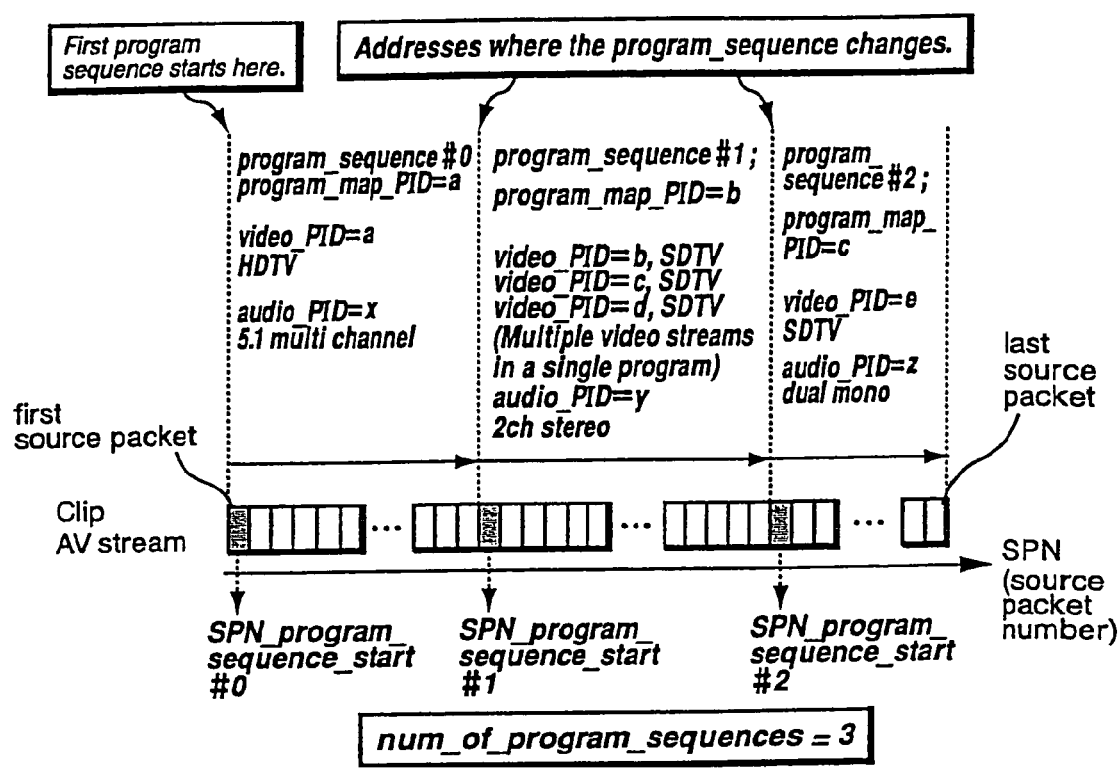
FIG. 14 is an explanatory diagram showing program-sequences.

FIG. 14 is an explanatory diagram showing program-sequences. In this example, the Clip AV stream file has three program-sequences.

A program-sequence may extend over boundaries of ATC-sequence and STC-sequence.

FIG. 15 is a diagram showing the syntax of ProgramInfo( ).

length is the number of bytes starting with a byte immediately following this length field and ending with the last byte of ProgramInfo( ).

num_of_program_sequences is the number of program-sequences in the AV stream file.

SPN_pogram_sequence_start is an address at which the program-sequence in the AV stream file starts. SPN_program_sequence_start is a count value with an initial value of 0 corresponding to the first source packet of the AV stream file. The count value is incremented by 1 for each source packet. The values of SPN_program_sequence_start entered to ProgramInfo( ) are arranged in an ascending order.

SPN_pogram_sequence_start is assumed to point to a source pocket having a first PMT for its program_sequence.

SPN_pogram_sequence_start is created by the recorder for recording data by analyzing PSI/SI in the transport stream. The recorder corresponds to the moving-picture recording/reproduction apparatus 1, the configuration of which is shown in FIG. 43. To be more specific, a video analysis unit 24 or a multiplexed-stream analysis unit 26 in the moving-picture recording/reproduction apparatus 1, the configuration of which is shown in FIG. 43, analyzes the PSI/SI, causing a delay time to detection of a change in PSI/SI. Thus, SPN_program_sequence_start may point to a source packet within a predetermined period starting at the actual change in PSI/SI.

program_map_PID is the value of the PID of a transport packet having a PMT (program map table) applicable to the program-sequence.

num_of_stream_in_ps is the number of elementary streams defined in the program-sequence.

num_of_groups is the number of groups each including elementary streams defined in the program-sequence. num_of_groups has a value at least equal to 1 or more. If the PSI/SI of the transport stream has information on groups each including elementary streams, num_of_groups is assumed to have a value at least equal to 1. Each of the groups forms a view in a multi-view program.

stream_PID is the value of a PID for an elementary stream defined in a PMT referred to by program_map_PID of the program-sequence.

StreamCodingInfo( ) is information on an elementary stream pointed to by stream_PID described above. num_of_streams_in_group is the number of elementary streams included in one group including elementary streams.

stream_index is a value indicating an elementary stream included in an elementary-stream group. The value is equal to the value of stream_index defined in a for-loop in this syntax.

FIG. 16 is a diagram showing the syntax of StreamCodingInfo( ).

length is the number of bytes starting with a byte immediately following this length field and ending with the last byte of StreamCodingInfo( ).

stream_coding_type is the type of coding of an elementary stream pointed to by stream_PID for this StreamCodingInfo( ). The meanings of values set in stream_coding_type are shown in FIG. 17.

video_format is the video format of a video stream pointed to by stream_PID for this StreamCodingInfo( ). The meanings of values set in video_format are shown in FIG. 18.

frame_rate is the frame rate of a video stream pointed to by stream_PID for this StreamCodingInfo( ). The meanings of values set in frame_rate are shown in FIG. 19.

display_aspect_ratio is the display aspect ratio of a video stream pointed to by stream_PID for this StreamCodingInfo( ). The meanings of values set in video_aspect_ratio are shown in FIG. 20.

cc_flag is a flag indicating whether or not a closed caption data signal in a video stream pointed to by stream_PID for this StreamCodingInfo( ) has been coded. original_video_format_flag is a flag indicating whether or not original_video_format and original_display_aspect_ratio exist in StreamCodingInfo( ) original_video_format is information on the original video format prior to a process to encode a video stream pointed to by stream_PID for this StreamCodingInfo( ). The meanings of values set in original_video_format are the same as video_format described above. original_display_aspect_ratio is the original display aspect ratio prior to a process to encode a video stream pointed to by stream_PID for this StreamCodingInfo( ). The meanings of values set in original_display_aspect_ratio are the same as display_aspect_ratio described above.

In processing to transcode a transport stream including a video stream multiplexed with a multimedia data stream such as a BML stream and captions, the video stream is re-encoded so that its video format changes (for example, from 1080i to 480i). However, there is a conceivable case in which the multimedia data stream remains the same as its original stream.

In such a case, an information mismatch may probably be resulted in between the newly re-encoded video stream and the multimedia data stream. For example, the video format of the new re-encoded video stream changes in spite of the fact that display parameters of the multimedia data stream have been determined by assuming the video format of the original video stream.

original_video_format and original_display_aspect_ratio are each used for holding information on the original video stream. The reproduction apparatus creates a picture to be displayed from the new re-encoded video stream and the multimedia data stream as follows.

The video stream is subjected to an up-sampling process to produce a video format indicated by original_video_format and original_display_aspect_ratio. Then, a picture obtained as a result of the up-sampling process is synthesized with the multimedia data stream to produce a correct picture to be displayed.

audio_presentation_type is the presentation type of the audio stream pointed to by stream_PID for this StreamCodingInfo( ). The meanings of values set in audio_presentation_type are shown in FIG. 21.

sampling_frequency is the sampling frequency of an audio stream pointed to by stream_PID for this StreamCodingInfo( ). The meanings of values set in sampling_frequency are shown in FIG. 22.

Next, CPI( ) is explained. The (Characteristic Point Information)CPI is used for relating reproduction-time information in the AV stream to addresses in the AV stream file.

There are two types of CPI, namely, EP_map and TU_map. If CPI-type in CPI( ) is the EP_map type, CPI( ) includes EP_map. If CPI-type in CPI( ) is the TU_map type, on the other hand, CPI( ) includes TU_map. One AV stream file has one EP_map or one TU_map.

EP_map is a list of entry points (EPs). Those entry points are extracted from elementary streams and transport streams. The list thus has address information for finding entry point at which decoding is to be started in the AV stream. A piece of EP data is a pair of a presentation time stamp (PTS) and a data address of the access unit of AV stream corresponding to the PTS.

EP_map is used for two purposes. In the first place, EP_map is used for finding a data address of access unit of the AV stream referred to by using a presentation PlayList. In the second place, EP_map is used for fast forward reproduction and fast reverse reproduction. If the syntax of an input AV stream can be analyzed in an operation carried out by the recording apparatus to record the input AV stream, EP_map is created and stored on the disk.

TU_map is a list of time units (TU) based on arrival times of transport packets input through a digital interface. TU_map thus shows a relation between arrival times and data addresses in the AV stream. If the syntax of an input AV stream cannot be analyzed in an operation carried out by the recording apparatus to record the input AV stream, TU_map is created and stored onto the disk.

FIG. 23 is a diagram showing the syntax of CPI( ).

length is the number of bytes starting with a byte immediately following this length field and ending with the last byte of CPI( ).

CPI_type is a 1-bit flag for indicating the type of the CPI of Clip.

EP_map has data described below for a video stream in the AV stream file.

(1): stream_PID is the PID of a transport packet for transmitting the video stream.

(2): num_EP_entries is the number of entry points for the video stream.

EP_map includes data of pairs each consisting of PTS_EP start and SPN_EP_start as many as num_EP_entries.

(3): PTS_EP_start is the PTS of an access unit starting from a sequence header in the video stream.

(4): SPN_EP_start is an address in the AV stream file. The address indicated by SPN_EP_start is the address of a source packet including the first byte of an access unit referred to by PTS_EP_start described above. SPN_EP_start is a number incremented by 1 for each source packet. SPN_EP_start has an initial value of 0 corresponding to the first source packet in the AV stream file.

If a plurality of video streams exist in the AV stream file, EP_map may include the data described above for each video stream.

FIG. 24 is an explanatory diagram showing an example of EP_map. In this example, a video stream with stream_PID=x exists in the Clip AV stream and there are k entry points (num_EP_entries=k). An example of a source packet pointed to by SPN_EP_start is shown in the figure. A payload following TP_header of a transport packet in each source packet begins with a PES packet header. The PES packet header is followed by a sequence header (SQH), which is followed by a GOP header (GOPH). The GOPH is followed by an I picture (I-PICH). The PTS of an access unit starting with this sequence header is encoded in the PES packet header.

Next, TU_map is explained.

Figure 25:
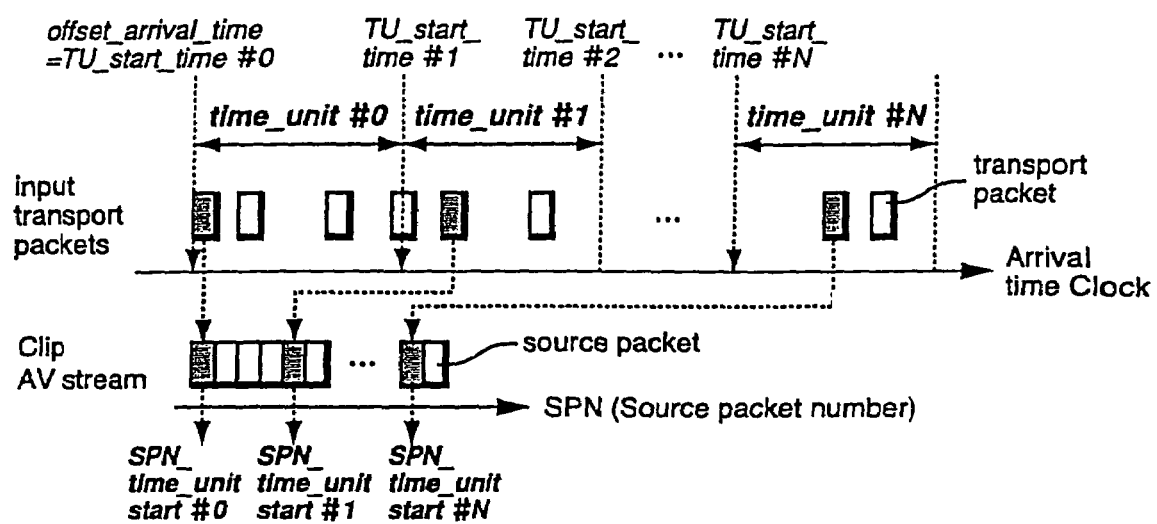
FIG. 25 is an explanatory diagram showing TU_map.

FIG. 25 is an explanatory diagram showing TU_map, which is created when an AV stream is newly recorded as Clip. A time axis created on the basis of arrival times of source packets included in one ATC_sequence is divided into predetermined time units. These time units are each referred to as time_unit.

The address of the first complete-form source packet on the AV stream file entering each time_unit is stored in TU_map. The address is referred to as SPN_time unit_start. The definition of a time on an ATC-sequence is based on TU_unit_start. This is explained later in terms of the semantics of SPN_time_unit_start.

FIG. 26 is an explanatory diagram showing the syntax of TU_map.

time_unit_size is the size of a time unit. The unit of the size is the period of a 45-kHz clock signal derived from an arrival-time clock signal with a precision of 27 MHz.

The value of num_of_ATC_sequences used in a for-loop of atc_id in the syntax is defined in SequenceInfo( ).

offset_arrival_time[atc_id] is an offset time for a first complete time_unit in an ATC-sequence pointed to by atc_id. The unit of the offset time is the period of a 45-kHz clock signal derived from an arrival-time clock signal with a precision of 27 MHz.

When an AV stream is newly recorded as Clip, the AV stream file has only an ATC-sequence and offset_arrival time [atc_id] is a zero.

When a plurality of offset_arrival_time[atc_id] pieces are recorded to TU_map as entries, the following conditions are satisfied:

offset_arrival_time[0]=0

For atc_id having a value of 0<atc_id<num_of_ATC_sequences, offset_arrival_time[atc_id]>offset_arrival_time[atc_id−1]+time_unit*num_of_time_unit_entries [atc_id−1]

where notation num_of_time_unit_entries[atc_id] is the number of time_unit entries included in an ATC-sequence pointed to by atc_id.

SPN_time_unit_start[atc_id][i] is the start address of the ith time_unit in an ATC-sequence pointed to by atc_id. SPN_time_unit_start[atc_id] [i] is also a count value starting from an initial value of 0 corresponding to the first source packet in the AV stream file. The count value is incremented by 1 for each source packet.

If no source packet entering the present time_unit, the value of SPN_time_unit_start for the present time_unit is equal to the value of SPN_time_unit_start for the immediately preceding time_unit.

Entries of APN_time_unit_start values in TU_map must be arranged in an ascending order.

The start time of the ith time_unit in an ATC-sequence pointed to by atc_id is referred to as TU_start_time[atc_id][i], which is expressed as follows:

$$TU\_start\_time[atc\_id][i] = offset\_arrival\_time[atc\_id] + i * time\_unit\_size \ldots \quad (2)$$

FIG. 27 is a diagram showing the syntax of the PlayList file. A PlayList file has PlayList( ).

PlayList_start_address is start address of PlayList( ) relative to the first byte of the PlayList file. The start address is obtained by counting the number of bytes starting with the first byte of the PlayList file as a count value of 0.

Since the other syntax fields are not required in explanation of the embodiments of the present invention, the description of the other fields is omitted.

FIG. 28 is a diagram showing the syntax of PlayList( ).

length is the number of bytes starting with a byte immediately following this length field and ending with the last byte of PlayList( ).

CPI_type is a 1-bit flag for indicating the value of the CPI_type of Clip used in PlayItem( ). CPI_type is defined by CPI_type of the Clip information file.

number_of_PlayItems is the number of PlayItem( )s in PlayList( ).

The value of PlayItem_id for PlayItem( ) is the number of a loop iteration in which PlayItem( ) appears in a PlayItem_id for_loop in the syntax. PlayItem_id starts from 0.

Since the other syntax fields are not required in explanation of the embodiments of the present invention, the description of the other fields is omitted.

Figure 29:
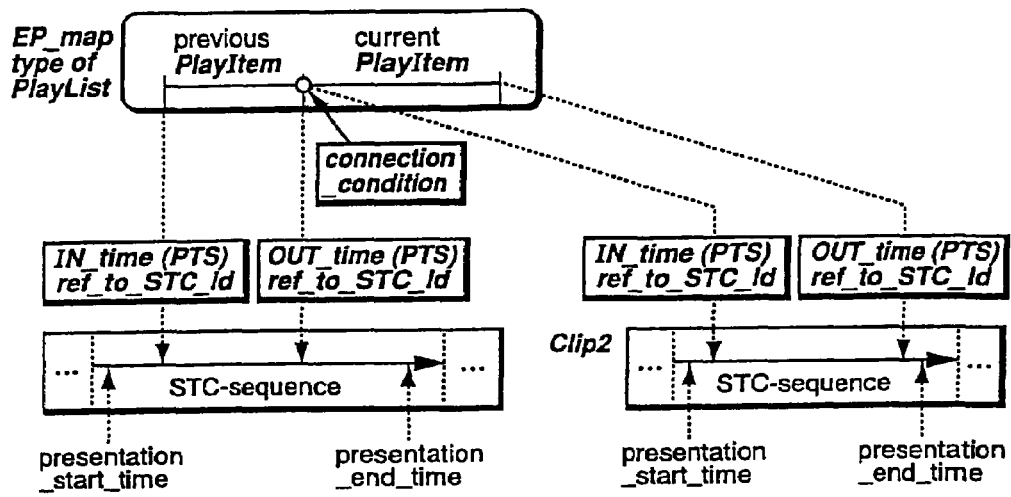
FIG. 29 is an explanatory diagram showing EP_map-type PlayList.

Next, PlayItem is explained. A PlayItem object basically includes the following data:

(1): Clip_information_file_name for specifying the file name of Clip pointed to by PlayItem (2): A pair of IN_time and OUT_time, which identify a reproduction interval of this Clip object (3): connection_condition showing the state of connection between two consecutive PlayItem objects in PlayList, namely, the preceding PlayItem object and the present PlayItem object FIG. 29 is an explanatory diagram showing PlayList with CPI_type of EP_map. Such PlayList is referred to as EP_map-type PlayList. In the case of as EP_map-type PlayList, IN_time and OUT_time of PlayItem are PTS base times. IN_time and OUT_time are times on the same STC-sequence. ref_to_STC_id is used for indicating the STC-sequence. IN_time and OUT_time are times in a reproduction interval indicated by presentation_start_time and presentation_end_time, which are defined for the STC-sequence and included in SequenceInfo.

Figure 30:
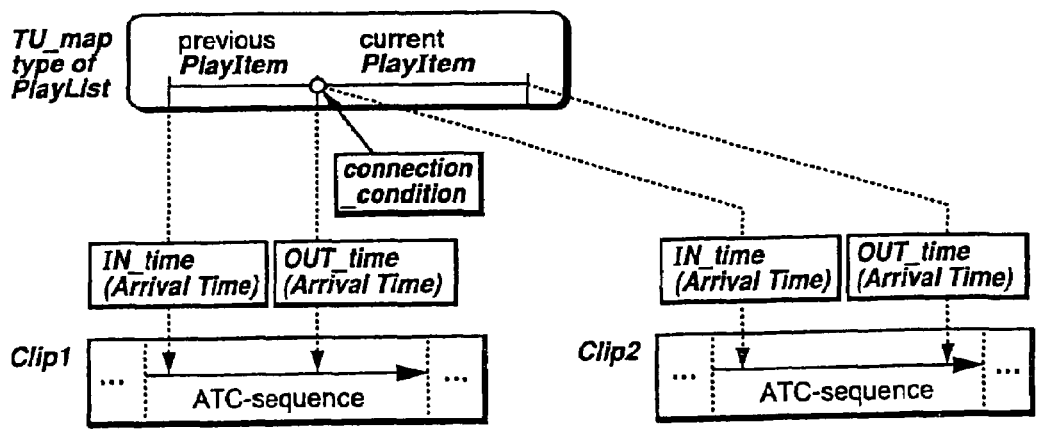
FIG. 30 is an explanatory diagram showing TU_map-type PlayList.

FIG. 30 is an explanatory diagram showing PlayList with CPI_type of TU_map. Such PlayList is referred to as TU_map-type PlayList. In the case of as TU_map-type PlayList, IN_time and OUT_time of PlayItem are PTS base times. IN_time and OUT_time are times on the same ATC-sequence.

Figure 31:
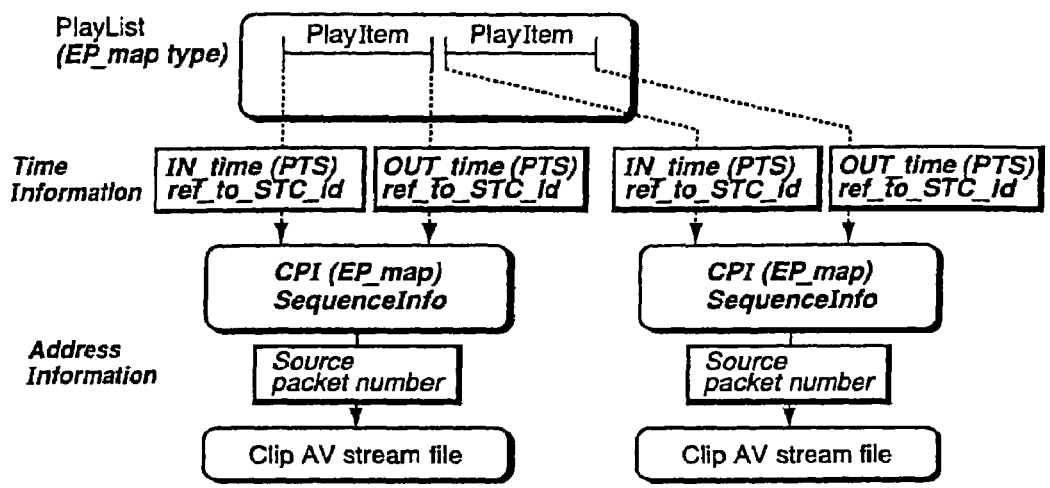
FIG. 31 is an explanatory diagram showing a relation between time information of EP_map-type PlayList and address information in an AV stream file.

FIG. 31 is an explanatory diagram showing a relation between time information of EP_map-type PlayList and address information in an AV stream file. The time information of PlayList is PTS information of a picture or an audio frame in the AV stream file. EP_map and SequenceInfo of the Clip information file relate time information in the AV stream to addresses in the file.

Figure 32:
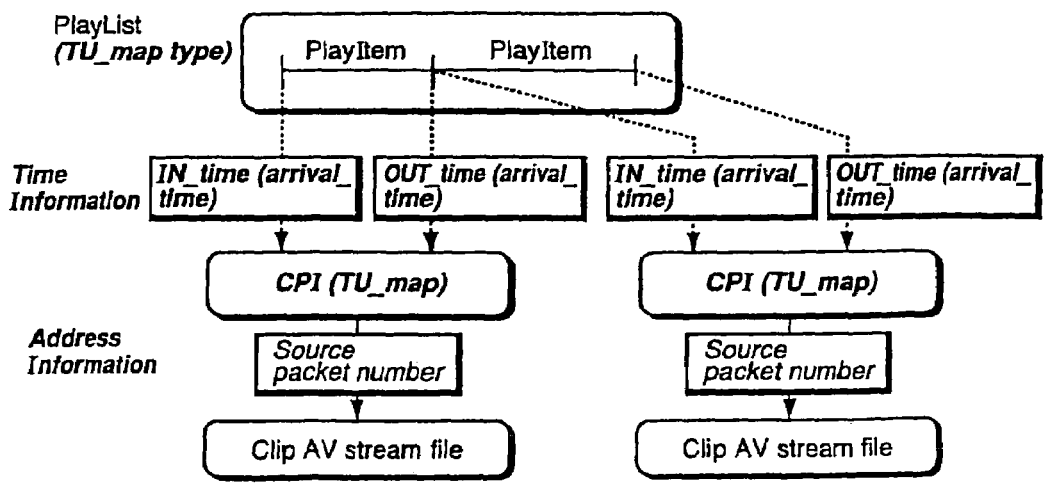
FIG. 32 is an explanatory diagram showing a relation between time information of TU_map-type PlayList and address information in an AV stream file.

FIG. 32 is an explanatory diagram showing a relation between time information of TU_map-type PlayList and address information in an AV stream file. The time information of PlayList is arrival-time information in the AV stream file. TU_map of the Clip information file relates time information in the AV stream to addresses in the file.

FIG. 33 is a diagram showing the syntax of PlayItem( ).

length is the number of bytes starting with a byte immediately following this length field and ending with the last byte of PlayItem( ).

Clip_Information_file name is the name of a Clip information file referred to by PlayItem.

connection_condition is information indicating whether or not a preceding PlayItem object is connected to a present PlayItem object seamlessly.

ref_to_STC_id is stc_id of an STC-sequence of Clip referred to by PlayItem. The value of stc_id is defined in SequenceInfo.

IN_time is a reproduction start time of PlayItem.

OUT_time is a reproduction end time of PlayItem.

Bridge_Clip_Information_file_name is auxiliary information of playback for a case in which a preceding PlayItem object is connected to a present PlayItem object seamlessly.

Next, the concept of editing of PlayList is explained. The processing described below is performed typically by the control unit 17 employed in the moving-picture recording/reproduction apparatus 1, the configuration of which is shown in FIG. 43, on the basis of operations carried out by the user.

Figure 34:
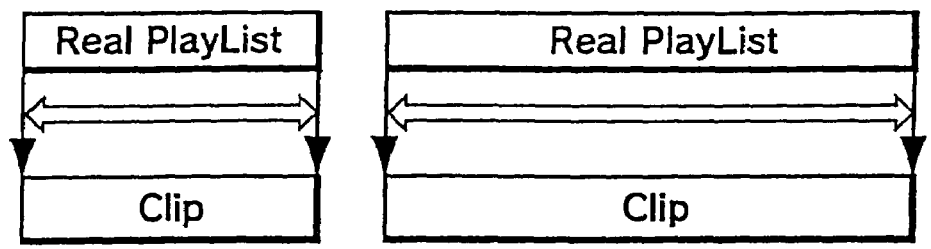
FIG. 34 is an explanatory diagram showing a relation, which is established between Clip and PlayList when an AV stream is recorded as a new Clip object.

FIG. 34 is an explanatory diagram showing the concept of a relation, which is established between Clip and PlayList when an AV stream is recorded as a new Clip object. When an AV stream is recorded as a new Clip object, Real PlayList referring to an entire reproducible range of the Clip object is created.

Figure 35:
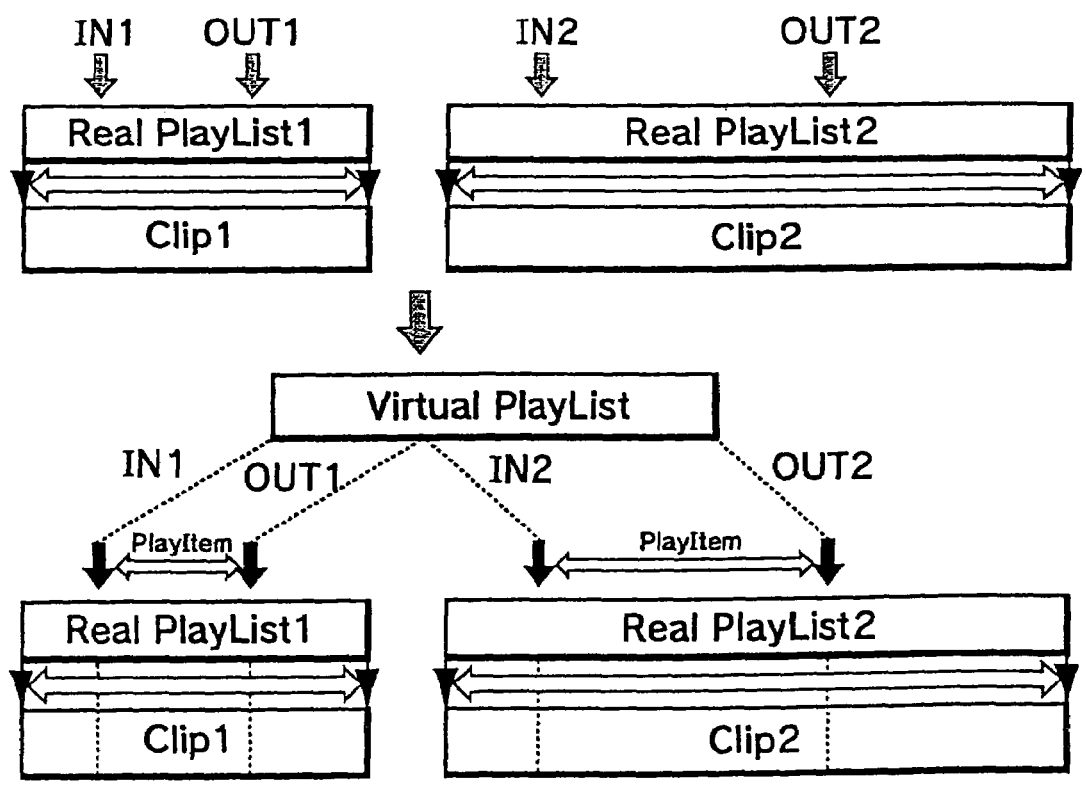
FIG. 35 is an explanatory diagram showing creation of Virtual PlayList.

FIG. 35 is an explanatory diagram showing the concept of creation of Virtual PlayList. When the user specifies IN_time and OUT_time from those in a reproduction range of Real PlayList, PlayItem of a reproduction interval the user wants to watch and Virtual PlayList are created.

Figure 36:
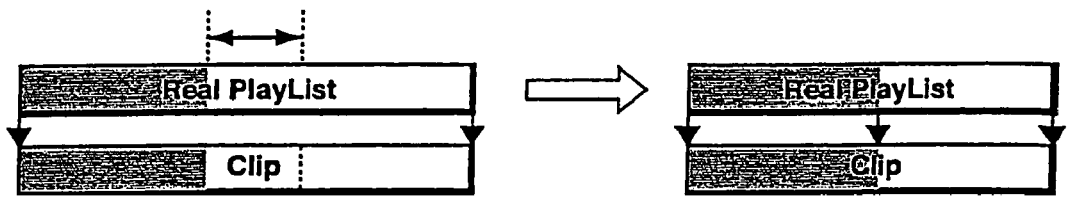
FIG. 36 is an explanatory diagram showing a relation, which is established between Clip and PlayList when a portion of a reproduction interval of Real PlayList is deleted.

FIG. 36 is an explanatory diagram showing the concept of a relation, which is established between Clip and PlayList when a portion of a reproduction interval of Real PlayList is deleted. PlayItem of PlayList is changed in such a way that only a required reproduction portion of the Clip AV stream is referred to. Then, unnecessary stream portions of the Clip AV stream are deleted. As shown in FIG. 36, even if the data of a middle portion of the Clip AV stream is deleted, the Clip AV stream file is not split, but remains as one file. Even if the data of a Clip AV stream is deleted partially, the remaining data portions are collected in one Clip AV stream.

When Real PlayList is changed and a stream portion of Clip referred to by Real PlayList is deleted, a Clip object referred to by Virtual PlayList using the same Clip object is lost, probably raising a problem. In order to solve the problem, the user interface takes the following countermeasures.

The user interface warns the user by issuing a query: "There exists Virtual PlayList referring to a stream portion of Clip referred to by Real PlayList so that, if Real PlayList is deleted, Virtual PlayList is also deleted as well. Do you allow Virtual PlayList to be deleted as well?" Instead of deleting Virtual PlayList, minimization processing is carried out on Real PlayList.

Figure 37:
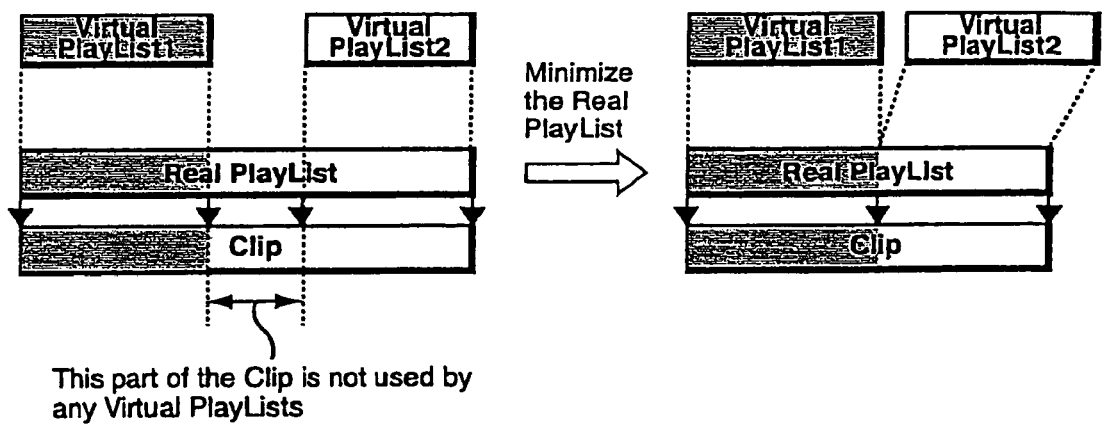
FIG. 37 is an explanatory diagram showing minimization editing.

FIG. 37 is an explanatory diagram showing the concept of a relation established among Clip, Real PlayList and Virtual PlayList as a result of minimization editing. Minimization editing is processing to change PlayItem of Real PlayList so that only stream portions of Clip required by Virtual PlayList are referred to. That is to say, stream portions not required by Virtual PlayList are deleted.

As shown in FIG. 37, even if the data of a middle portion of the Clip AV stream is deleted, the Clip AV stream file is not split, but remains as one file. Even if the data of a Clip AV stream is deleted partially, the remaining data portions are collected in one Clip AV stream.

On the basis of the concept described above, the change of Clip information file in case of the data of the Clip AV stream being partially deleted is described hereafter.

As described above, when an AV stream is recorded as a Clip file, the Clip object does not include ATC discontinuities and thus has only one ATC-sequence. It is assumed that an ATC discontinuity is created only when the stream data of the Clip AV stream file is deleted partially in an editing process or the like. That is to say, as shown in FIGS. 36 and 37, when the data of one Clip-AV stream is partially deleted and remaining data portions are collected in the single Clip-AV stream, the Clip object has ATC discontinuities and a plurality of ATC-sequences. In an editing example shown in FIG. 38, for instance, Clip prior to an editing process includes no ATC discontinuities and thus has only one ATC-sequence. Then, as shown in the figure, when data of a middle portion of the Clip AV stream is deleted, Clip after the editing process has two ATC-sequences.

FIG. 39 is an explanatory diagram showing a relation, which is established among an ATC-sequence, an STC-sequence and a program sequence when data of a Clip AV stream is partially deleted. Clip prior to an editing process has one ATC-sequence, one STC-sequence and one program sequence. That is to say, in Clip, the contents of the program sequence do not change. In this editing process, assume that pieces of AV stream data, which are indicated by darkened portions in the figure, are deleted. In this case, Clip after the editing process has 3 ATC-sequences, 3 STC-sequences and only one program sequence, which remains as it is as a result of the editing process. The program sequence extends over the boundaries of the ATC and STC-sequences.

The following description explains a relation, which is set between Clip and PlayList when data of AV stream data is partially deleted.

FIG. 40 is an explanatory diagram showing a relation, which is established between Clip and PlayList when a portion of Clip AV stream having EP_map CPI is deleted. Clip prior to an editing process has one ATC-sequence and three STC-sequences. offset_STC_id[0] for the ATC-sequence is a zero. Assume that an STC-sequence with stc_id=1 in Clip is used in PlayItem2 and PlayItem3. As shown in the figure, AV stream data of the STC-sequence with stc_id=1 is edited. To be more specific, AV stream data of a part not used in PlayItem2 and PlayItem3 are deleted.

As a result of the editing process, Clip now has two ATC-sequences and the STC-sequence with stc_id=1 is split into two STC-sequences. offset_STC_id[O] for the first ATC-sequence is set at a zero and offset_STC_id[1] for the second ATC-sequence is set at 1. Thus, both stc_id of the latter STC-sequence on the first ATC-sequence and stc_id of the former STC-sequence on the second ATC-sequence are 1.

Therefore, it is not necessary to change the value of ref_to_STC_id of post-editing Virtual PlayList's PlayItem3 and the value of ref_to_STC_id of post-editing Virtual PlayList's PlayItem4. That is to say, when partial data of the Clip AV stream file is deleted, it is not necessary to change Virtual PlayList that does not use the deleted part.

Since an ATC discontinuity can be created in a Clip AV stream in this way, if stream data of a middle part of the Clip AV stream is deleted, it is not necessary to split the Clip file into two portions. In addition, by using offset_STC id for stc_id of the first STC-sequence on an ATC-sequence for each of ATC-sequences, it is not necessary to change Virtual PlayList not using a partial part of the Clip AV stream file, which is deleted in partial deletion of the Clip AV stream file.

In order to help the user understand the effect, FIG. 41 is used as a diagram for explaining a case in which a Clip file is split into two parts when a portion of a Clip AV stream having EP_map CPI is deleted as well as a diagram for a relation between Clip and PlayList for the case.

Much like the example shown in FIG. 40, Clip prior to an editing process has one ATC-sequence and three STC-sequences. offset_STC_id[0] for the ATC-sequence is a zero. Assume that an STC-sequence with stc_id=1 in Clip is used in PlayItem2 and PlayItem3. As shown in the figure, AV stream data of the STC-sequence with stc=1 is edited. To be more specific, AV stream data of a part not used in PlayItem2 and PlayItem3 is deleted.

If no ATC discontinuity is allowed in Clip, after the editing process, Clip is divided into two files, namely, Clip-A and Clip-B. It is thus necessary to change the Clip file name referred to by PlayItem3 and PlayItem4. That is to say, when partial data of the Clip AV stream file is deleted, in some cases, it is necessary to change the contents of Virtual PlayList even if PlayList does not use the deleted partial data.

In comparison with a case in which ATC discontinuities are allowed in Clip, the case in which no ATC discontinuity is allowed in Clip has the following problems:

(1): The number of files recorded on the disk increases. Thus, at the start of disk reproduction processing, it takes a longer time to read out all Clip files and store the files in the memory of the reproduction apparatus (corresponding to a memory embedded in the control unit 17 employed in the moving-picture recording/reproduction apparatus 1, the configuration of which is shown in FIG. 43). In addition, if the upper limit to the number of files recordable in the disk (corresponding to a recording medium 10 employed in the moving-picture recording/reproduction apparatus 1, the configuration of which is shown in FIG. 43) is set at a predetermined value and the number of Clip files increases due to an editing process or the like, exceeding the upper limit, data can no longer be recorded onto the disk in spite of the fact that a storage free area still exists on the disk.

(2): When partial data of the Clip AV stream file is deleted, it takes a long time to change Virtual PlayList existing on the disk.

The present invention solves the problems described above. To put it in detail, by virtue of the present invention, it is possible to shorten the time required to read out all Clip files and store the files in the memory employed in the reproduction apparatus at the start of the disk reproduction processing. Further, it is possible to set lower number as maximum of files which can be recorded on the disk. In addition, it is also possible to reduce the time, which is required to change Virtual PlayList existing on the disk when partial data of the Clip AV stream file is deleted.

FIG. 42 is an explanatory diagram showing a relation, which is established between Clip and PlayList when a portion of Clip AV stream having TU_map CPI is deleted. Clip prior to an editing process has one ATC-sequence. offset_arrival_time[0] for this ATC-sequence is a zero. Assume that PlayItem1, PlayItem2, PlayItem3 and PlayItem4 of Virtual PlayList refer to this ATC-sequence. Then, as shown in the figure, AV stream data of this ATC-sequence is edited. To be more specific, AV stream data not used in any of the PlayItem objects is deleted.

Clip after the editing process has two ATC-sequences. offset_arrival_time[0] for the first ATC-sequence is set at a zero and offset_arrival_time[1] for the second ATC-sequence is set at a value X, which is greater than OUT_time2 but smaller than IN_time3. That is to say, after the editing process, it is not necessary to change the values of IN_time and OUT_time, which belong to PlayItem3 of Virtual PlayList as well as the values of IN_time and OUT_time, which belong to PlayItem4 of Virtual PlayList.

It is not necessary to change Virtual PlayList not using partial part of the Clip AV stream file, which is deleted in partial deletion of the Clip AV stream file.

In reproduction of PlayList of the TU_map type, the player is capable of finding an ATC-sequence pointed to by IN_time and OUT_time by comparing the value of IN_time of PlayItem with the value of offset_arrival_time of the ATC-sequence. In the example shown in FIG. 42, for instance, since IN_time3 of PlayItem3 is greater than offset_arrival_time (=X) of the second ATC-sequence, it is obvious that PlayItem3's IN_time3 and OUT_time3 point to the second ATC-sequence.

By referring to a block diagram of FIG. 43 showing the moving-picture recording/reproduction apparatus 1, the following description explains a recording/reproduction system for recording/reproducing data with the DVR-application structure.

A read unit 11 employed in a reproduction unit 61 reads out information recorded on a recording medium 10, which is typically an optical disk. A demodulation unit 12 demodulates data read out by the read unit 11 from the recording medium 10 and supplies demodulated data to an ECC decoding unit 13. The ECC decoding unit 13 splits the data received from the demodulation unit 12 into an AV stream and a database, supplying the AV stream and the database to a source depacketizer 14 and the control unit 17, respectively.

The source depacketizer 14 depacketizes the input AV stream and outputs a result of depacketization to a demultiplexer 15. The demultiplexer 15 splits the depacketization result received from the source depacketizer 14 into video data (V), audio data (A) and system data (S), outputting the video data, the audio data and the system data to an AV decoder 16 and a multiplexer 25.

The AV decoder 16 decodes the video data and the audio data on the basis of the system data, outputting video and audio signals from video and audio terminals 18 and 19 respectively.

Video and audio signals input from video and audio input terminals 21 and 22 respectively are supplied to an AV encoder 23 employed in a recording unit 62. The video signal is also supplied to a video analysis unit 24. In place of the video signal input from the video-input terminal 21, a video signal output by the AV decoder 16 may be supplied to the AV encoder 23 and the video analysis unit 24 if necessary.

The AV encoder 23 encodes the input video and audio signals, outputting an encoded video signal (V), an encoded audio signal (A) and system data (S) for the encoding process to a multiplexer 25.

The video analysis unit 24 analyzes the input video signal and outputs a result of analysis to the control unit 17.

A terminal 33 receives a transport stream from a digital interface or a digital television tuner. The transport stream is supplied to the demultiplexer 15 or a switch 28 by way of a switch 27. The transport stream supplied to the switch 28 is forwarded to a multiplexed-stream analysis unit 26 and a source packetizer 29. By changing the setting position of the switch 28, instead of supplying the transport stream supplied from the switch 27 to the multiplexed-stream analysis unit 26 and the source packetizer 29, a signal output by the multiplexer 25 can be supplied to the multiplexed-stream analysis unit 26 and the source packetizer 29 by way of the switch 28.

The multiplexed-stream analysis unit 26 analyzes the input signal and outputs a result of analysis to the control unit 17. The source packetizer 29 packetizes the input signal and supplies a result of packetization to an ECC coding unit 30. The ECC coding unit 30 also receives a database from the control unit 17.

The ECC coding unit 30 adds error correction codes to the input and encodes the input, supplying coded data to a modulation unit 31. The modulation unit 31 modulates the coded data received from the ECC coding unit 30 and outputs modulated data to a write unit 32. The write unit 32 carries out processing to write the modulated data received from the modulation unit 31 onto the recording medium 10.

The control unit 17 has a storage unit 17A for storing various kinds of data. The control unit 17 manages the formats described earlier and controls other components for recording/reproducing data onto and from the recording medium 10.

The control unit 17 is connected to a drive 41 for driving a magnetic disk 51, an optical disk 52, a magneto-optical disk 53 or a semiconductor memory 54.

It should be noted that the optical disk 52 can be used in conjunction with the recording medium 10.

Next, basic recording operations are described by explaining a case in which the moving-picture recording/reproduction apparatus 1 itself encodes and records input audio and video signals.

The video and audio signals are input through respectively the video and audio input terminals 21 and 22 of the recording unit 62. The video signal is supplied to the video analysis unit 24 and the AV encoder 23. The AV encoder 23 also receives the audio signal. The AV encoder 23 encodes the input video and audio signals, outputting an encoded video stream (V), an encoded audio stream (A) and system information (S) to the multiplexer 25.

The encoded video stream (V) is typically an MPEG-2 video stream while the encoded audio stream (A) is typically an MPEG-1 audio stream or a Dolby AC3 (trademark) audio stream or the like. The system information (S) is time information such as information on AV synchronization and video/audio encoding information including the number of bytes composing an encoded picture, the number of bytes composing an audio frame and a picture encoding type.

The multiplexer 25 multiplexes the input streams on the basis of the input system information to produce a multiplexed stream. The multiplexed stream is typically an MPEG-2 transport stream or an MPEG-2 program stream. The multiplexed stream is supplied to the multiplexed-stream analysis unit 26 and the source packetizer 29. In accordance with the application format of the recording medium 10, the source packetizer 29 encodes the input multiplexed stream into an AV stream comprising source packets. The ECC coding unit 30 adds error correction codes to the AV stream prior to modulation in the modulation unit 31, which outputs a modulated AV stream to the write unit 32. The write unit 32 finally records an AV stream file onto the recording medium 10 in accordance with a control signal generated by the control unit 17.

The following description explains operations to record a transport stream such as a digital TV broadcast signal input from one of a digital interface and a digital TV tuner, which are not shown in the figure.

The digital input terminal 33 is a terminal for receiving a transport stream. There are two methods of recording the input transport stream. One of the methods is a transparent recording method. The other method is a technique whereby the stream is re-encoded before being recorded for the purpose of lowering the recording bit rate. The control unit 17 receives information which indicating recording method is to be adopted from a terminal 20, which is used as an input/output user interface. The control unit 17 controls the recording method.

In the case of the transparent recording method, the input transport stream is supplied to the multiplexed-stream analysis unit 26 and the source packetizer 29. Operations carried out thereafter to record the AV stream onto the recording medium 10 are the same as the processing to encode and record input audio and video signals as described above.

In the case of the method whereby the input transport stream is re-encoded prior to a recording process, the input transport stream is supplied to the demultiplexer 15. The demultiplexer 15 supplies the video stream (V) to the AV decoder 16. The AV decoder 16 decodes the video stream and supplies a reproduced video signal obtained as a result of the decoding process to the AV encoder 23. The AV encoder 23 encodes the reproduced video signal and supplies the encoded video stream (V) to the multiplexer 25.

On the other hand, the audio stream (A) and the system information (S), which are output by the demultiplexer 15, are supplied directly to the multiplexer 25. The multiplexer 25 multiplexes the input video and audio streams on the basis of the input system information to produce a multiplexed stream. Operations carried out thereafter to record the AV stream onto the recording medium 10 are the same as the processing to encode and record input audio and video signals as described above.

The moving-picture recording/reproduction apparatus 1 records not only an AV stream file, but also application database information relevant to the file. The application database information is created by the control unit 17. Information input to the control unit 17 includes characteristic information of the moving picture output by the video analysis unit 24, characteristic information of the AV stream output by the multiplexed-stream analysis unit 26 and a command entered by the user to the user-interface input/output terminal 20 used as a user interface.

The moving picture characteristic information output by the video analysis unit 24 is generated in the moving-picture recording/reproduction apparatus 1 when the moving-picture recording/reproduction apparatus 1 itself encodes the video signal. The video analysis unit 24 analyzes data conveyed by an input video signal to generate information on a picture at characteristic mark points in the input moving-picture signal. This information is information indicating pictures at characteristic mark points such as program start points of the input video signal, scene-change points and CM start/end points. In addition, the information includes thumbnails of the pictures. The information indicating the pictures is supplied to the multiplexer 25 through the control unit 17.

When the multiplexer 25 multiplexes encoded pictures at mark points indicated by the control unit 17, the multiplexer 25 returns addresses, at which the encoded pictures are located on the AV stream, to the control unit 17. The control unit 17 stores the address, at which each encoded picture is located on the AV stream, by associating the address with the type of the characteristic picture.

The characteristic information of AV stream output by the multiplexed-stream analysis unit 26 is related to encoding information of the AV stream to be recorded and generated in the moving-picture recording/reproduction apparatus 1. The characteristic information of AV stream output by the multiplexed-stream analysis unit 26 includes a time stamp and an address of an I picture in the AV stream, information on STC discontinuities in the AV stream, information on changes in program contents in the AV stream as well as an arrival time and an address in the AV stream.

The time stamp and the address of an I picture in the AV stream is processed as data to be stored in EP_map described earlier. The information on STC discontinuities in the AV stream is processed as data to be stored in SequenceInfo described earlier. The information on changes in program contents in the AV stream is processed as data to be stored in ProgramInfo described earlier. The arrival time and the address in the AV stream are stored in TU_map described before.

In the case of the transparent method to record a transport stream input from the digital input terminal 33, the multiplexed-stream analysis unit 26 detects a picture at a characteristic mark point in the AV stream, generating the type and the address of the picture. The type and the address are processed as data to be stored in ClipMark.

The characteristic information of the AV stream output by the multiplexed-stream analysis unit 26 is stored in a database (Clip information) of the AV stream.

A command entered by the user to the user-interface input/output terminal 20 includes information specifying a desired reproduction interval in the AV stream, a character text explaining the contents of the reproduction interval, a book mark to be set in a scene desired by the user and a time stamp of a resume point in the AV stream. The command entered by the user is stored in the database of PlayList.

The control unit 17 creates a database (Clip information) of the AV stream, a database of PlayList, management information (information.dvr) of data recorded on the recording medium 10 and thumbnail information on the basis of the input information described above. These pieces of database information are processed by the ECC coding unit (correcting errors) 30 and the modulation unit 31 in the same way as the AV stream and supplied to the write unit 32. In accordance with a control signal generated by the control unit 17, the write unit 32 supplies the database information to the recording medium 10 to be recorded as application database information.

Next, basic reproduction processing is explained.

The recording medium 10 is used for recording AV stream files and application database information.

First of all, the control unit 17 requests the read unit 11 employed in the 61 to read out application database information from the recording medium 10. At this request, the read unit 11 reads out the application database information from the recording medium 10. The application database information is processed by the demodulation unit 12 and the ECC decoding unit 13 before being supplied to the control unit 17.

The control unit 17 outputs a list of PlayList objects recorded on the recording medium 10 to the user-interface input/output terminal 20 on the basis of the application database information. The user selects PlayList to be reproduced from the list and enters the selected PlayList object to be reproduced to the control unit 17. The control unit 17 requests the read unit 11 to read out an AV stream file required for reproduction of the selected PlayList object from the recording medium 10. The read unit 11 reads out the required AV stream file from the recording medium 10. The AV stream file read out from the recording medium 10 is processed by the demodulation unit 12 and the ECC decoding unit 13 before being supplied to the source depacketizer 14.

The source depacketizer 14 converts the AV stream file having an application format for the recording medium into a stream that can be supplied to the demultiplexer 15. The demultiplexer 15 supplies a video stream (V), an audio stream (A) and system information (S), which compose the AV stream's reproduction interval (PlayItem) specified by the control unit 17, to the AV decoder 16. The AV decoder 16 decodes the video and audio streams to generate reproduced video and audio signals to be supplied to the video and audio output terminals 18 and 19 respectively.

If it is desired to reproduce EP_map-type PlayList selected by the user from a middle point of time, the control unit 17 requests the read unit 11 to read out data starting from the address of an I picture having a PTS closest to the specified point of time.

In addition, if it is desired to reproduce TU_map-type PlayList selected by the user from a middle point of time, the control unit 17 requests the read unit 11 to read out data starting from the address of a source packet having an arrival time closest to the specified point of time.

Furthermore, when the user selects a mark among head-appearance point and scene-change points of the program, the control unit 17 determines a location to read out the AV stream from the recording medium 10 on the basis of contents of Clip information and requests the read unit 11 to read out the AV stream from the recording medium 10. The head-appearance point and the scene-change points are stored in ClipMark of Clip information. The user typically selects the mark from a list of thumbnail pictures representing the program's scene-change points and head-appearance point, which are stored in ClipMark of Clip information. The list is displayed on the user interface.

At the request, the read unit 11 reads out data of an I picture at an address closest to an address in the AV stream. At the address of the AV stream, a picture selected by the user is stored. The data read out by the read unit 11 from the specified address is processed by the demodulation unit 12 and the ECC decoding unit 13 before being supplied to the AV decoder 16 by way of the demultiplexer 15. The AV decoder 16 decodes the data to reproduce AV data at the address of a picture at the mark point.

The following description explains a case in which the user edits an AV stream.

When the user desires to create a new reproduction path by specifying a reproduction interval of an AV stream stored on the recording medium 10, information of en and out points on the reproduction interval is supplied from the user-interface input/output terminal 20 to the control unit 17. The control unit 17 then creates a database of PlayList, which is a group of reproduction intervals (PlayItem objects) of the AV stream.

When the user desires to delete an unnecessary specific portion of an AV stream stored on the recording medium 10, information on an interval to be deleted is supplied from the user-interface input/output terminal 20 to the control unit 17. The control unit 17 changes the database of PlayList so as to refer to only a required portion of the AV stream. The control unit 17 also requests the write unit 32 to delete the unnecessary specific portion of the AV stream. The contents of the Clip information file are changed on the basis of the change in Clip AV stream.

The following description explains operations for a case in which the user desires to create a new reproduction path by specifying reproduction intervals of an AV stream stored on the recording medium 10 and connect the intervals to each other seamlessly. In this case, the control unit 17 creates a database of PlayList, which is a group of reproduction intervals (PlayItem objects) of the AV stream. In addition, it is also necessary to partially re-encode and re-multiplex the video stream's portions close to junction points of the reproduction intervals.

First of all, information on pictures at in and out points of each reproduction interval is supplied from the user-interface input/output terminal 20 to the control unit 17. The control unit 17 requests the read unit 11 to read out data, which is required for reproduction of the pictures at the in and out points, from the recording medium 10. The read unit 11 reads out the data from the recording medium 10. The data is supplied to the demultiplexer 15 by way of the demodulation unit 12, the ECC decoding unit 13 and the source depacketizer 14.

The control unit 17 analyzes the stream supplied to the demultiplexer 15 in order to determine methods to re-encode and re-multiplex the video stream, supplying the methods to the AV encoder 23 and the multiplexer 25. The re-encoding method includes techniques as to how picture_coding_type is changed and how coded-bit counts are allocated in the re-encoding process.

Then, the demultiplexer 15 splits the input stream into a video stream (V), an audio stream (A) and system information (S). The video stream comprises data to be supplied to the AV decoder 16 and data to be directly supplied to the multiplexer 25. The former data is data to be re-encoded. This data is decoded by the AV decoder 16. A picture obtained as a result of the decoding process is re-encoded by the AV encoder 23 into a video stream. The latter data is data copied from the original stream and is not re-encoded. The audio stream and the system information are supplied directly to the multiplexer 25.

The multiplexer 25 multiplexed the input streams to generate a demultiplexed stream on the basis of the information received from the control unit 17. The demultiplexed stream is processed by the ECC coding unit 30 and the modulation unit 31 before being supplied to the write unit 32. The write unit 32 records the AV stream onto the recording medium 10 in accordance with a control signal received from the control unit 17.

Figure 44:
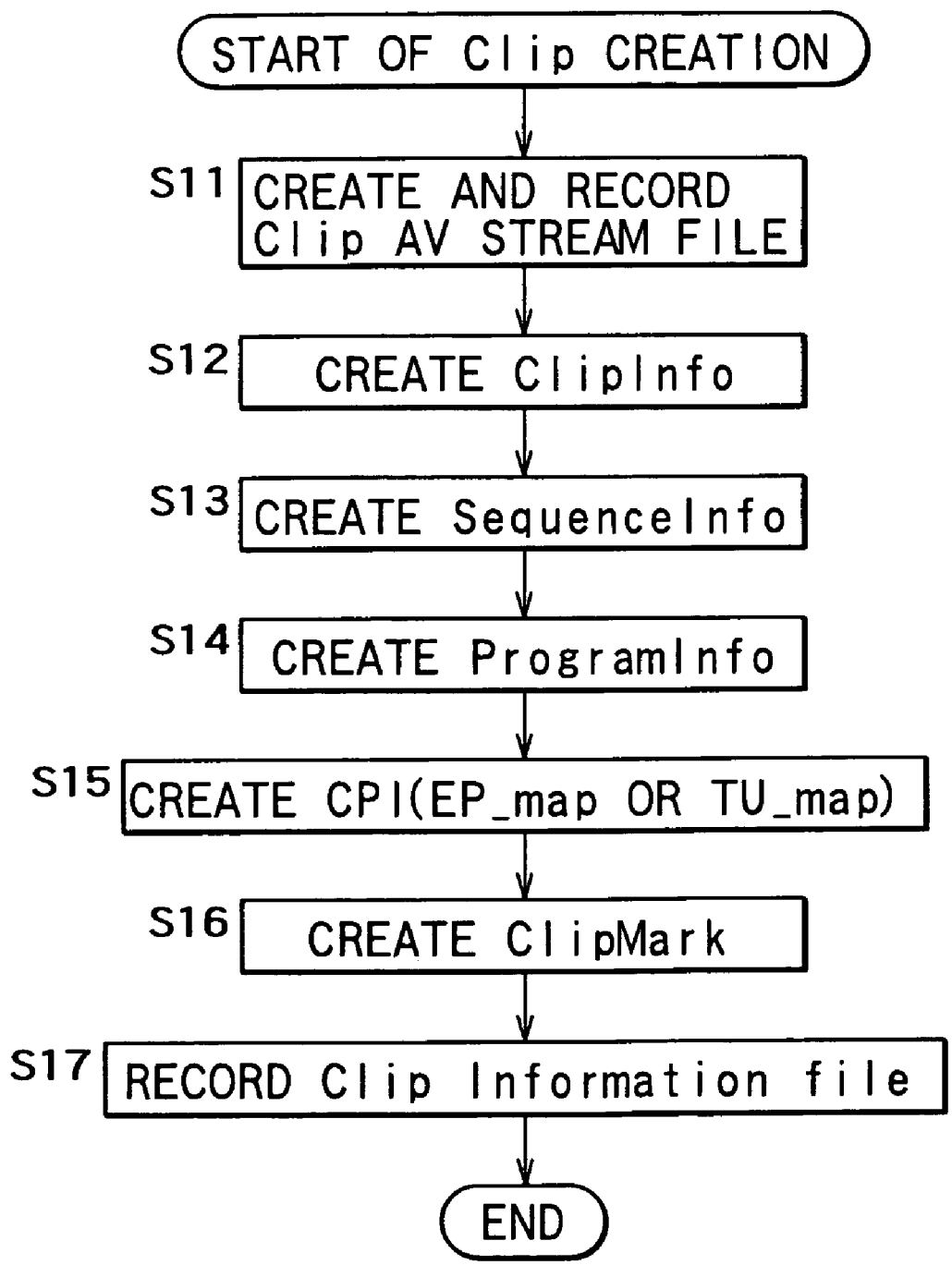
FIG. 44 shows an explanatory flowchart representing operations to create Clip.

FIG. 44 shows a flowchart representing operations carried out by the moving-picture recording/reproduction apparatus 1 to create a Clip AV stream file and a Clip information file in processing to record an AV stream as a new Clip object.

As shown in the figure, the flowchart begins with a step S11 at which the control unit 17 creates and records a Clip AV stream file for a transport stream obtained as a result of a process to encode AV inputs received from the video and audio input terminals 21 and 22 or a transport stream input from the digital-interface terminal 33.

Then, at the next step S12, the control unit 17 creates ClipInfo shown in FIG. 8 for the AV stream file.

Subsequently, at the next step S13, the control unit 17 creates SequenceInfo shown in FIG. 13 for the AV stream file.

Then, at the next step S14, the control unit 17 creates ProgramInfo shown in FIG. 15 for the AV stream file.

Subsequently, at the next step S15, the control unit 17 creates CPI (EP_map or TU_map) shown in FIGS. 24, 25 and 26 for the AV stream file.

Then, at the next step S16, the control unit 17 creates ClipMark for the AV stream file.

Subsequently, at the next step S17, the control unit 17 creates a Clip information file shown in FIG. 8. The Clip information file is used for recording ClipInfo, SequenceInfo, ProgramInfo, CPI and ClipMark, which are cited above.

It should be noted that, while the above explanation indicates that the pieces of processing are carried out sequentially along the time axis, the pieces of processing are actually performed simultaneously at the same time at the steps S11 to S16.

Figure 45:
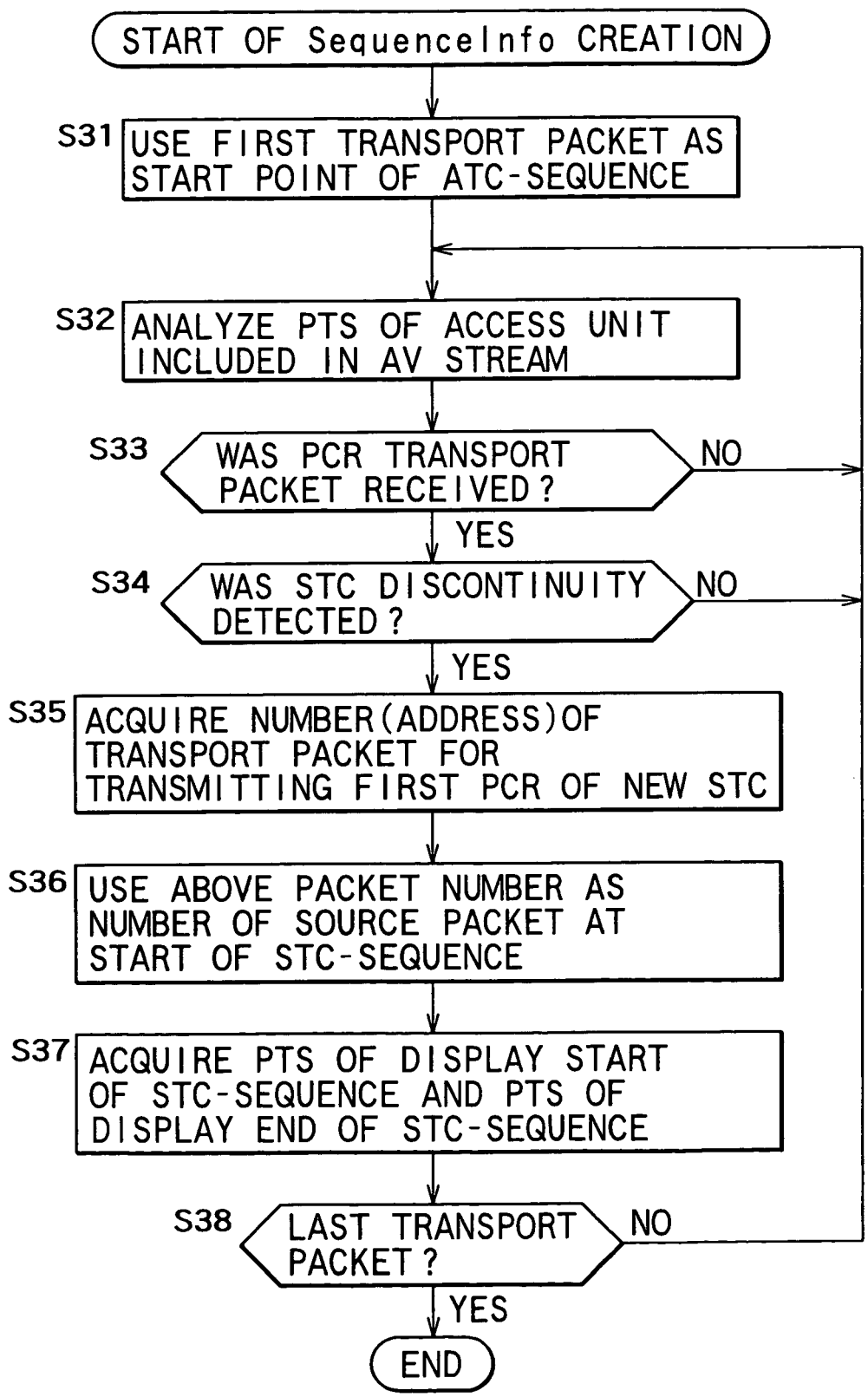
FIG. 45 shows an explanatory flowchart representing operations to create SequenceInfo.

By referring to a flowchart shown in FIG. 45, the following description explains typical operations to create SequenceInfo shown in FIG. 13 in processing to record an AV stream as new Clip. The operations are carried out by the multiplexed-stream analysis unit 26 employed in the moving-picture recording/reproduction apparatus 1, the configuration of which is shown in FIG. 43.

As shown in the figure, the flowchart begins with a step S31 at which the control unit 17 uses the first transport packet as the start point of an ATC-sequence. That is to say, the control unit 17 sets SPN_ATC_start. At that time, atc_id and stc_id are also set as well.

Then, at the next step S32, the multiplexed-stream analysis unit 26 analyzes a PTS of an access unit included in the AV stream. An example of the access unit is a picture or a video frame.

Subsequently, at the next step S33, the multiplexed-stream analysis unit 26 forms a judgment as to whether or not a PCR packet has been received. If the outcome of the judgment formed at the step S33 indicates that a PCR packet has not been received, the flow of the processing goes back to the step S32. If the outcome of the judgment formed at the step S33 indicates that a PCR packet has been received, on the other hand, the flow of the processing goes on to a step S34.

At the step S34, the multiplexed-stream analysis unit 26 forms a judgment as to whether or not an STC discontinuity has been detected. If the outcome of the judgment formed at the step S34 indicates that an STC discontinuity has not been detected, the flow of the processing goes back to the step S32. If the outcome of the judgment formed at the step S34 indicates that an STC discontinuity has been detected, on the other hand, the flow of the processing goes on to the step S35. In the case of the first received PCR packet, the flow of the processing always goes on to the step S35.

At the step S35, the multiplexed-stream analysis unit 26 acquires the number (the address) of a transport packet for transmitting a first PCR of the new STC-sequence.

Then, at the next step S36, the control unit 17 uses the packet number acquired at the step S35 as the number of a source packet at the beginning of the STC-sequence. That is to say, SPN_STC_start is set. In addition, new stc_id is also set as well.

Subsequently, at the next step S37, the control unit 17 acquires the display-start PTS of the STC-sequence and display-end PTS and sets the display-start PTS and the display-end PTS in presentation_start_time and presentation_end_time, respectively. The control unit 17 then creates SequenceInfo shown in FIG. 13 on the basis of the display-start PTS and the display-end PTS.

Then, at the next step S38, the control unit 17 forms a judgment as to whether or not the last transport packet has been received. If the outcome of the judgment formed at the step S38 indicates that the last transport packet has not been received, the flow of the processing goes back to the step S32. If the outcome of the judgment formed at the step S38 indicates that the last transport packet has been received, on the other hand, the processing to create SequenceInfo is finished.

It should be noted that, in the case of Clip with TU_map CPI, only information of the ATC-sequence needs to be created. Thus, the pieces of processing carried out at the steps S32 to S37 are not required.

Figure 46:
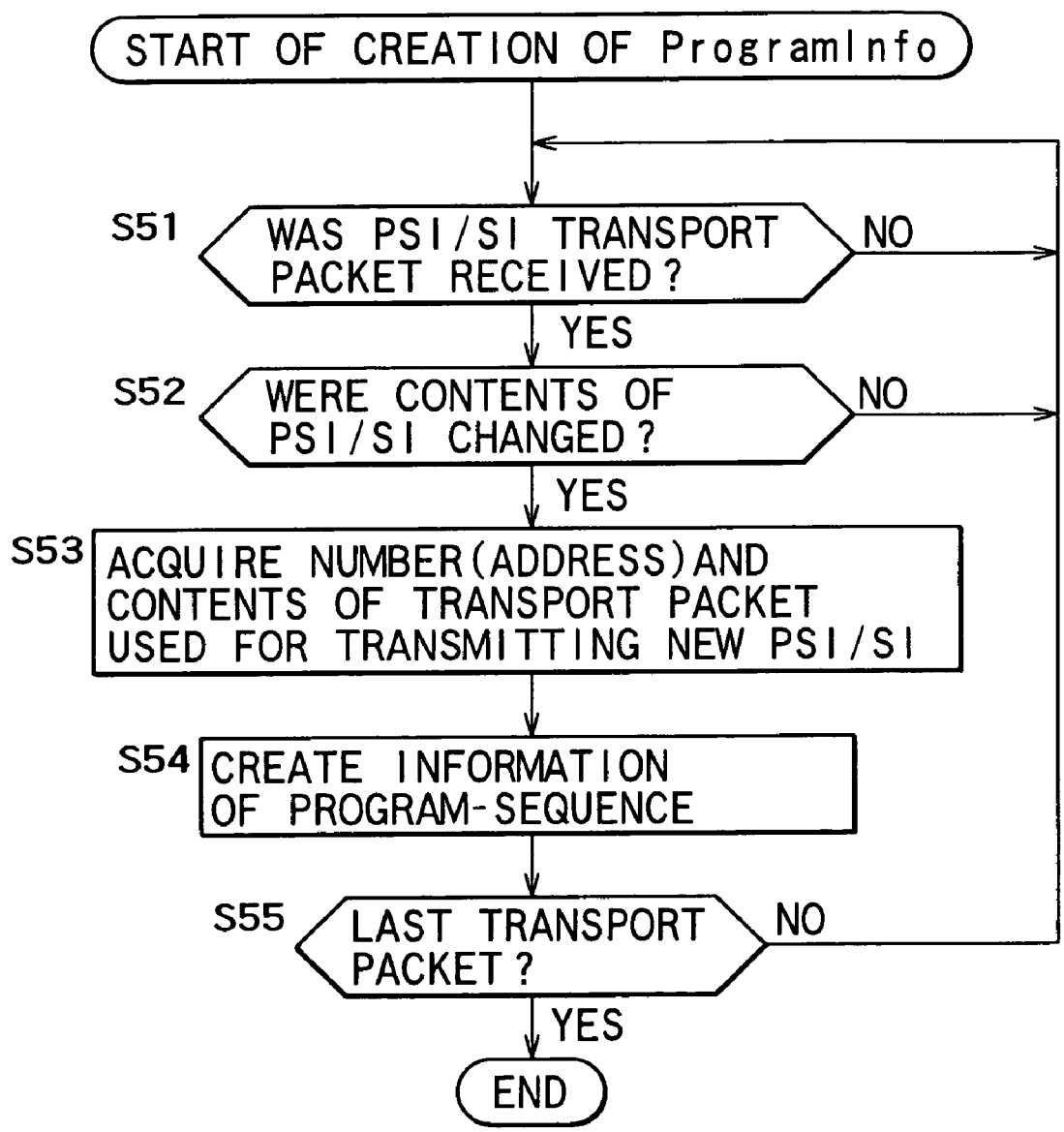
FIG. 46 shows an explanatory flowchart representing operations to create ProgramInfo.

Next, typical operations carried out to create ProgramInfo shown in FIG. 15 are explained by referring to a flowchart shown in FIG. 46. These operations are carried out by the multiplexed-stream analysis unit 26 employed in the moving-picture recording/reproduction apparatus 1, the configuration of which is shown in FIG. 43.

It should be noted that, in the case of Clip with TU_map CPI, the information of the program sequence is not required. Thus, the operations represented by the flowchart shown in FIG. 46 are not necessary.

As shown in the figure, the flowchart begins with a step S51 at which the multiplexed-stream analysis unit 26 forms a judgment as to whether or not a transport packet including PSI/SI has been received. To put it concretely, a transport packet including PSI/SI is a PAT, PMT and SIT packet. An SIT packet is a transport packet that describes service information of a partial transport stream prescribed by DVB specifications. If the outcome of the judgment formed at the step S51 indicates that a transport packet including PSI/SI has not been received, the flow of the processing goes back to the step S51. If the outcome of the judgment formed at the step S51 indicates that a transport packet including PSI/SI has been received, on the other hand, the flow of the processing goes on to a step S52.

At the step S52, the multiplexed-stream analysis unit 26 forms a judgment as to whether or not the contents of PSI/SI have changed. To put it in detail, the multiplexed-stream analysis unit 26 forms a judgment as to whether or not the contents of each of the PAT, the PMT and the SIT are different from the contents received previously. If the outcome of the judgment formed at the step S52 indicates that the contents have not changed, the flow of the processing goes back to the step S51. If the outcome of the judgment formed at the step S52 indicates that the contents have changed, on the other hand, the flow of the processing goes on to a step S53. It should be noted that, at the beginning of a recording operation, the PSI/SI is received for the first time. Thus, in this case, the flow of the processing always goes on to the step S53.

At the step S53, the control unit 17 acquires the number (the address) of the transport packet for transmitting the PSI/SI and the contents of the packet.

Then, at the next step S54, the control unit 17 creates information of the program-sequence in order to form ProgramInfo shown in FIG. 15.

Subsequently, at the next step S55, the control unit 17 forms a judgment as to whether or not the received transport packet is the last transport packet. If the outcome of the judgment formed at the step S55 indicates that the received transport packet is not the last transport packet, the flow of the processing goes back to the step S51. If the outcome of the judgment formed at the step S55 indicates that the received transport packet is the last transport packet, on the other hand, this processing to create ProgramInfo is finished.

Figure 47:
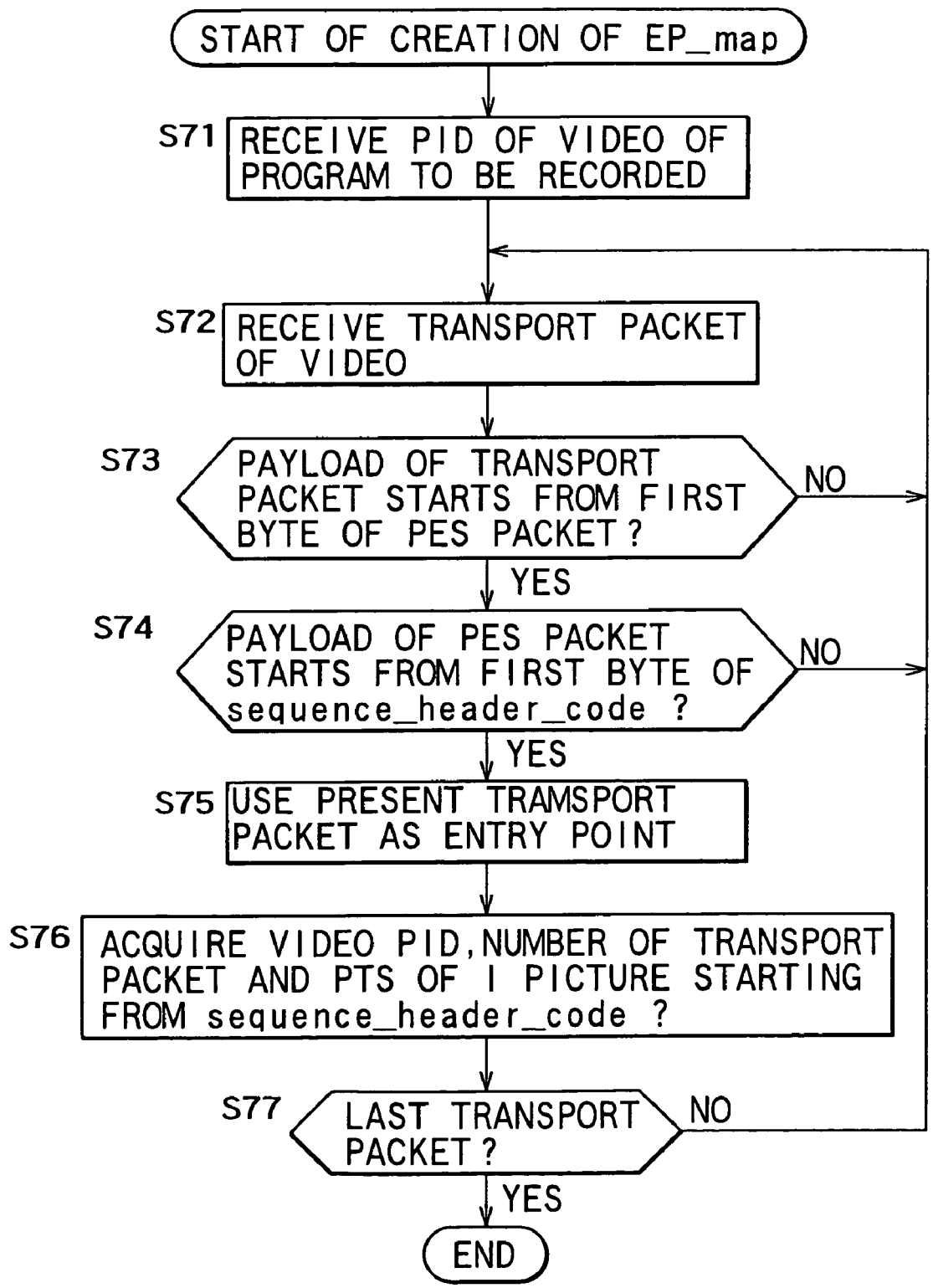
FIG. 47 shows an explanatory flowchart representing operations to create EP_map.

Next, typical operations carried out to create EP_map shown in FIG. 24 are explained by referring to a flowchart shown in FIG. 47. These operations are carried out by the multiplexed-stream analysis unit 26 employed in the moving-picture recording/reproduction apparatus 1, the configuration of which is shown in FIG. 43.

As shown in the figure, the flowchart begins with a step S71 at which the multiplexed-stream analysis unit 26 sets the PID of the video of an AV program to be recorded. If the transport stream includes a plurality of videos, the multiplexed-stream analysis unit 26 sets the PID of each of the videos.

Then, at the next step S72, the multiplexed-stream analysis unit 26 receives the transport packet of the video.

Subsequently, at the next step S73, the multiplexed-stream analysis unit 26 forms a judgment as to whether or not the payload of the transport packet starts with the first byte of a PES packet. A payload is a packet portion that follows the header of the packet. Obtained as a result of packetization of an elementary stream, a PES packet is a packet prescribed in MPEG-2 specifications. The judgment is formed by examining the value of "payload_unit_start_indicator" included in the header of the transport packet. A value of 1 indicates that the payload of the transport packet starts with the first byte of a PES packet. If the outcome of the judgment formed at the step S73 indicates that the transport packet does not start with the first byte of a PES packet, the flow of the processing goes back to the step S72. If the outcome of the judgment formed at the step S73 indicates that the transport packet starts with the first byte of a PES packet, on the other hand, the flow of the processing goes on to a step S74.

At the step S74, the multiplexed-stream analysis unit 26 forms a judgment as to whether or not the payload of the PES packet starts with the first byte of sequence_header_code of the MPEG video. sequence_header_code is code of "0x000001B3" having a length of 32 bits. If the outcome of the judgment formed at the step S74 indicates that the payload of the PES packet does not start with the first byte of sequence_header_code, the flow of the processing goes back to the step S72. If the outcome of the judgment formed at the step S74 indicates that the payload of the PES packet starts with the first byte of sequence_header_code, on the other hand, the flow of the processing goes on to a step S75.

At the step S75, the control unit 17 uses the present transport packet as an entry point.

Then, at the next step S76, the control unit 17 acquires the number of the packet, the PTS of an I picture starting from sequence_header_code and the PID of a video to which the entry point pertains in order to create EP_map.

Subsequently, at the next step S77, the multiplexed-stream analysis unit 26 forms a judgment as to whether or not the present packet is the last input transport packet. If the outcome of the judgment formed at the step S77 indicates that the present packet is not the last input transport packet, the flow of the processing goes back to the step S72. If the outcome of the judgment formed at the step S77 indicates that the present packet is the last input transport packet, on the other hand, the processing to create EP_map is finished.

Figure 48:
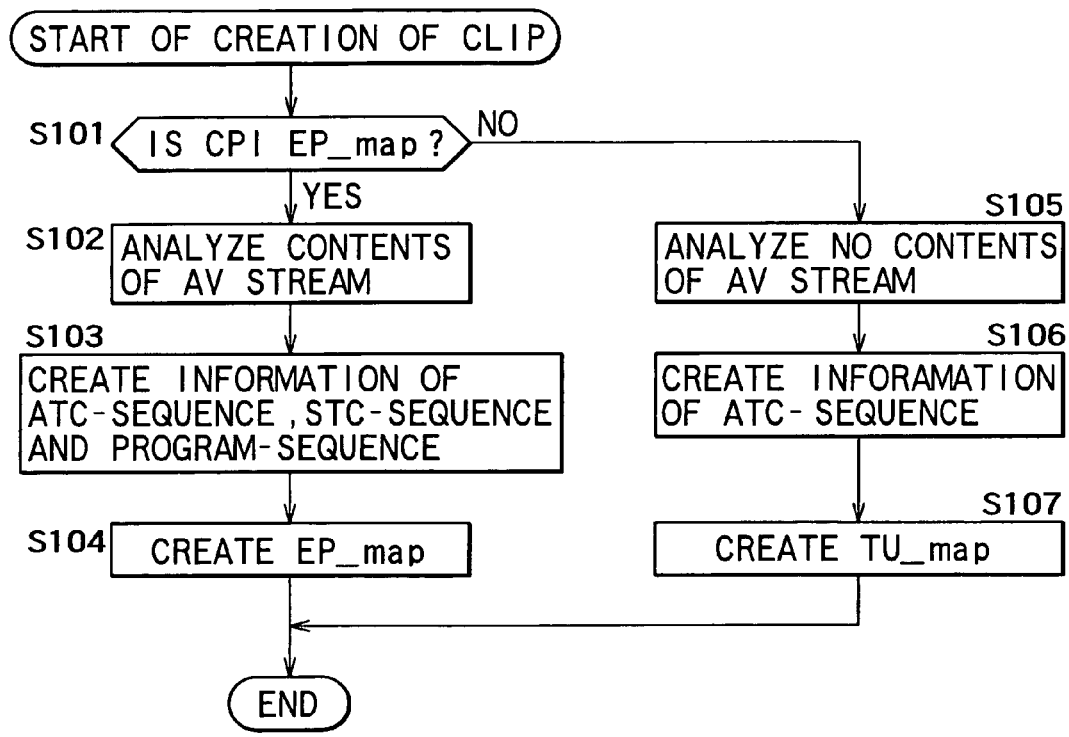
FIG. 48 shows an explanatory flowchart representing/different methods of creating Clip information for different CPI types of Clip.

It should be noted that the method to create a Clip information file varies in dependence on the CPI type of Clip. FIG. 48 is an explanatory flowchart representing different methods of creating a Clip information file for different CPI types of Clip. As shown in the figure, the flowchart begins with a step S101 at which the control unit 17 forms a judgment as to whether or not EP_map is to be created as the CPI. If the outcome of the judgment formed at the step S101 indicates that EP_map is to be created as the CPI, the flow of the processing goes on to a step S102 to analyze information of the PTS, the STC and the PMT for the contents of the AV stream. Then, at the next step S103, the control unit 17 creates information of an ATC-sequence, information of an STC-sequence and information of a program-sequence. Finally, at the next step S104, the control unit 17 creates EP_map.

If the outcome of the judgment formed at the step S101 indicates that TU_map is to be created as the CPI, on the other hand, the flow of the processing goes on to a step S105 at which neither the contents of the AV stream are analyzed nor information of an STC-sequence and information of a program sequence are created. Then, at the next step S106, the control unit 17 creates information of an ATC-sequence on the basis of an input timing of a transport packet. Finally, at the next step S107, the control unit 17 creates TU_map. In either case, a Clip information file is created without regard to the type of the CPI type as described above.

In this way, a Clip information file is created regardless of the type of the CPI.

The above has the following implication. In processing to record an AV stream onto a recording medium after understanding the contents of the AV stream, ATC, STC and program sequences as well as EP_map are created and recorded onto the recording medium_. Examples of the processing are a cognizant recording operation and a self-encoding recording operation. In the cognizant recording operation, the contents of an AV stream are analyzed before the AV stream is recorded onto a recording medium. In the self-encoding recording operation, on the other hand, an input video signal is encoded by the recording apparatus itself before being recorded onto a recording medium. In processing to record an AV stream onto a recording medium without understanding the contents of the stream, on the contrary, an ATC-sequence and TU_map are created and recorded onto the recording medium. The processing to record an AV stream onto a recording medium without understanding the contents of the stream is referred to as a non-cognizant recording operation.

The processing represented by the flowchart shown in FIG. 48 can be interpreted as follows. The flowchart begins with the step S101 to form a judgment as to whether or not the recording operation is either a cognizant recording operation in which the contents of an AV stream are analyzed before the AV stream is recorded onto a recording medium, or a self-encoding recording operation in which an input video signal is encoded by the recording apparatus itself before being recorded onto a recording medium. If the recording operation is either a cognizant recording operation or a self-encoding recording operation, at the step S102, the contents of the AV stream are analyzed, at the next step S103, an ATC-sequence, an STC-sequence and a program sequence are created and, at the final step S104, EP_map is created prior to a process to record the data onto the recording medium. If the outcome of the judgment formed at the step S101 indicates that the recording operation is a non-cognizant recording operation in which an AV stream is recorded onto a recording medium as it is without understanding the contents of the stream, on the contrary, at the step S105, the AV stream is subjected to no analysis of the stream contents, at the next step S106, an ATC-sequence is created and, at the final step S107, TU_map is created prior to a process to record the data onto the recording medium.

Figure 49:
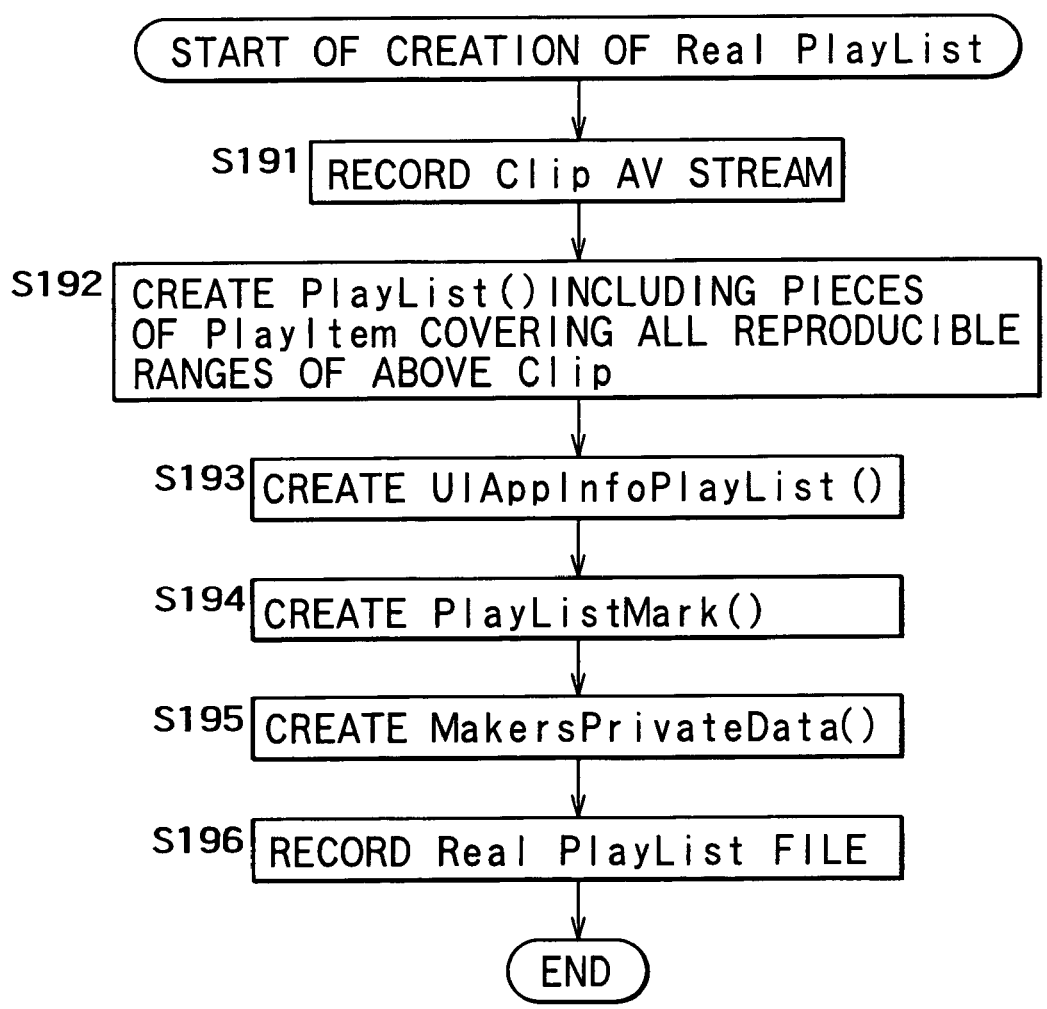
FIG. 49 shows an explanatory flowchart representing a method of creating Real PlayList.

FIG. 49 is an explanatory flowchart representing a method of creating Real PlayList. The method is explained by referring to a block diagram of FIG. 43 showing the configuration of the moving-picture recording/reproduction apparatus 1.

As shown in the figure, the flowchart begins with a step S191 at which the control unit 17 records a Clip AV stream.

Then, at the next step S192, the control unit 17 creates PlayList( ) shown in FIG. 28. Created PlayList( ) comprises PlayItem objects shown in FIG. 33. The PlayItem objects cover all reproducible ranges of Clip. If Clip has EP_map, EP_map-type PlayList shown in FIG. 29 is created. If Clip has TU_map, on the other hand, TU_map-type PlayList shown in FIG. 30 is created. In the case of EP_map-type PlayList, if Clip includes STC discontinuities so that PlayList( ) comprises at least 2 PlayList objects, the control unit 17 determines connection_condition between the PlayList objects.

Subsequently, at the next step S193, the control unit 17 creates UIAppInfoPlayList( )–UIAppInfoPlayList( ) includes information used for explaining the contents of PlayList to the user. In this embodiment, the explanation is omitted.

Then, at the next step S194, the control unit 17 creates PlayList Mark. In this embodiment, the explanation is omitted.

Subsequently, at the next step S195, the control unit 17 creates MakersPrivateData. In this embodiment, the explanation is omitted.

Then, at the next step S196, the control unit 17 records a Real PlayList file onto the recording medium 10.

As is obvious from the above description, each time a Clip AV stream is newly recorded, one Real PlayList file is created.

Figure 50:
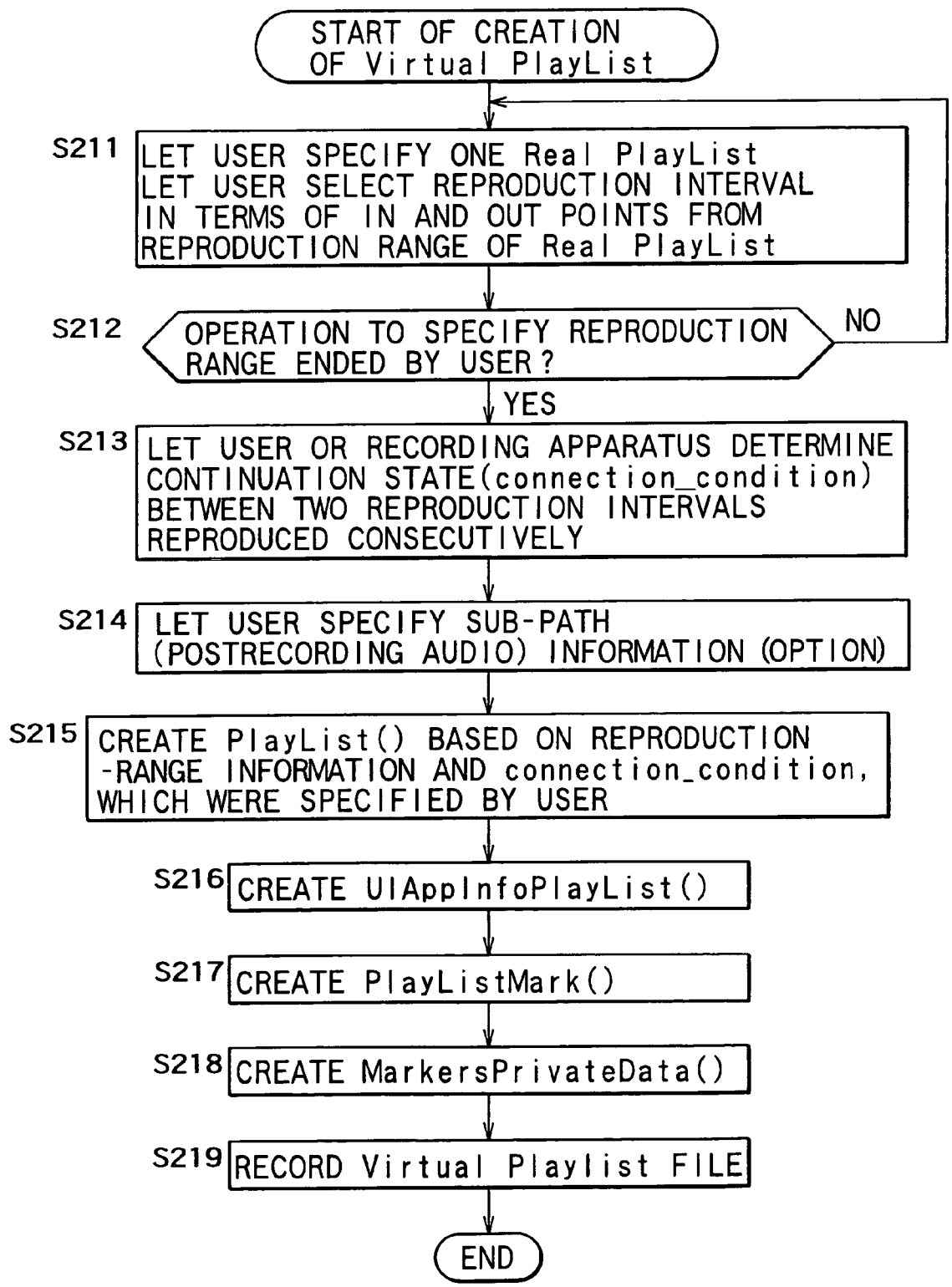
FIG. 50 shows an explanatory flowchart representing a method of creating Virtual PlayList.

FIG. 50 is a flowchart representing a method of creating Virtual PlayList.

As shown in the figure, the flowchart begins with a step S211 at which the user enters a request for reproduction of Real PlayList recorded on the disk serving as the recording medium 10 to the user interface. In the request, the user specifies a reproduction interval indicated by IN and OUT points entered to the user interface.

Then, at the next step S212, the control unit 17 forms a judgment as to whether or not the user has finished the operation to specify reproduction intervals, that is, ranges to be reproduced. If the user has not finished the operation, that is, if the user wants to specify another reproduction interval following the specified range to be reproduced next, the flow of the processing goes back to the step S211.

If the outcome of the judgment formed at the step S212 indicates that the user has finished the operation to specify reproduction intervals, on the other hand, the flow of the processing goes on to a step S213.

At the step S213, a condition of connection between two consecutive reproduction intervals to be reproduced continuously is determined by the user through the user interface or by the control unit 17. A condition of connection between two consecutive reproduction intervals is referred to as connection_condition.

Then, at the next step S214, the user specifies sub-path information (postrecording audio) through the user interface. If the user does not want to create a sub-path, the processing of this step is skipped. The sub-path information is information stored in SubPlayItem in PlayList. Since the sub-path information is not important to the present invention, however, the explanation of the sub-path information is omitted.

Subsequently, at the next step S215, the control unit 17 creates PlayList( ) shown in FIG. 28 on the basis of information on reproduction ranges specified by the user and connection_condition.

Then, at the next step S216, the control unit 17 creates UIAppInfoPlayList( ). UIAppInfoPlayList( ) includes information used for explaining the contents of PlayList to the user. In this embodiment, the explanation is omitted.

Then, at the next step S217, the control unit 17 creates PlayList Mark. In this embodiment, the explanation is omitted.

Subsequently, at the next step S218, the control unit 17 creates MakersPrivateData. In this embodiment, the explanation is omitted.

Then, at the next step S219, the control unit 17 records a Virtual PlayList file onto the recording medium 10.

As is obvious from the above description, each time the user selects desired reproduction intervals from a reproduction range of Real PlayList recorded on the recording medium 10, one Virtual PlayList file is created.

Figure 51:
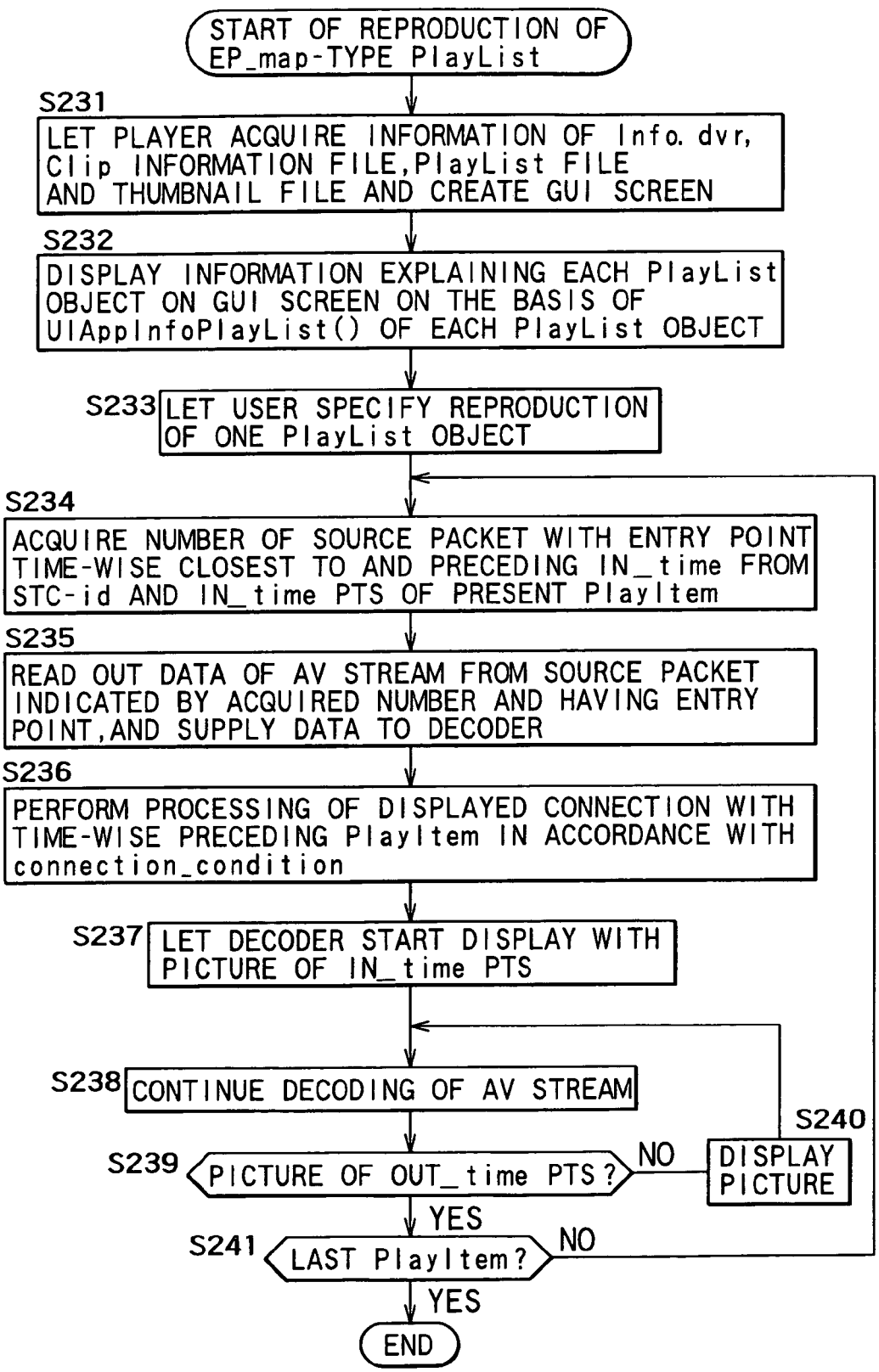
FIG. 51 shows an explanatory flowchart representing a method of reproducing EP_map-type PlayList.

FIG. 51 shows a flowchart representing a method of reproducing EP_map-type PlayList.

As shown in the figure, the flowchart begins with a step S231 at which the control unit 17 acquires information of Info.dvr, the Clip information file, a PlayList file and a thumbnail file in order to create a GUI screen showing a list of PlayList objects stored in the disk serving as the recording medium 10. The control unit 17 then displays the GUI screen through the user interface.

Then, at the next step S232, the control unit 17 displays information for explaining each PlayList object on the GUI screen on the basis of UIAppInfoPlayList( ) of each of the PlayList objects.

Subsequently, at the next step S233, the user makes a request for reproduction of one PlayList object selected from those displayed on the GUI screen through the user interface.

Then, at the next step S234, the control unit 17 acquires the number of a source packet with entry point time-wise closest to and time-wise preceding IN_time from an STC-ID and an IN_time PTS of the present PlayItem.

Subsequently, at the next step S235, the control unit 17 reads out data of the AV stream from the source packet indicated by the acquired number and having the entry point, and supplies the data to the decoder.

Then, at the next step S236, the control unit 17 performs processing of displayed connection with PlayItem time-wise preceding the present PlayItem object in accordance with connection_condition in case such preceding PlayItem exists.

Subsequently, at the next step S237, the control unit 17 issues a command to the AV decoder 16 to start a display with a picture at the IN_time PTS.

Then, at the next step S238, the control unit 17 issues a command to the AV decoder 16 to continue the operation of decoding an AV stream.

Subsequently, at the next step S239, the control unit 17 forms a judgment as to whether or not the currently displayed picture is a picture at the OUT_time PTS. If the outcome of the judgment formed at the step S239 indicates that the currently displayed picture is not a picture at the OUT_time PTS, the flow of the goes on to a step S240. At the step S240, the current picture is displayed. Then, the flow of the processing goes back to the step S238. If the outcome of the judgment formed at the step S239 indicates that the currently displayed picture is a picture at the OUT_time PTS, on the other hand, the flow of the goes on to a step S241.

At the step S241, the control unit 17 forms a judgment as to whether or not the current PlayItem object is the last PlayItem object in PlayList. If the outcome of the judgment formed at the step S241 indicates that the current PlayItem object is not the last PlayItem object in PlayList, the flow of the goes back to the step S234. If the outcome of the judgment formed at the step S241 indicates that the current PlayItem object is the last PlayItem object in PlayList, on the other hand, the processing to reproduce PlayList is finished.

Figure 52:
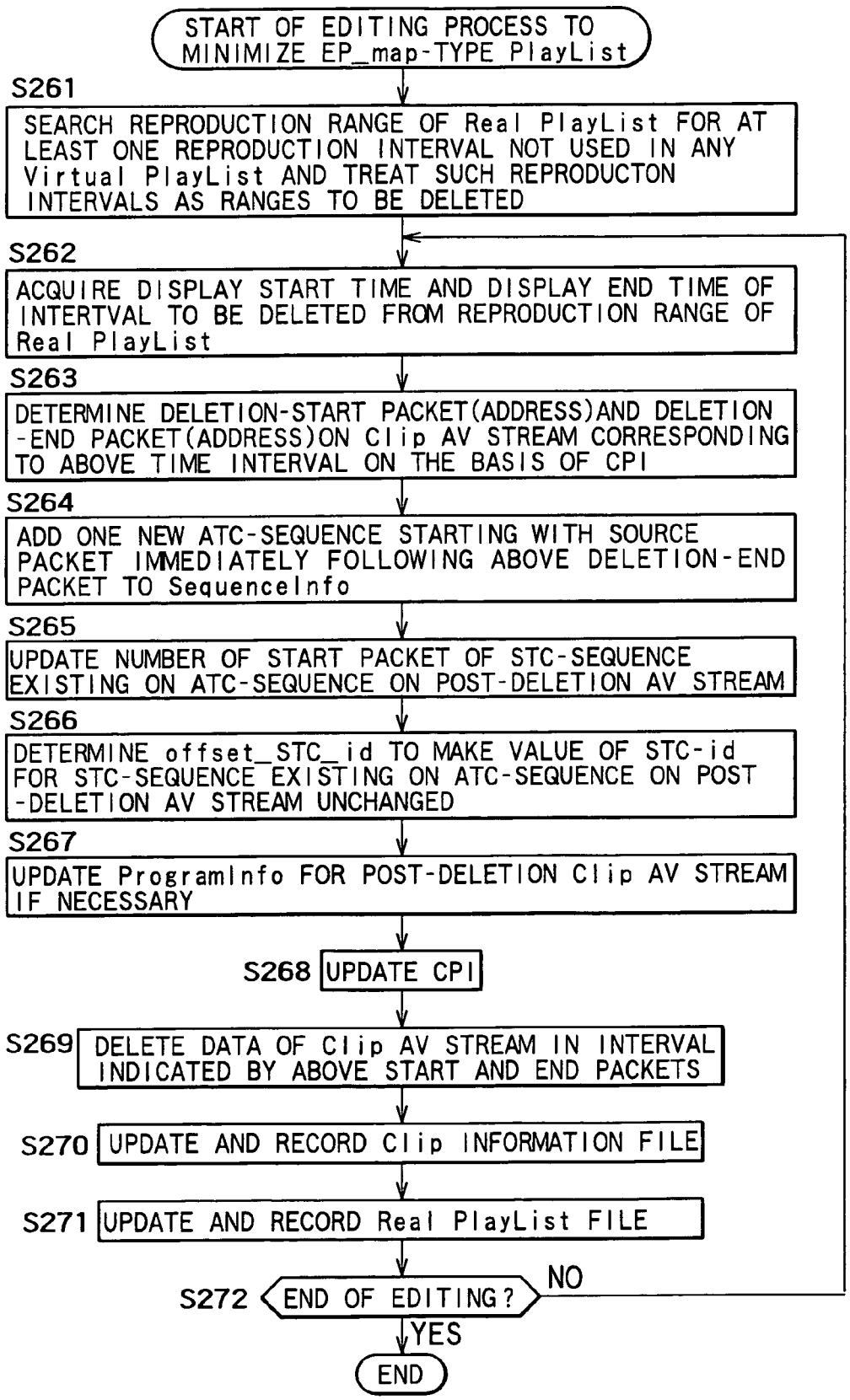
FIG. 52 shows an explanatory flowchart representing an editing process to minimize EP_map-type PlayList.

By referring to FIG. 52 showing a flowchart representing an editing process to minimize EP_map-type PlayList, the following description explains a procedure of a method to update Clip and PlayList as part of the editing process.

As shown in the figure, the flowchart begins with a step S261 at which the control unit 17 searches the reproduction range of Real PlayList for at least one reproduction interval not used in any Virtual PlayList and treats such reproduction intervals as ranges to be deleted.

Then, at the next step S262, the control unit 17 acquires the start time and the end time of the interval to be deleted from the reproduction range of Real PlayList.

Subsequently, at the next step S263, the control unit 17 determines the Clip AV stream's deletion-start packet (address) and deletion-end packet (address) corresponding to the above time interval on the basis of EP_map.

Then, at the next step S264, the control unit 17 adds one new ATC-sequence starting with a source packet immediately following the above deletion-end packet to SequenceInfo. That is to say, the control unit 17 sets the number of the source packet immediately following the above deletion-end packet in SPN_ATC_start.

Subsequently, at the next step S265, the control unit 17 updates the number (SPN_STC_start) of a start packet of an STC-sequence existing on an ATC-sequence on a post-deletion AV stream. That is to say, the value of SPN_STC_start is changed to a new one that keeps up with the post-deletion AV stream.

Then, at the next step S266, the control unit 17 determines such offset_STC_id that the value of STC-id for the STC-sequence existing on the ATC-sequence on the post-deletion Clip AV stream is unchanged.

Subsequently, at the next step S267, ProgramInfo for the post-deletion Clip AV stream is updated if necessary. That is to say, if the program sequence starts in the deleted range described above, the number of the start source packet of the program sequence is changed to the number of a source packet immediately following the deleted end packet.

Then, at the next step S268, the control unit 17 updates EP_map to a new one that keeps up with the post-deletion Clip AV stream. In this processing, EP_map entry referring to a stream in the deleted interval is deleted and the value of a source-packet number in EP_map, that is, SPN_EP_start of EP_map, is updated to a new one that keeps up with the post-deletion Clip AV stream.

Subsequently, at the next step S269, the control unit 17 deletes the data of the Clip AV stream in the interval indicated by above start and end packets Then, at the next step S270, the control unit 17 updates the Clip information file to reflect the processing described above and records the updated Clip information file. As shown in FIG. 8, the Clip information file includes, among others, ClipInf( ), SequenceInfo( ), ProgramInfo( ) and CPI( ). Thus, information on the aforementioned ATC-sequence and information on the aforementioned STC-sequence are recorded onto the recording medium 10.

Subsequently, at the next step S271, the control unit 17 updates the Real PlayList file so as to cover a reproduction interval including no reproduction range of the deleted interval described above and records the updated Real PlayList file.

Then, at the next step S272, the control unit 17 forms a judgment as to whether or not the editing process has come to an end, that is, whether or not all reproduction intervals searched for at the step S261 have been deleted. If the outcome of the judgment indicates that the reproduction intervals searched for at the step S261 have not all been deleted, the flow of the processing goes back to the step S262. If the outcome of the judgment indicates that the reproduction intervals searched for at the step S261 have all been deleted, on the other hand, the minimization processing is finished.

The processing carried out at the step S263 is explained in detail for Clip with CPI of the EP_map type.

Figure 53:
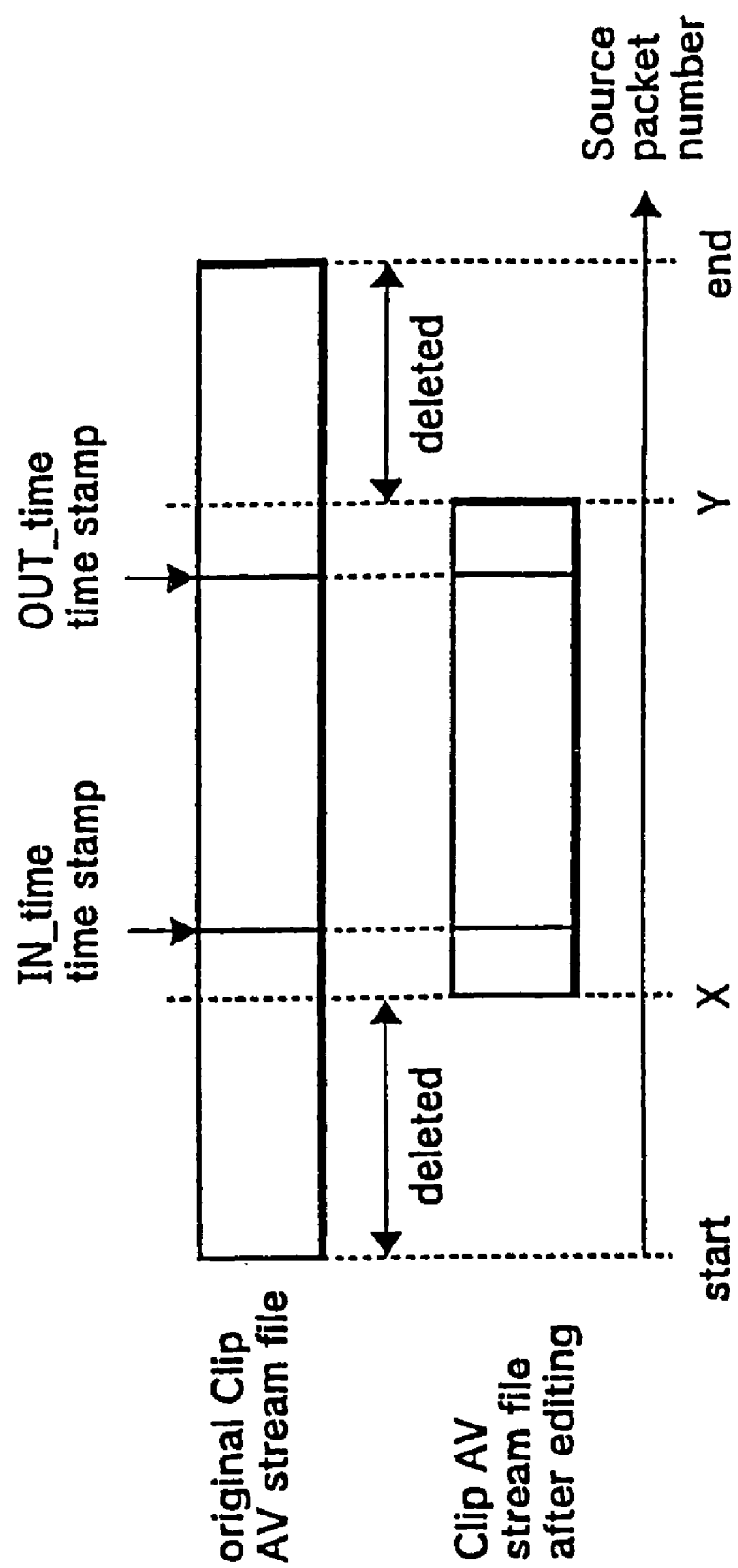
FIG. 53 is an explanatory diagram showing minimization processing.

FIG. 53 is an explanatory diagram showing an original AV stream file and a typical AV stream file obtained as a result of an editing process in which the stream of a partial reproduction range is deleted from the original file. Assume that, prior to the editing process, Virtual PlayList points to IN_time and OUT_time, which are on the AV stream. When stream portions not used by Virtual PlayList are deleted in the so-called minimization editing process, the original AV stream is changed to the post-editing stream shown in FIG. 53. As shown in the figure, data from the start of the original AV stream to point X and data from point Y to the end of the original AV stream are deleted from the original AV stream. The following description explains a typical method of determining points X and Y.

Figure 54:
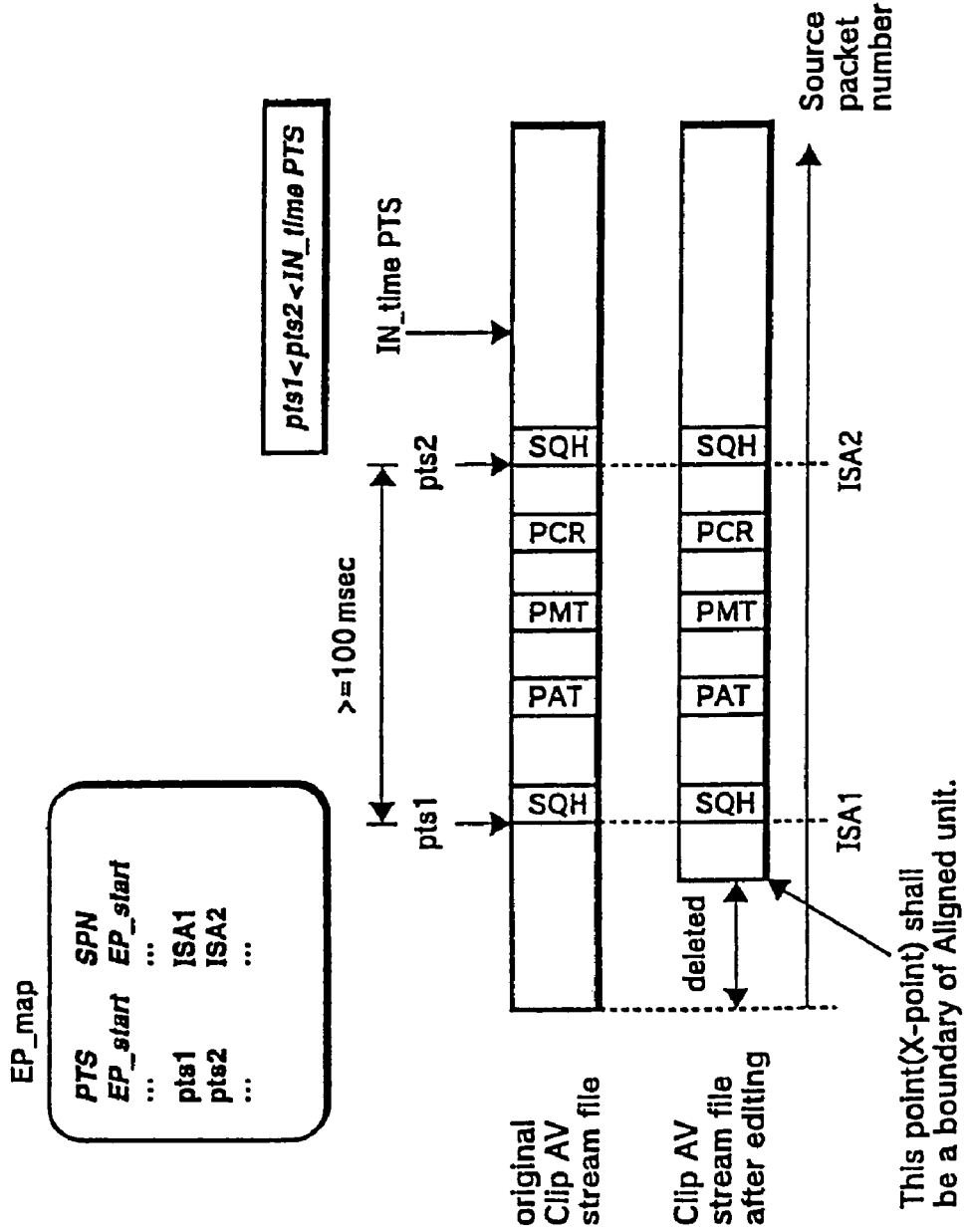
FIG. 54 is an explanatory diagram showing deletion of unnecessary stream data preceding IN_time in a minimization process.

FIG. 54 is an explanatory diagram showing deletion of unnecessary stream data preceding IN_time from an AV stream without analyzing the contents of the AV stream. PlayList points to an IN point on the original AV stream. The figure also shows EP_map of the AV stream. In order to decode a picture pointed to by the IN point, an I picture starting from address ISA2 is required. In addition, after point X, the PAT, PMT and PCR packets are required. pts1 is a PTS with SPN_EP_start=ISA1 and pts2 is a PTS with SPN_EP_start=ISA2. If a difference in system time base between pts1 and pts2 is at least equal to 100 msec, the PAT, PMT and PCR packets exist between addresses ISA1 and ISA2. This holds true of at least the SESF, DVB, ATSC and ISDB cases. Thus, point X is determined to be a point before address ISA1. In addition, point X must be on the boundary of an aligned unit.

Without analyzing the contents of the AV stream, the moving-picture recording/reproduction apparatus 1 is capable of determining point X by using EP_map through execution of the following steps:

1) Find SPN_EP_start having a display-time PTS value closest to and preceding the PTS of an IN time on the system time base.

2) Find SPN_EP_start having a display-time PTS value preceding the display-time PTS value found at step 1) by at least 100 msec.

3) Determine point X at a position preceding SPN_EP_start found at step 2). Point X must be on a boundary of an aligned unit.

This method is simple in that, in order to determine point X, it is not necessary to read out the data of the AV stream and to analyze the data. In some cases, however, data unnecessary for reproduction of PlayList may inevitably remain on the post-editing AV stream. If the data of the AV stream is read out and analyzed in determination of point X, data unnecessary for reproduction of PlayList can be deleted effectively.

Figure 55:
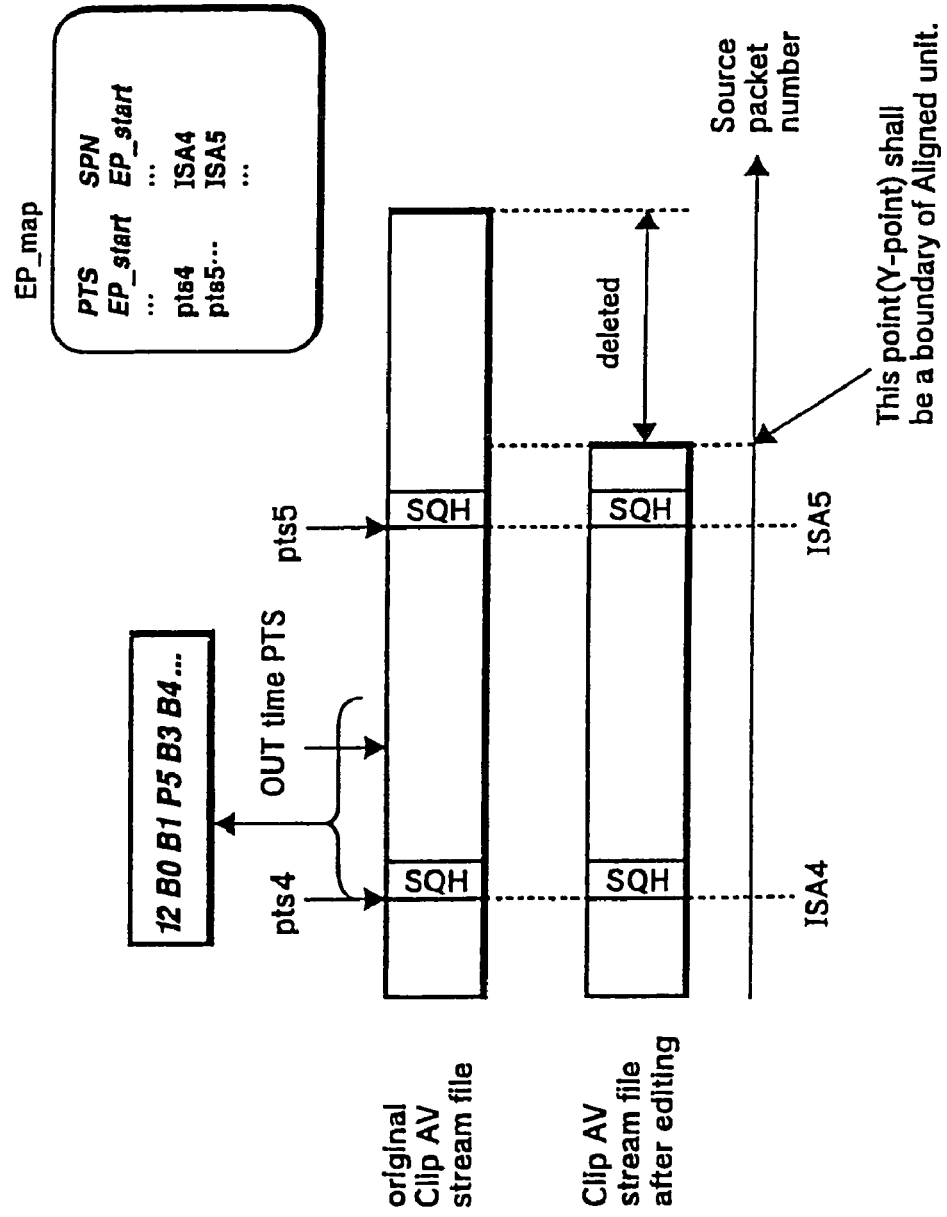
FIG. 55 is an explanatory diagram showing deletion of unnecessary stream data following OUT_time in a minimization process.

FIG. 55 is an explanatory diagram showing a method of deleting unnecessary stream data following an OUT point without analyzing the data of the AV stream. PlayList points to the OUT point on the original AV stream. The figure also shows EP_map of the AV stream. It is assumed that a video sequence starting from SPN_EP_start=ISA4 is the following series of picture frames:

I2 B0 B1 P5 . . .

where symbols I, P and B denote I, P and B pictures, respectively. Numbers appended to the symbols I, P and B as suffixes are display-order numbers. If the recording unit does not analyze the data of the AV stream in this processing, the moving-picture recording/reproduction apparatus 1 will not know information on a picture referred to by the PTS of OUT_time. The information includes the coding type of the picture and a temporal reference. The PTS of OUT_time may refer to picture B0 or B1. If the data of the AV stream is not analyzed, the moving-picture recording/reproduction apparatus 1 is not aware of the fact that the PTS of OUT_time refers to picture B0 or B1. In this case, in order to decode pictures B0 and B1, picture I2 is required. By the way, the PTS of picture I2 is greater than the PTS of OUT_time. That is to say, OUT_time<pts4 where notation pts4 denotes the PTS of picture I2. In spite of the fact that the PTS of picture I2 is greater than the PTS of OUT_time, picture I2 is required for decoding pictures B0 and B1.

Thus, point Y is determined at a position behind address ISA5. ISA5 is the value of SPN_EP_start immediately succeeding address ISA4 in EP_map. Point Y must also be on a boundary of an aligned unit.

Without analyzing the contents of the AV stream, the moving-picture recording/reproduction apparatus 1 is capable of determining point Y by using EP_map through execution of the following steps of:

1) Finding SPN_EP_start having a display-time PTS value closest to and succeeding the PTS of an OUT time on the system time base 2) Finding SPN_EP_start having a display-time PTS value immediately succeeding the display-time PTS value found at step 1

3) Determining point Y at a position succeeding SPN_EP_start found at step 2. Point Y must be on a boundary of an aligned unit.

This method is simple in that, in order to determine point Y, it is not necessary to read out the data of the AV stream and to analyze the data. In some cases, however, data unnecessary for reproduction of PlayList may inevitably remain on the post-editing AV stream. If the data of the AV stream is read out and analyzed in determination of point Y, data unnecessary for reproduction of PlayList can be deleted effectively.

Figure 56:
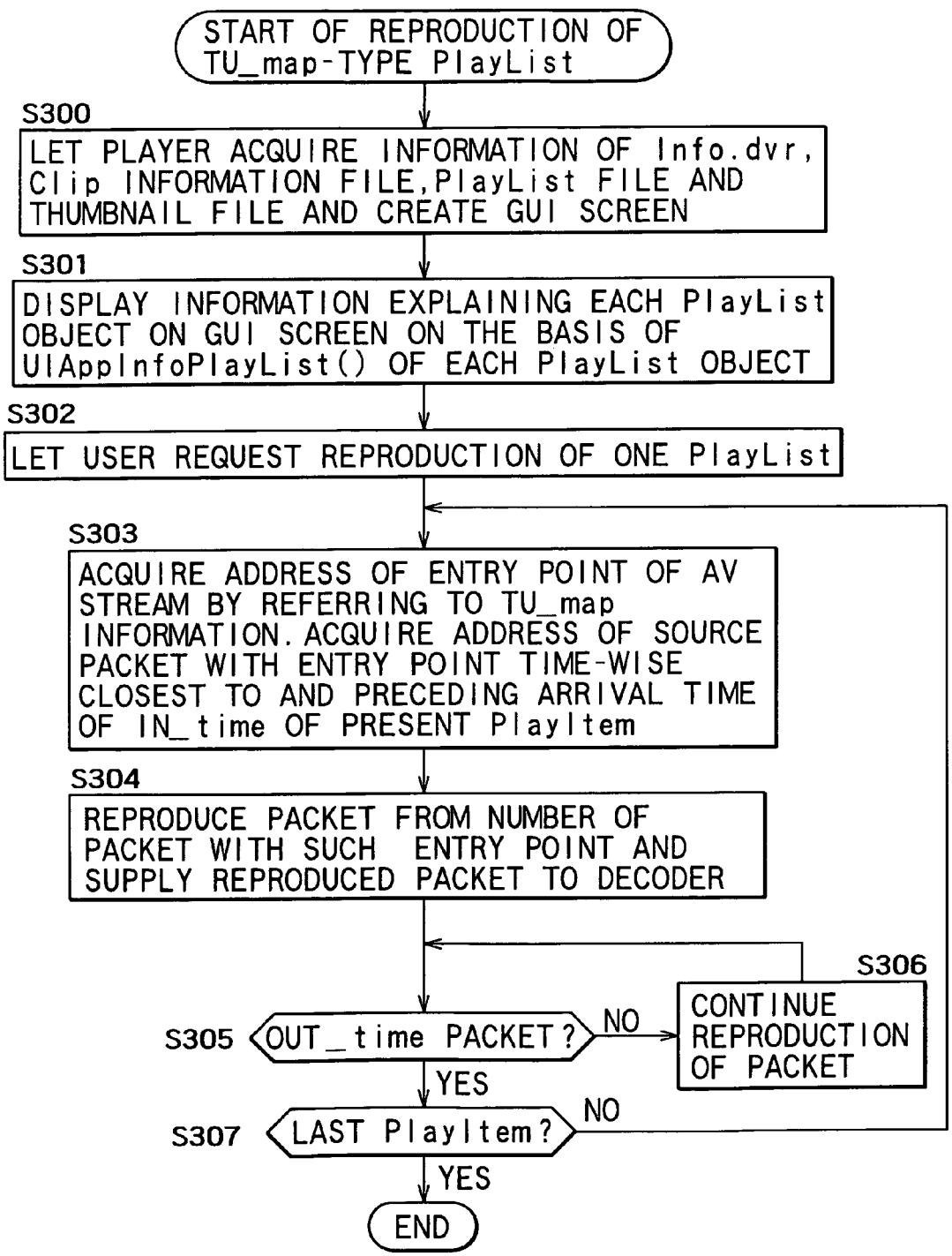
FIG. 56 shows an explanatory flowchart representing a method to reproduce TU_map-type PlayList.

FIG. 56 shows an explanatory flowchart representing a method to reproduce PlayList of a TU_map type.

Pieces of processing carried out at steps S300 to S302 are the same as those carried out at the steps S231 to S232 of the flowchart shown in FIG. 51.

To put it in detail, as shown in FIG. 56, the flowchart begins with the step S300 at which the control unit 17 acquires information of Info.dvr, an Clip information file, a PlayList file and a thumbnail file to create a GUI screen for displaying a list of PlayList objects stored on a disk used as the recording medium 10.

Then, at the next step S301, the control unit 17 displays information explaining each of the PlayList objects displayed on the GUI screen on the basis of UIAppInfoPlayList( ) of each PlayList object.

Subsequently, at the next step S302, the user makes a request for reproduction of one PlayList object selected from those displayed on the GUI screen through the user interface.

Then, at the next step S303, the control unit 17 acquires the address of an entry point of the AV stream by referring to TU_map information. To be more specific, the control unit 17 acquires the number of a source packet with an entry point time-wise closest to and preceding the arrival time of IN_time of the present PlayItem object. Details of this processing will be described later.

Subsequently, at the next step S304, the control unit 17 reproduces a packet indicated by the number of the packet with such an entry point and supplies the reproduced packet to the AV decoder 16.

Then, at the next step S305, the control unit 17 forms a judgment as to whether or not the arrival time stamp of the present packet is the same as or later than that of the OUT_time packet. If the outcome of the judgment indicates that the arrival time stamp of the present packet is neither the same as nor later than that of the OUT_time packet, the flow of the processing goes on to a step S306. At the step S306, the control unit 17 reproduces the next packet and supplies the next packet to the AV decoder 16. Then, the flow of the processing goes back to the step S305. If the outcome of the judgment formed at the step S305 indicates that the arrival time stamp of the present packet is the same as or later than that of the OUT_time packet, on the other hand, the flow of the processing goes on to a step S307.

At the step S307, the control unit 17 forms a judgment as to whether or not the present PlayItem object is the last PlayItem object. If the outcome of the judgment indicates that the present PlayItem object is not the last PlayItem object, the flow of the processing goes back to the step S303. If the outcome of the judgment indicates that the present PlayItem object is the last PlayItem object, on the other hand, the control unit 17 ends the reproduction of PlayList objects.

Next, details of the processing carried out at the step S303 of the flowchart shown in FIG. 56 are explained by referring to a flowchart shown in FIG. 57.

As shown in FIG. 57, the flowchart begins with S400 at which the control unit 17 acquires maximum value of atc_id making following relation between IN_time of PlayItem and offset_arrival_time[atc_id] of TU_map( ) hold true:

offset_arrival_time[atc_id]≦IN_time

Refer to the syntax shown in FIG. 26.

Then, at the next step S401, the control unit 17 acquires such a value of i that the start time of the ith time unit in an ATC-sequence specified by above atc_id (TU_start time[atc_id][i]) is time-wise closest to and preceding IN_time. Refer to Eq. (2) given earlier.

Subsequently, at the next step S402, the control unit 17 uses SPN_time_unit_start[atc_id][i] for the above i as the address of an entry point. Then, the processing is ended.

Figure 58:
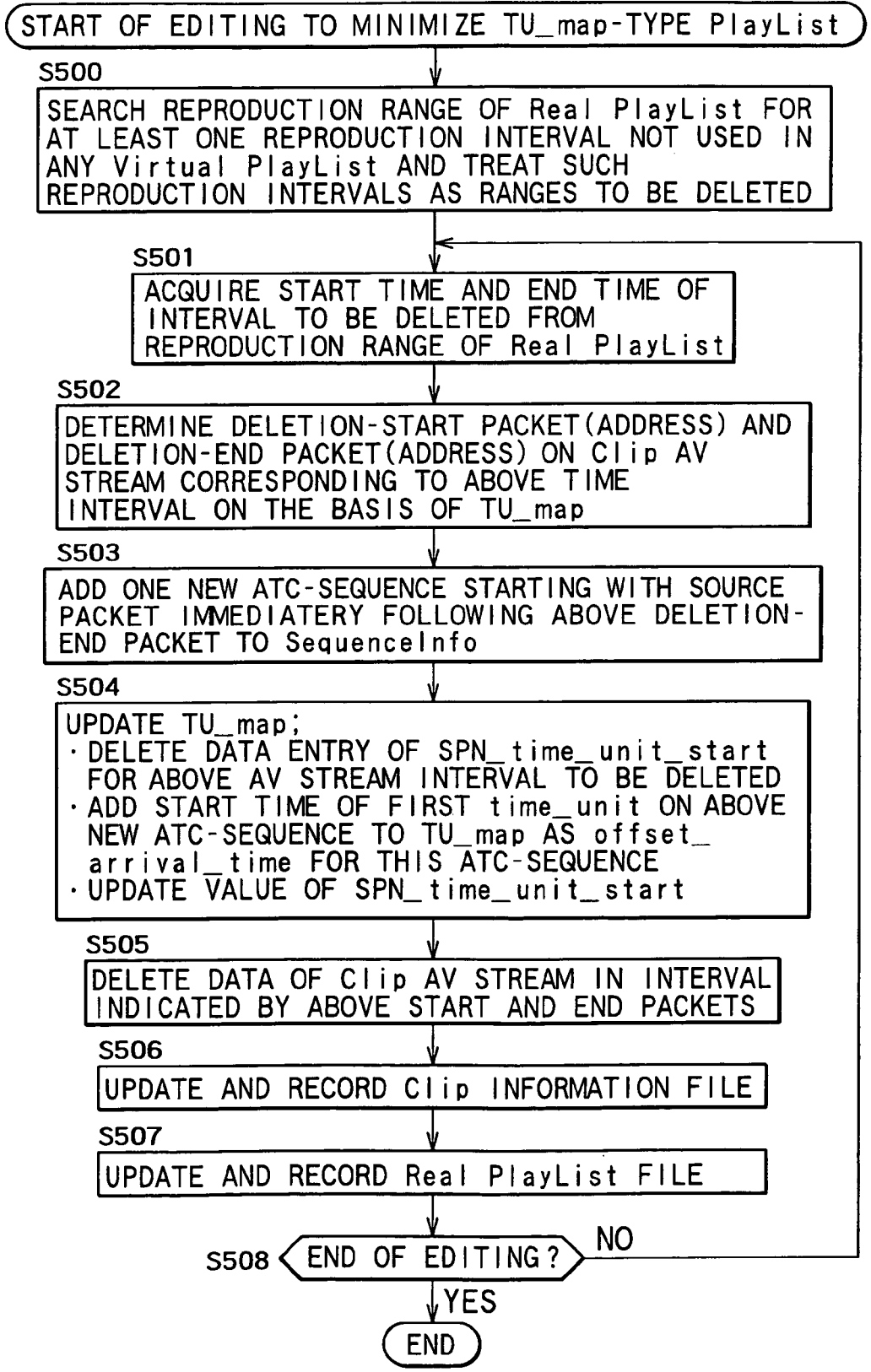
FIG. 58 shows an explanatory flowchart representing an editing process to minimize TU_map-type PlayList.

By referring to a flowchart shown in FIG. 58, the following description explains a method to update Clip and PlayList in an editing process to minimize TU_map-type PlayList.

As shown in the figure, the flowchart begins with S500 at which the control unit 17 searches the reproduction range of Real PlayList for at least one reproduction interval not used in any Virtual PlayList and treats such reproduction intervals as ranges to be deleted.

Then, at the next step S501, the control unit 17 acquires the start time (an arrival time) and the end time (an arrival time) of an interval to be deleted from the reproduction range of Real PlayList.

Subsequently, at the next step S502, the control unit 17 determines the deletion-start packet (address) of the Clip AV stream and deletion-end packet (address) corresponding to the above time interval on the basis of TU_map. Details of this processing will be described later.

Then, at the next step S503, the control unit 17 adds one new ATC-sequence starting with a source packet immediately following the above deletion-end packet to SequenceInfo. That is to say, the control unit 17 sets the number of the source packet immediately following the above deletion-end packet in SPN_ATC_start.

Subsequently, at the next S504, the control unit 17 updates TU_map so as to keep up with a post-deletion Clip AV stream as follows:

- A data entry of SPN_time_unit_start for the AV stream interval to be deleted is deleted.
- The start time of the first time unit on above new ATC-sequence is added to TU_map as offset_arrival_time for this ATC-sequence
- The value of the source-packet number in TU_map is updated or, to be more specific, SPN_time_unit_start of TU_map is changed so as to keep up with the post-deletion Clip AV stream.

Then, at the next step S505, the control unit 17 deletes the data of the Clip AV stream in the interval indicated by the above start and end packets Subsequently, at the next S506, the control unit 17 updates and records the Clip information file to reflect the above processing. As shown in FIG. 8, the Clip information file includes, among other information, ClipInf( ), SequenceInfo( ), ProgramInfo( ) and CPI( ). Thus, information on the aforementioned ATC-sequence is recorded on the recording medium 10.

Then, at the next step S507, the control unit 17 updates and records Real PlayList file so as to cover the reproduction interval except the reproduction range of the deleted reproduction interval.

Subsequently, at the next S508, the control unit 17 forms a judgment as to whether or not all the ranges examined at the step S500 as objects of deletion have been deleted. If the outcome of the judgment indicates that the examined ranges to be deleted have not all been deleted, the flow of the processing goes back to the step S501. If the outcome of the judgment indicates that the examined ranges to be deleted have all been deleted, on the other hand, the minimization processing is finished.

Figure 59:
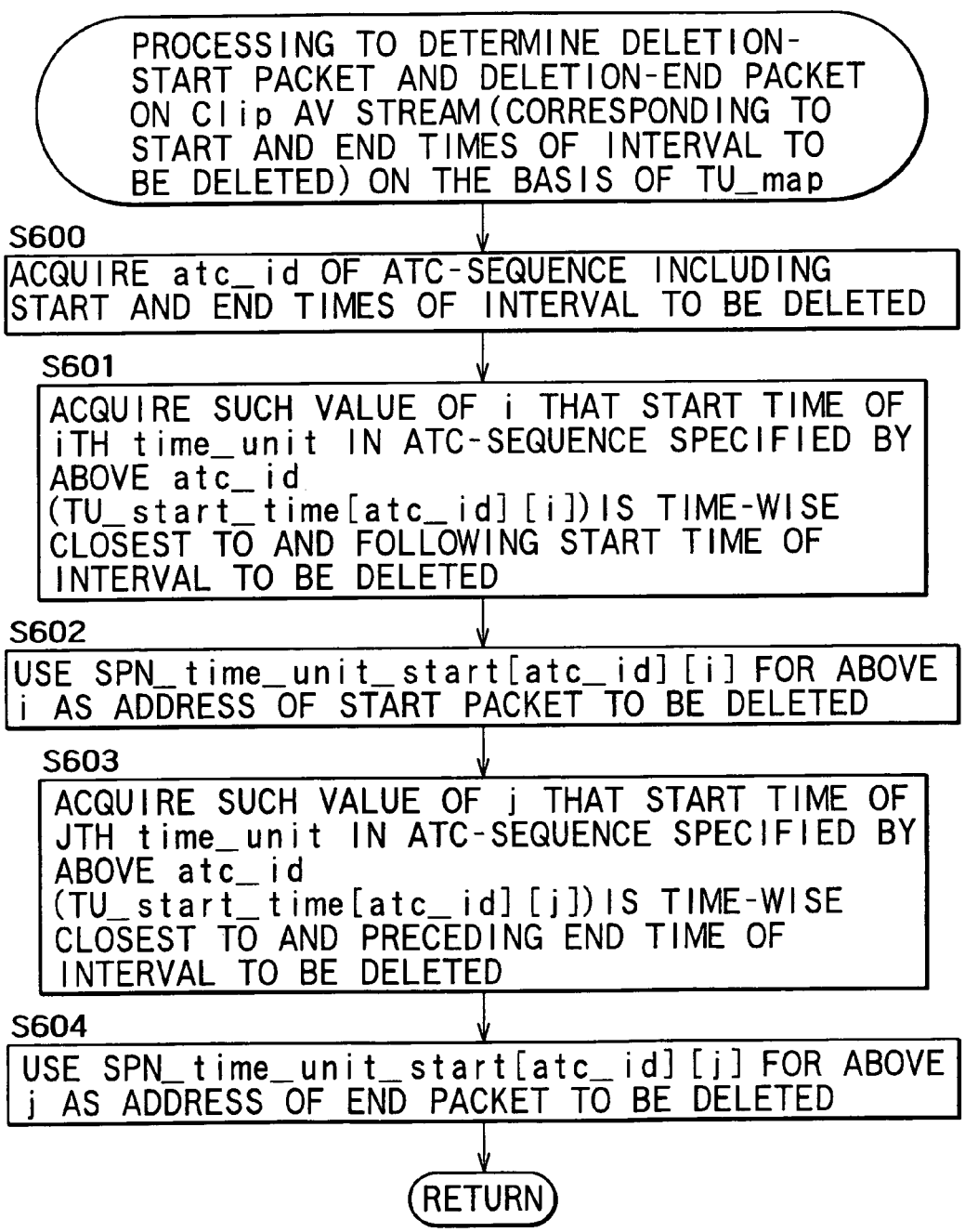
FIG. 59 shows an explanatory flowchart representing details of processing at a step S502 of the flowchart shown in FIG. 58.

Next, details of processing carried out at the S502 of the flowchart shown in FIG. 58 are explained by referring to a flowchart shown in FIG. 59.

As shown in FIG. 59, the flowchart begins with a step S600 at which the control unit 17 acquires atc_id of an ATC-sequence including start and end times of an interval to be deleted.

Then, at the next step S601, the control unit 17 acquires such a value of i that the start time of the ith time unit in the ATC-sequence specified by above atc_id (TU_start_time[atc_id][i]) is time-wise closest to and following the start time of the interval to be deleted. Refer to Eq. (2) given before.

Subsequently, at the next step S602, the control unit 17 uses SPN_time_unit_start [atc_id][i] for the above value of i as the address of a start packet to be deleted.

Then, at the next step S603, the control unit 17 acquires such a value of j that the start time of the jth time unit in the ATC-sequence specified by above atc_id (TU_start_time[atc_id][j]) is time-wise closest to and preceding the end time of the interval to be deleted. Refer to Eq. (2) given before.

Subsequently, at the next step S604, the control unit 17 uses SPN_time_unit_start [atc_id][j] for above value of j as the address of an end packet to be deleted.

Figure 60:
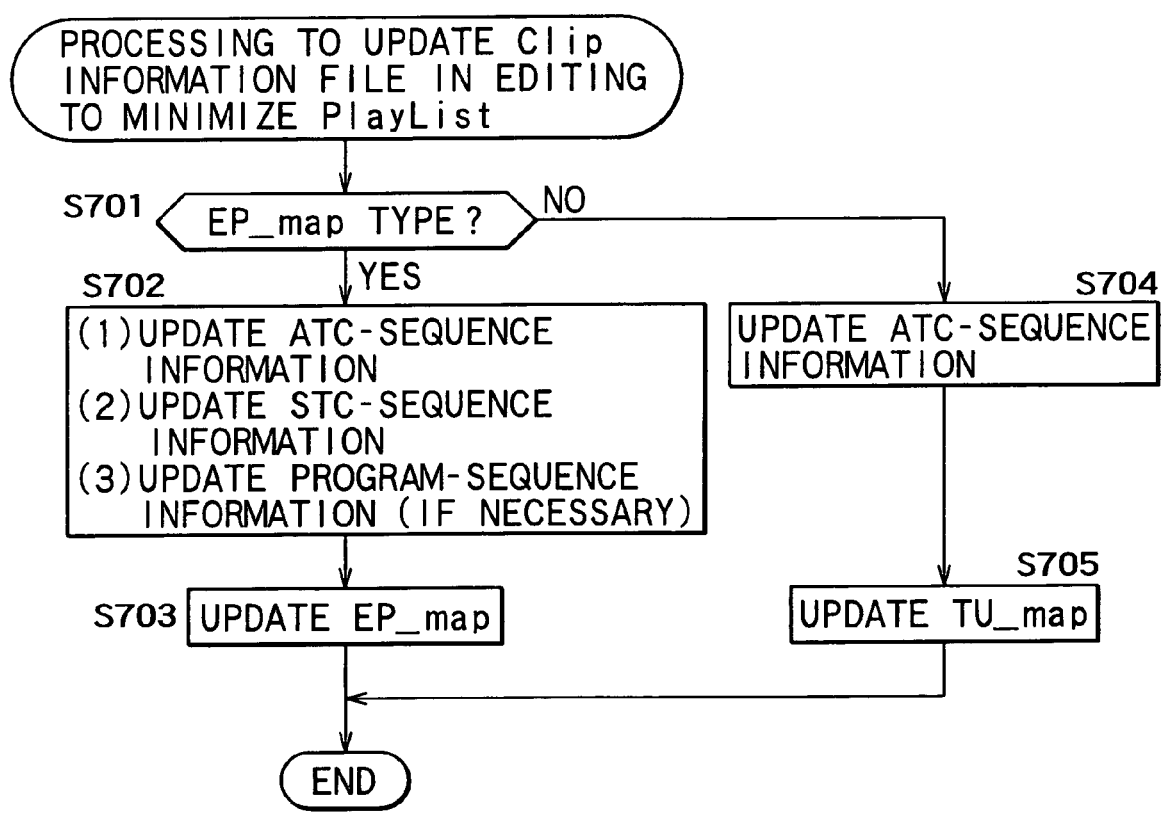
FIG. 60 shows an explanatory flowchart representing processing to update Clip information file in editing to minimize EP_map-type PlayList and TU_map-type PlayList.

FIG. 60 is a single flowchart representing processing to update a Clip information file in an editing process to minimize EP_map-type PlayList and TU_map-type PlayList.

As shown in FIG. 60, the flowchart begins with a step S701 at which the control unit 17 forms a judgment as to whether or not PlayList is EP_map-type PlayList. If the outcome of the judgment indicates that PlayList is EP_map-type PlayList, the flow of the processing goes on to a step S702. At the step S702, the control unit 17 updates the Clip information file so as to keep up with the deletion of a portion from the AV stream. To put it in detail, the control unit 17 updates:

ATC-sequence information (at the step S264 of the flowchart shown in FIG. 52), STC-sequence information (at the steps S265 and S266 of the flowchart shown in FIG. 52) and program-sequence information, if necessary, (at the step S267 of the flowchart shown in FIG. 52).

Then, at the next step S703, the control unit 17 updates information of EP_map so as to keep up with the deletion of a portion from the AV stream. In the flowchart shown in FIG. 52, this processing is carried out at the step S268. Then the processing is ended.

If the outcome of the judgment formed at the step S701 indicates that PlayList is TU_map-type PlayList, on the other hand, the flow of the processing goes on to a step S704. At the step S704, the control unit 17 updates ATC-sequence information of the Clip information file so as to keep up with the deletion of a portion from the AV stream. In the flowchart shown in FIG. 58, this processing is carried out at the step S503.

Subsequently, at the next step S705, the control unit 17 updates information of TU_map so as to keep up with the deletion of a portion from the AV stream. In the flowchart shown in FIG. 58, this processing is carried out at the step S504. Then, the processing is ended.

The following description explains a method of setting a value of connection_condition shown in FIG. 29 for PlayItem data also shown in FIG. 29 of PlayList shown in FIG. 28 in a case wherein ATC and STC discontinuities are generated when the AV stream of EP_map-type PlayList is recorded.

First of all, a relation between an AV stream having ATC and STC discontinuities and PlayItem is explained.

Figure 61:
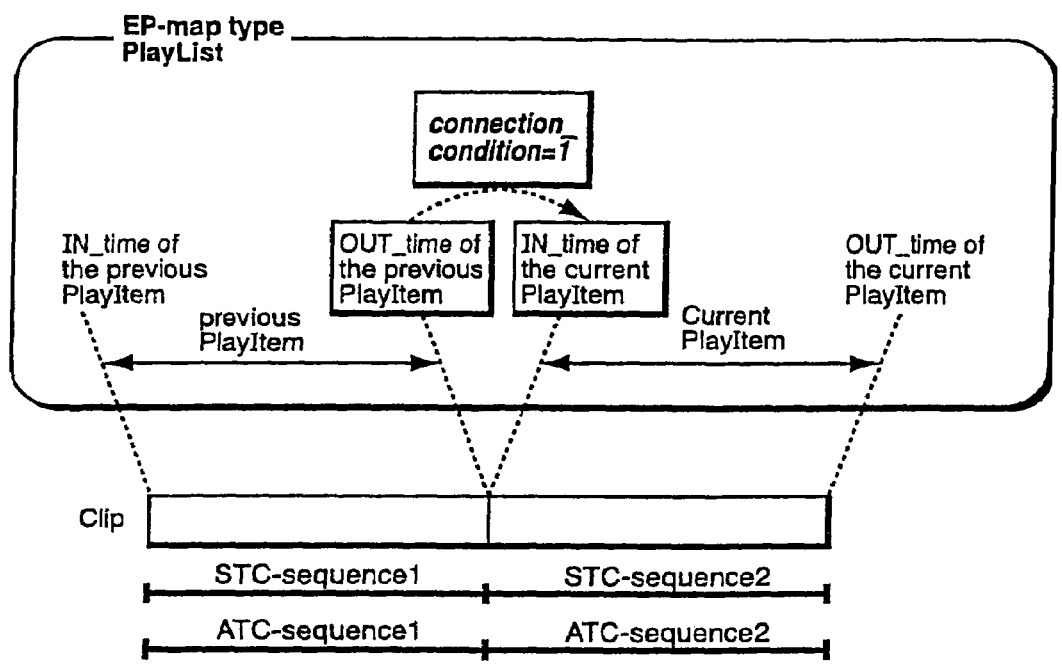
FIG. 61 shows an explanatory diagram showing a case in which EP_map-type PlayList is split into two PlayItem objects on a boundary between two ATC-sequences.

FIG. 61 is an explanatory diagram showing a case in which EP_map-type PlayList is split into two PlayItem objects on a boundary between two ATC-sequences. On the boundary between two ATC-sequences, the STC-sequence is also split. Since PlayItem refers to a continuous STC-sequence, such PlayItem is also split into 2 PlayItem objects on the boundary of the STC-sequence. In this case, the value of connection_condition is set at 1 to indicate that the Current PlayItem object to the previous PlayItem object in such a state.

Figure 62:
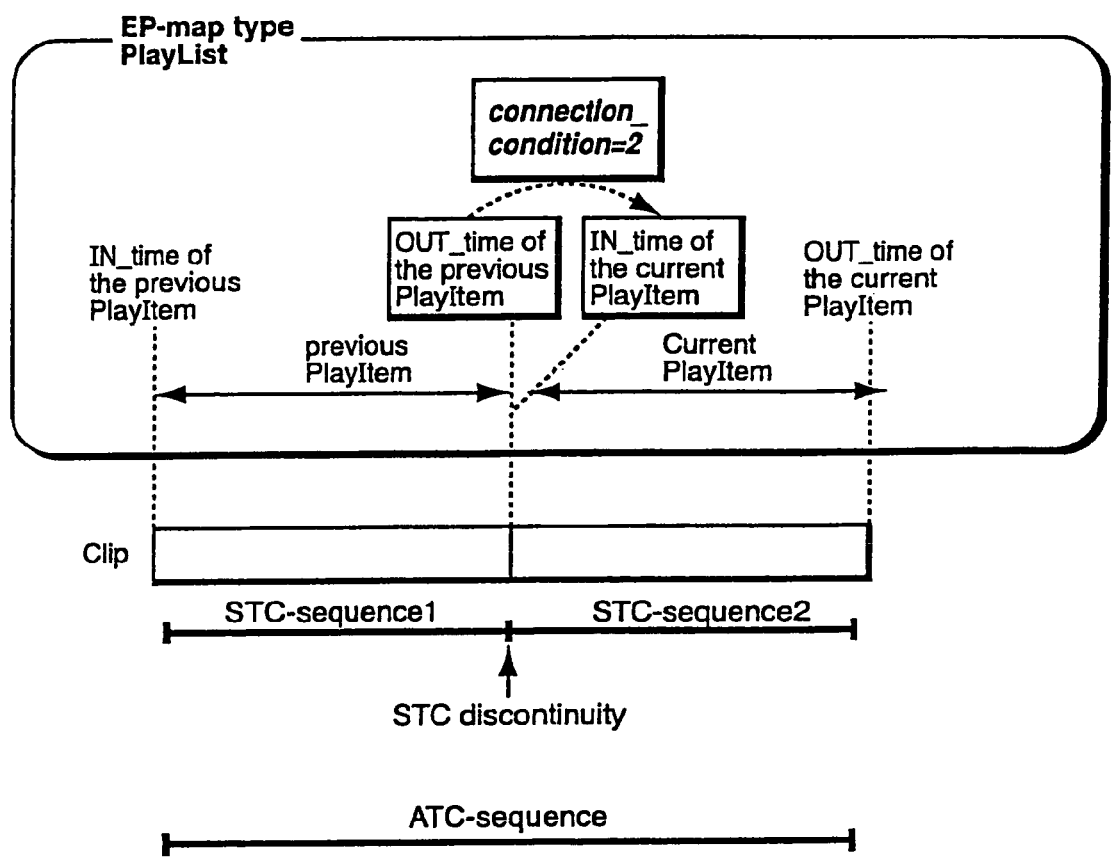
FIG. 62 shows an explanatory diagram showing a case in which EP_map-type PlayList is split into two PlayItem objects on a boundary between two STC-sequences on a continuous ATC-sequence.

FIG. 62 is an explanatory diagram showing a case in which EP_map-type PlayList is split into 2 PlayItem objects on a boundary between 2 STC-sequences on a continuous ATC-sequence. The STC-sequence is split into 2 STC-sequences at an STC discontinuity on the continuous ATC-sequence. Since PlayItem refers to a continuous STC-sequence, such PlayItem is also split into 2 PlayItem objects on the boundary of the STC-sequence. In this case, the value of connection_condition is set at 2 to indicate the fact that the Current PlayItem object is connected to the previous PlayItem object in such a state.

Figure 63:
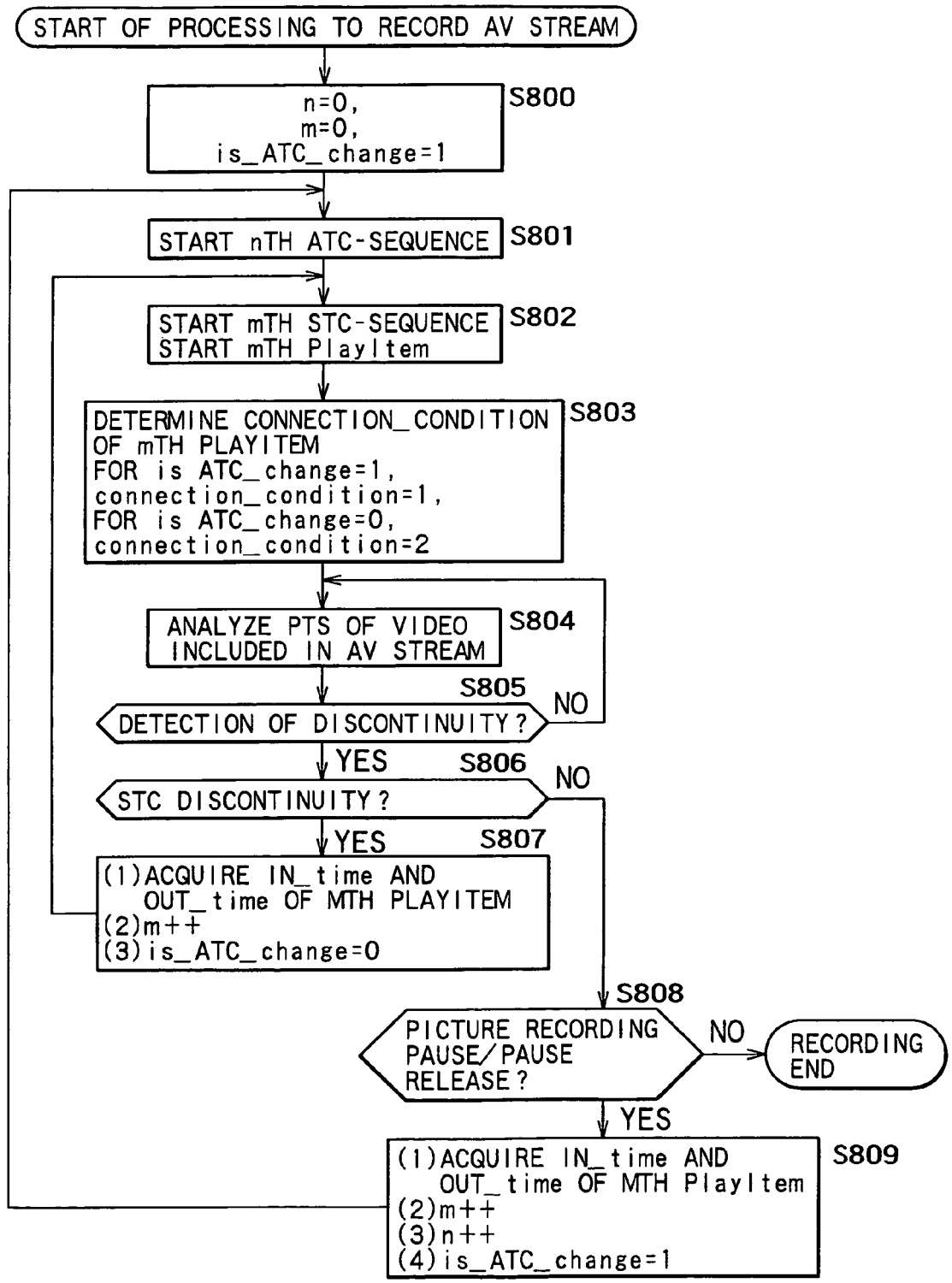
FIG. 63 shows a flowchart representing a process to create EP_map-type PlayList in processing to record an AV stream.

FIG. 63 is a flowchart representing a method to create data of EP_map-type PlayList in a process to record an AV stream wherein ATC and STC discontinuities are generated in the course of the recording process.

As shown in the figure, the flowchart begins with a step S800 at which the control unit 17 shown in FIG. 43 sets parameters as follows n=0, m=0 and is_ATC_sequence=1, where the parameter n is the number of an ATC-sequence generated in the course of the recording process, the parameter m is the number of an STC-sequence generated in the course of the recording process and the parameter is_ATC_sequence is a flag showing whether or not an ATC discontinuity has been generated.

Then, at the next step S801, the control unit 17 starts the nth ATC-sequence from a packet presently being recorded.

Subsequently, at the next step S802, the control unit 17 starts the mth STC-sequence and the mth PlayItem object.

Then, at the next step S803, the control unit 17 determines connection_condition of the mth PlayItem object as follows:

For is_ATC_change=1, connection_condition is set at 1.

For is_ATC_change=0, connection_condition is set at 2.

It should be noted that, for the first PlayItem object (m=0), connection_condition is set at 1 in spite of the fact that the state is different from that shown in FIG. 62.

Subsequently, at the next step S804, the control unit 17 analyzes the PTS of a video included in the AV stream being recorded. The PTS information is used as information for acquiring IN_time and OUT_time of PlayItem.

Then, at the next step S805, the control unit 17 forms a judgment as to whether or not a discontinuity has been detected. If no discontinuity has been detected, the flow of the processing goes back to the step S804 to continue the processing of this step. If a discontinuity has been detected, on the other hand, the flow of the processing goes on to a step S806.

At the step S806, the control unit 17 forms a judgment as to whether or not the detected discontinuity is an STC discontinuity. The discontinuity is determined to be an STC discontinuity in the same way as that explained earlier by referring to FIG. 45. If the outcome of the judgment formed at the step S806 indicates that the detected discontinuity is an STC discontinuity, the flow of the processing goes on to a step S807. In this case, the control unit 17 determines that a state shown in FIG. 62 has been resulted in. In this state, an STC discontinuity has been generated but no generation of an ATC discontinuity has been detected. At the step S807, the following processing is carried out:

(1) IN_time and OUT_time of the mth PlayItem object are acquired.

(2) m++

(3) is_ATC_change=0

Then, the flow of the processing goes back to the step S802 at which the next processing is carried out. This time, since is_ATC_change=0, connection_condition of PlayItem is set at 2 at the step S803.

If the outcome of the judgment formed at the step S806 indicates that the detected discontinuity is not an STC discontinuity, on the other hand, the flow of the processing goes on to a step S808. At the step S808, the control unit 17 forms a judgment as to whether or not the detected discontinuity has been caused by a recording pause/pause release. The recording pause/pause release is an event in which the recording process is temporarily suspended before being resumed later on.

If the outcome of the judgment formed at the step S808 indicates that the detected discontinuity has been caused by a recording pause/pause release, the control unit 17 determines that an ATC discontinuity has been generated and an STC discontinuity will also be generated much like the state shown in FIG. 61 due to the fact that the recording process was once suspended. In this case, the flow of the processing goes on to a step S809 at which the following processing is carried out:

(1) IN_time and OUT_time of the mth PlayItem object are acquired.
(2) m++
(3) n++
(4) is_ATC_change=1

Then, the flow of the processing goes back to the step S801 at which the next processing is carried out. This time, since is_ATC_change=1, connection_condition of PlayItem is set at 1 at the step S803.

If the outcome of the judgment formed at the step S808 indicates that the detected discontinuity has not been caused by a recording pause/pause release, on the other hand, the processing to record the AV stream is ended.

The following description explains a method of setting a value of connection_condition shown in FIG. 29 for PlayItem data also shown in FIG. 29 of PlayList shown in FIG. 28 in a case wherein an ATC discontinuity is generated when the AV stream of TU_map-type PlayList is recorded.

First of all, a relation between an AV stream having an ATC discontinuity and PlayItem is explained.

FIG. 64 is an explanatory diagram showing a case in which TU_map-type PlayList is split into 2 PlayItem objects on a boundary between 2 ATC-sequences. Since PlayItem refers to a continuous STC-sequence, such PlayItem is also split into 2 PlayItem objects on the boundary of the STC-sequence. In this case, the value of connection_condition is set at 1 to indicate the fact that the Current PlayItem object is connected to the previous PlayItem object in such a state.

Figure 65:
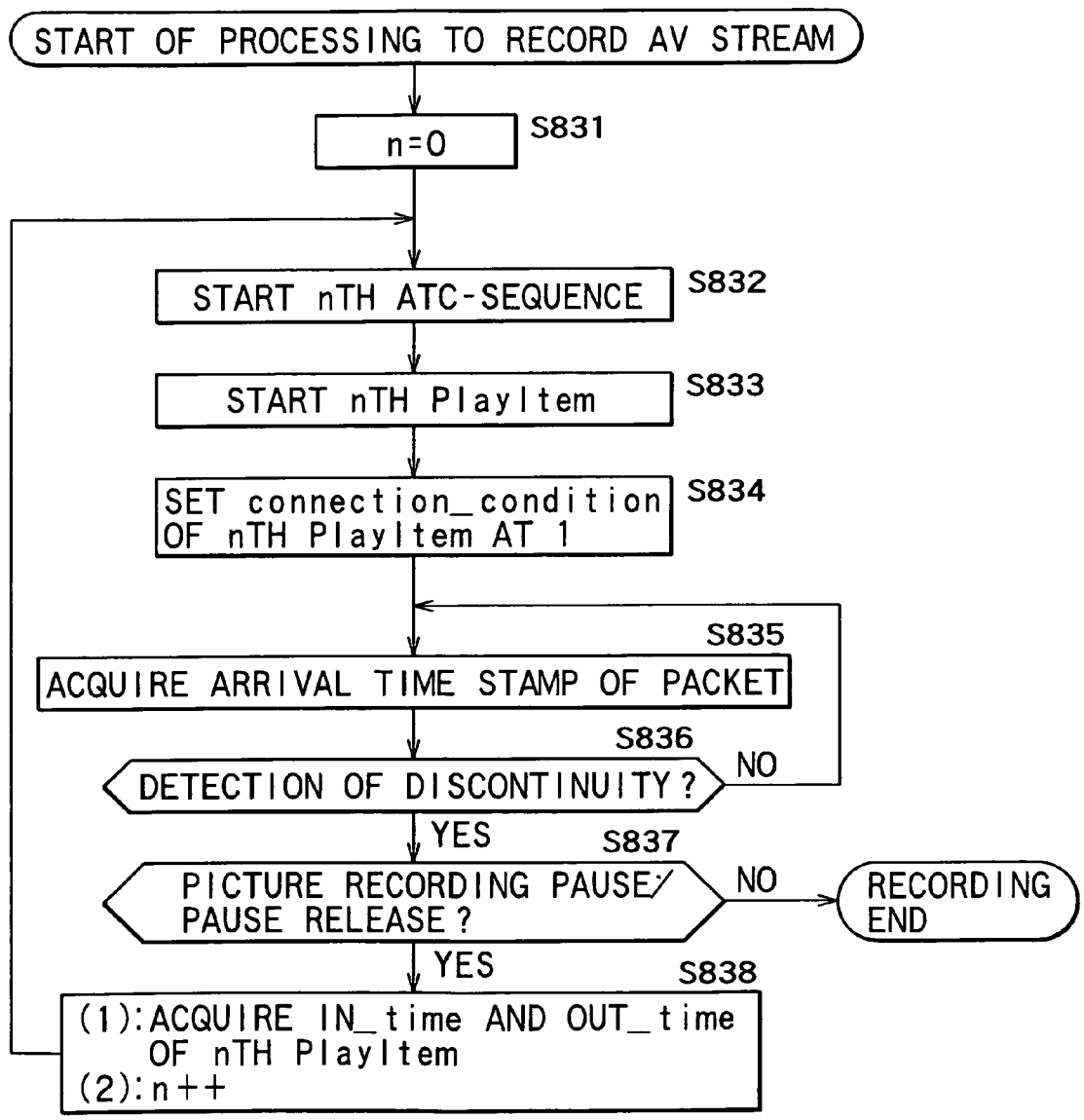
FIG. 65 shows a flowchart representing a process to create TU_map-type PlayList in processing to record an AV stream.

FIG. 65 is a flowchart representing a method to create data of TU_map-type PlayList in a process to record an AV stream wherein an ATC discontinuity is generated in the course of the recording process.

As shown in the figure, the flowchart begins with a step S831 at which the control unit 17 shown in FIG. 43 sets a parameter n at 0 (n=0). The parameter n is the number of an ATC-sequence generated in the course of the recording process.

Then, at the next step S832, the control unit 17 starts the nth ATC-sequence from the packet currently being recorded.

Subsequently, at the next step S833, the control unit 17 starts the nth PlayItem object.

Then, at the next step S834, the control unit 17 sets connection_condition of the nth PlayItem object at 1. It should be noted that, also for the first PlayItem object (n=0), connection_condition is set at 1 in spite of the fact that the state is different from that shown in FIG. 64.

Subsequently, at the next step S835, the control unit 17 acquires the arrival time stamp of the packet of the AV stream being recorded. The information of the arrival time stamp is used for acquiring IN_time and OUT_time of PlayItem.

Then, at the next step S836, the control unit 17 forms a judgment as to whether or not a discontinuity has been detected. If no discontinuity has been detected, the flow of the processing goes back to the step S835 at which the processing of this step is repeated. If the outcome of the judgment formed at the step S836 indicates that a discontinuity has been detected, on the other hand, the flow of the processing goes on to a step S837.

At the step S837, the control unit 17 forms a judgment whether or not the detected discontinuity has been caused by a recording pause/pause release. The recording pause/pause release is an event in which the recording process is temporarily suspended before being resumed later on.

If the outcome of the judgment formed at the step S837 indicates that the detected discontinuity has been caused by a recording pause/pause release, the control unit 17 determines that an ATC discontinuity has been generated due to the fact that the recording process was once suspended. In this case, the flow of the processing goes on to a step S838 at which the following processing is carried out:
(1) IN_time and OUT_time of the nth PlayItem are acquired.
(2) n++

Then, the flow of the processing goes back to the step S832 at which the next processing is carried out. This time, connection_condition of PlayItem is set at 1 at the step S834. (Refer to the state shown in FIG. 63).

If the outcome of the judgment formed at the step S837 indicates that the detected discontinuity has not been caused by a recording pause/pause release, on the other hand, the processing to record the AV stream is ended.

FIG. 66 is a flowchart representing a method to reproduce EP_map-type PlayList on the basis of the value of connection_condition.

As shown in the figure, the flowchart begins with a step S851 at which the control unit 17 shown in FIG. 43 reads in data of a PlayList file.

Then, at the next step S852, the control unit 17 sets a parameter K at 0 (K=0). The parameter K is the number of PlayItem data included in PlayList as an entry.

Subsequently, at the next step S853, the control unit 17 acquires connection_condition of the Kth PlayItem object currently to be reproduced at present.

Then, at the next step S854, the control unit 17 forms a judgment as to whether or not the value of connection_condition is 2. If the value of connection_condition is 2, the flow of the processing goes on to a step S855.

At the step S855, the control unit 17 knows that it is possible to continuously read out AV data of an ATC-sequence following AV data of the (K-l)th PlayItem object. To put it in detail, the control unit 17 knows that it is possible to read out AV stream data continuously over an STC discontinuity on the continuous ATC-sequence since PlayItem is merely split at the STC discontinuity in a state like the one shown in FIG. 62. To put it concretely, it is obvious that, in the reproduction model shown in FIG. 7, the value of the arrival time counter clock 255 can be made continuous even in the case of a state of extension over an STC discontinuity.

If the outcome of the judgment formed at the step S854 indicates that the value of connection_condition is not 2, on the other hand, the flow of the processing goes on to a step S856.

At the step S856, the control unit 17 knows that it is necessary to reset the ATC counter of the reproduction unit after reading out AV data of the (K−1)th PlayItem object but before starting to read out AV data of the Kth PlayItem object. To put it in detail, the control unit 17 knows that it is necessary to reset the value of the arrival time counter clock 255 at an ATC discontinuity in the reproduction model shown in FIG. 7 since the ATC discontinuity exists on a border of PlayItem. In the case of the current PlayItem object shown in FIG. 61, for example, the value of the arrival time counter clock 255 is reset at the value of arrival_time_stamp of a packet indicated by start point SPN_ATC_start of ATC_Sequence2.

At a step S857, the control unit 17 forms a judgment as to whether or not the processing of the last PlayItem object has been completed. If the processing of the last PlayItem object has not been completed, the flow of the processing goes on to a step S858 at which the parameter K is incremented by 1. If the outcome of the judgment formed at the step S857 indicates that the processing of the last PlayItem object has been completed, on the other hand, the processing to reproduce PlayList is ended.

Figure 67:
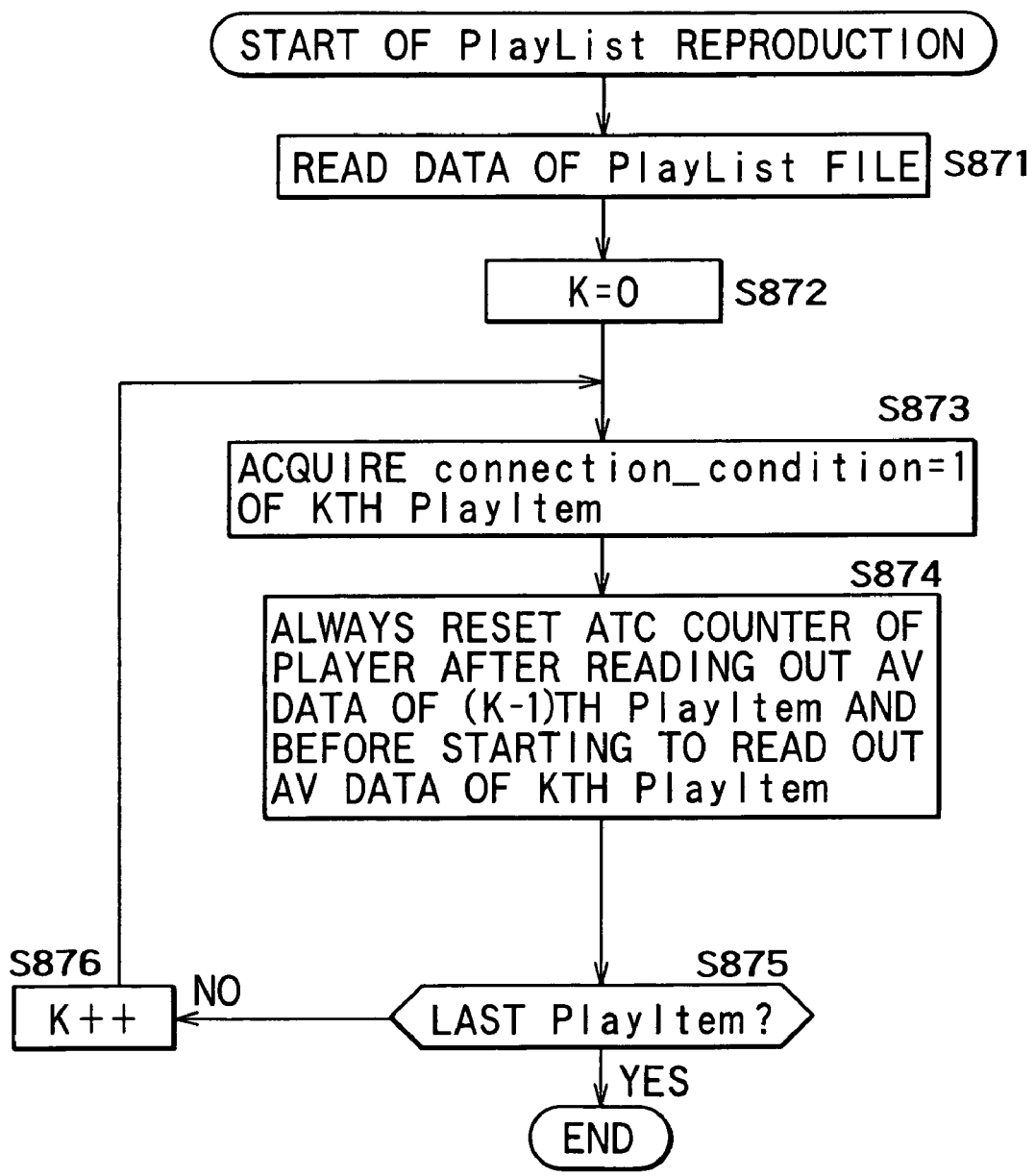
FIG. 67 shows a flowchart representing reproduction of TU_map-type PlayList.

FIG. 67 is a flowchart representing a method to reproduce TU_map-type PlayList.

As shown in the figure, the flowchart begins with a step S871 at which the control unit 17 employed in the moving-picture recording/reproduction apparatus 1 shown in FIG. 43 reads data of a PlayList file.

Then, at the next step S872, the control unit 17 sets a parameter K at 0 (K=0). The parameter K is the number of PlayItem data included in PlayList as an entry.

Subsequently, at the next step S873, the control unit 17 acquires connection_condition=1 of the Kth PlayItem to be reproduced at present.

Then, at the next step S874, the control unit 17 knows that it is necessary to reset the ATC counter of reproduction unit after reading out AV data of the (K−1)th PlayItem object but before starting to read out AV data of the Kth PlayItem object. To put it in detail, the control unit 17 knows that it is necessary to reset the value of the arrival time counter clock 255 at an ATC discontinuity in the reproduction model shown in FIG. 7 since the ATC discontinuity exists on a border of PlayItem. (In the case of the current PlayItem object shown in FIG. 64, for example, the value of the arrival time counter clock 255 is reset at the value of arrival_time_stamp of a packet indicated by start point SPN_ATC_start of ATC_Sequence2)

Subsequently, at the next step S875, the control unit 17 forms a judgment as to whether or not the processing of the last PlayItem object has been completed. If the processing of the last PlayItem object has not been completed, the flow of the processing goes on to a step S876 at which the parameter K is incremented by 1. If the outcome of the judgment formed at the step S875 indicates that the processing of the last PlayItem object has been completed, on the other hand, the processing to reproduce PlayList is ended.

As described above, on the basis of syntax, data structures and rules, it is possible to properly manage data and reproduction information, which are stored in the recording medium 10. In addition, the user is also allowed to properly verify data stored in the recording medium 10 and reproduce desired data from the recording medium 10 in a reproduction operation.

Figure 68:
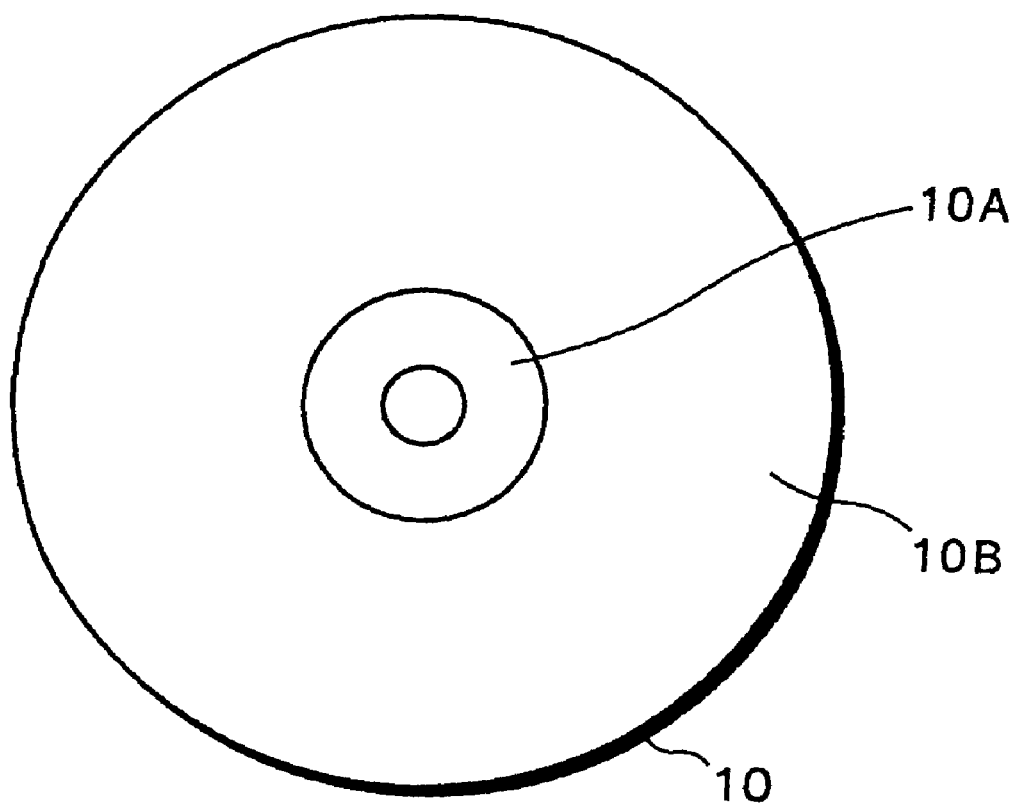
FIG. 68 is an explanatory diagram showing a recording area of a recording medium.

The recording medium 10 for storing various kinds of information as described above is implemented typically by an optical disk. On the recording medium 10, spiral-shaped or concentric-shaped recording tracks are formed. As shown in FIG. 68, in a gathered-files area 10A, gathered files and files put under the CLIPINF directory shown in FIG. 2 are stored. The gathered files are files put under the PLAYLIST directory shown in FIG. 2. Examples of the gathered files are files having a file name *.rlps or *.vpls or having the rlps or vpls extension. An example of the files put under the CLIPINF directory is files having a file name *.clpi or having the clpi extension. In another recording area 10B, files put under the STREAM directory shown in FIG. 2 are stored. An example of the files put under the STREAM directory is files having a file name *.m2ts or having the m2ts extension. The gathered files are files that need to be read out from the recording medium 10 in a short period of time when the recording medium 10 is mounted on the moving-picture recording/reproduction apparatus 1.

It should be noted that, while the embodiments described above adopt an MPEG-2 transport stream as a typical multi-plexed stream, the scope of the present invention is not limited to such a stream. For example, the present invention can be applied to a DSS transport stream and an MPEG-2 program stream.

As described above, in accordance with the present invention, in a system for recording packets of an AV stream such as a transport stream onto a recording medium, an arrival time stamp (arrival_time_stamp) indicating the arrival time of each of the packets is also recorded onto the recording medium along with the packet. In addition, information of an ATC-sequence is also recorded onto the recording medium as well. The information represents the contiguity of the arrival time stamps. To put it concretely, an array of recorded packets includes a recorded packet address (SPN_ATC_start) at which a time axis of an arrival time base starts. The address is represented by the number of a packet included in the array.

When an AV stream is newly recorded, for example, the array of continuously recorded packets does not include a discontinuity of the arrival time base. That is to say, there is only one time axis of the arrival time base. The time axis starts from the first packet of the array.

There is conceived a case in which a packet of an unnecessary portion in the array of packets is deleted in an editing process or the like and all the remaining packets can be gathered in a new array of packets. In this case, the new array of packets may include a plurality of time axes of the arrival time base. In such a case, the address of a packet from which each of the time axes of the arrival time base starts is also recorded on the recording medium.

In addition, in a system used also for recording information representing continuity of arrival time stamps, information representing continuity of a system time base referring to reproduction times of AV data is also recorded. The information representing continuity of the system time base is referred to as STC-sequence information, which includes discontinuities of the system time base. To put it concretely, an array of recorded packets includes a recorded packet address (SPN_STC_start) at which a time axis of the system time base starts. The address is represented by the number of a packet included in the array.

In a packet array including no discontinuity of the system time base, the data described above is managed in such a way that one STC-sequence does not extend over a boundary of an ATC-sequence, which is a packet array including no discontinuity of the arrival time base.

It is thus possible to correctly manage the address of a packet, at which the time axis of the arrival time base of starts, in one array of recorded packets. Accordingly, even if the number of ATC-sequences increases, the number of Clip files does not increase. As a result, files can be managed with ease. In addition, since each STC-sequence is identified by stc-id, PlayList can be edited with ease as well.

In addition, even if the AV stream file includes an arrival-time-base discontinuity and/or a system-time-base discontinuity, reproduction-start and reproduction-end times of AV data can be managed properly.

It should be noted that, while the embodiments described above use an MPEG-2 transport stream as a typical multi-plexed stream, the scope of the present invention is not limited to the MPEG-2 transport stream. For example, the present invention can be applied to a DSS transport stream and an MPEG-2 program stream.

The series of processes described above can be carried out by hardware or software. If the processing is carried out by software, programs composing the software can be installed in a computer incorporated in special hardware or a general-purpose computer from a network or a recording medium. By installing a variety of programs in a general-purpose computer, the computer can be driven to carry out various kinds of processing.

As shown in FIG. 43, the recording medium is distributed separately from the moving-picture recording/reproduction apparatus as means for presenting programs stored in the recording medium to the user. The recording medium is typically packet media such as the magnetic disk 51 including a floppy disk, the optical disk 52 including a CD-ROM (Compact Disk-Read Only Memory) and a DVD (Digital Versatile Disk), a magneto-optical disk 53 including an MD (Mini-Disk) and the semiconductor memory 54. As an alternative, instead of presenting the programs to the user through such package media, the programs can also be presented to the user by being stored in advance in a ROM and a hard disk, which are preinstalled in the moving-picture recording/reproduction apparatus.

It should be noted that, in this specification, steps prescribing a program stored in a recording medium can of course be pieces of processing, which are carried out in a prescribed order along the time series, but do not have to be executed sequentially. That is to say, the steps can be pieces of processing, which are carried out concurrently or individually.

In addition, the word 'system' used in this specification mean the whole system including a plurality of apparatuses.

INDUSTRIAL APPLICABILITY

As described above, in accordance with the present invention, even if an editing operation is carried out after a recording process, data and reproduction information can be managed easily as well as properly.

In addition, in accordance with the present invention, it is possible to implement an information recording medium that allows stored data and reproduction of the data to be managed easily and properly even if an editing operation is carried out.

Furthermore, in accordance with the present invention, a data stream can be reproduced continuously and fast without losing any desired portion of the stream.

Moreover, in accordance with the present invention, even if a portion of a data stream is deleted, not only can a data stream be reproduced continuously, but post-editing data can be managed with ease.

The invention claimed is:

1. A data recording apparatus for recording a data stream including an array of packets onto an information recording medium, comprising:
   first detection means for detecting reference-time information of said data stream;
   first generation means for generating:
      first continuity information representing continuity of first time information generated on the basis of a detection result produced by said first detection means;
      second continuity information representing continuity of second time information showing arrival times of said packets;
      identification information for identifying a first packet array including no discontinuity of said first time information; and
      an offset value of said identification information offset value added for each second packet array including no discontinuity of said second time information; and
   recording means for recording said first continuity information, said second continuity information and said offset value onto said information recording medium.

2. A data recording apparatus according to claim 1, wherein said first continuity information represents an address of a packet at a start of a time axis for said first time information in a recorded packet array.

3. A data recording apparatus according to claim 1, wherein said second continuity information represents an address of a packet at a start of a time axis for said second time information in a recorded packet array.

4. A data recording apparatus according to claim 1, further comprising management means for managing data so that said first packet array does not extend over a boundary of said second packet array.

5. A data recording apparatus according to claim 1, said data recording apparatus further comprising:
   second detection means for detecting a change point of program contents included in said data stream; and
   acquisition means for acquiring an address of a packet corresponding to a change point of program contents in a recorded packet array on the basis of a detection result produced by said second detection means,
   wherein said recording means records an address of a packet corresponding to a change point acquired by said acquisition means onto said information recording medium.

6. A data recording apparatus according to claim 5, further comprising management means for managing data so that, in a recorded packet array, one program-sequence may extend over a boundary between said first packet array and said second packet array where said program-sequence is an array of packets with fixed program contents.

7. A data recording apparatus according to claim 1, further comprising second generation means for generating a presentation start time and a presentation end time for each of said arrays of first packets,
   wherein said recording means records said presentation start time and said presentation end time, generated by said second generation means.

8. A data recording apparatus according to claim 7, wherein said recording means records a map showing a relation between times of display-time information and data addresses.

9. A data recording method adopted in a data recording apparatus for recording a data stream including an array of packets onto an information recording medium, comprising:
   a first detection step of detecting reference-time information of said data stream;
   a generation step of generating:
      first continuity information representing continuity of first time information generated on the basis of a detection result produced in processing carried out at said first detection step;
      second continuity information representing continuity of second time information showing arrival times of said packets;
      identification information for identifying a first packet array including no discontinuity of said reference-time information; and
      an offset value of said identification information added for each second packet array including no discontinuity of said second time information; and
   a recording step of recording said first continuity information, said second continuity information and said offset value onto said information recording medium.

10. A computer-readable medium storing an encoded program that when executed causes a processor to execute the steps of:

a first detection step of detecting reference-time information of said data stream;

a generation step of generating:

first continuity information representing continuity of first time information generated on the basis of a detection result produced in processing carried out at said first detection step;

second continuity information representing continuity of second time information showing arrival times of said packets;

identification information for identifying a first packet array including no discontinuity of said reference-time information; and an offset value of said identification information added for each second packet array including no discontinuity of said second time information; and a recording step of recording said first continuity information, said second continuity information and said offset value onto said information recording medium.

* * * * *